(12) United States Patent
Haas et al.

(10) Patent No.: US 10,396,894 B2
(45) Date of Patent: Aug. 27, 2019

(54) COMMUNICATION APPARATUS AND METHOD

(71) Applicant: The University Court of the University of Edinburgh, Edinburgh (GB)

(72) Inventors: Harald Haas, Edinburgh (GB); Sinan Sinanovic, Edinburgh (GB); Dobroslav Tsonev, Edinburgh (GB)

(73) Assignee: The University Court of the University of Edinburgh, Edinburgh (GB)

(*) Notice: Subject to any disclaimer, the term of this patent is extended or adjusted under 35 U.S.C. 154(b) by 0 days.

(21) Appl. No.: 15/487,640

(22) Filed: Apr. 14, 2017

(65) Prior Publication Data

US 2017/0222719 A1    Aug. 3, 2017

Related U.S. Application Data

(63) Continuation of application No. 13/669,284, filed on Nov. 5, 2012, now abandoned.

(30) Foreign Application Priority Data

Nov. 4, 2011 (GB) .................................. 1119063.4

(51) Int. Cl.
*H04L 25/49* (2006.01)
*H03M 1/56* (2006.01)
(Continued)

(52) U.S. Cl.
CPC ........... *H04B 10/116* (2013.01); *H04B 10/60* (2013.01); *H04B 10/691* (2013.01)

(58) Field of Classification Search
USPC ...................................... 250/208.2
See application file for complete search history.

(56) References Cited

U.S. PATENT DOCUMENTS 4,605,826 A * 8/1986 Kanemasa ............. H04B 3/237
                                                                       370/290
5,665,954 A     9/1997 Bard et al.
(Continued)

FOREIGN PATENT DOCUMENTS

EP     1439649 A1    7/2004
EP     1835647 A1    9/2007
(Continued)

OTHER PUBLICATIONS

Abu-Alhiga, R., et al., "Subcarrier Index Modulation OFDM" in Proc. of the International Symposium on Personal, Indoor and Mobile Radio Communications (PIMRC), Sep. 13-16, 2009 , pp. 177-180, IEEE, Tokyo, Japan.
(Continued)

*Primary Examiner* — Patricia I Young
(74) *Attorney, Agent, or Firm* — Alston & Bird LLP

(57) ABSTRACT

A transmission system for transmitting data as part of a communications system, the data comprising a plurality of data symbols or elements, the transmission system being configured to divide the data into at least a first data portion and a second data portion, wherein the first data portion is communicated by transmitting signals in selected carrier channels, wherein the transmission system is configured to encode at least one data symbol or element by selecting a relative order of at least one first carrier channel having a first operational state and at least one second carrier channel having a second operational state.

38 Claims, 27 Drawing Sheets

(51) Int. Cl.
*H04B 3/23* (2006.01)
*H04B 10/116* (2013.01)
*H04B 10/69* (2013.01)
*H04B 10/60* (2013.01)

(56) References Cited

U.S. PATENT DOCUMENTS

| | | |
|---|---|---|
| 6,445,479 B1 | 9/2002 | Hornback et al. |
| 6,450,816 B1 | 9/2002 | Gerber |
| 7,039,326 B1 | 5/2006 | Chung |
| 8,248,467 B1 | 8/2012 | Ganick et al. |
| 8,334,898 B1 | 12/2012 | Ryan et al. |
| 8,334,901 B1 | 12/2012 | Ganick et al. |
| 8,416,290 B2 | 4/2013 | Ryan et al. |
| 8,432,438 B2 | 4/2013 | Ryan et al. |
| 8,436,896 B2 | 5/2013 | Staats et al. |
| 8,457,502 B2 | 6/2013 | Ryan et al. |
| 8,520,065 B2 | 8/2013 | Staats et al. |
| 8,947,513 B2 | 2/2015 | Ganick et al. |
| 8,964,016 B2 | 2/2015 | Ganick et al. |
| 8,994,799 B2 | 3/2015 | Ganick et al. |
| 8,994,814 B2 | 3/2015 | Ganick et al. |
| 9,287,976 B2 | 3/2016 | Ganick et al. |
| 2003/0110508 A1 | 6/2003 | Bridgelall |
| 2004/0037248 A1 | 2/2004 | Tamaki et al. |
| 2004/0161246 A1 | 8/2004 | Matsushita et al. |
| 2005/0225664 A1 | 10/2005 | Matsumoto |
| 2008/0037673 A1 | 2/2008 | Ahn et al. |
| 2008/0219676 A1 | 9/2008 | Tokura et al. |
| 2008/0225935 A1 | 9/2008 | Reddy |
| 2009/0084847 A1 | 4/2009 | He et al. |
| 2009/0317088 A1 | 12/2009 | Niiho et al. |
| 2010/0079131 A1 | 4/2010 | Green et al. |
| 2010/0322635 A1 | 12/2010 | Klinghult |
| 2011/0285568 A1* | 11/2011 | Harpe ............... H03M 1/56 341/158 |
| 2013/0026941 A1 | 1/2013 | Ganick et al. |
| 2013/0026945 A1 | 1/2013 | Ganick et al. |
| 2013/0030747 A1 | 1/2013 | Ganick et al. |
| 2013/0126713 A1 | 5/2013 | Haas et al. |

FOREIGN PATENT DOCUMENTS

| | | |
|---|---|---|
| GB | 2339514 A | 1/2000 |
| JP | H08-030892 A | 2/1996 |
| JP | 2007-033125 A | 2/2007 |
| JP | 2007-166526 A | 6/2007 |
| JP | 2008-219773 A | 9/2008 |
| JP | 2008-252570 A | 10/2008 |
| JP | 2009-027480 A | 2/2009 |
| JP | 2009-036571 A | 2/2009 |
| JP | 2009-130725 A | 6/2009 |
| JP | 2009-199545 A | 9/2009 |
| JP | 2010-217455 A | 9/2010 |
| JP | 2010-239350 A | 10/2010 |
| JP | 2010-271379 A | 12/2010 |
| JP | 2010-271817 A | 12/2010 |
| JP | 2011-009805 A | 1/2011 |
| JP | 2011-114790 A | 6/2011 |
| JP | 2011-166318 A | 8/2011 |
| JP | 2011-254317 A | 12/2011 |
| JP | 4981053 B2 | 7/2012 |
| WO | WO 1999/053633 A1 | 10/1999 |
| WO | WO 2001/097479 A1 | 12/2001 |
| WO | WO 2003/041354 A1 | 5/2003 |
| WO | WO 2004/075444 A2 | 9/2004 |
| WO | WO 2008/023583 A1 | 2/2008 |
| WO | WO 2010/064175 A1 | 6/2010 |
| WO | WO 2011/030109 A1 | 3/2011 |
| WO | WO 2011/055895 A1 | 5/2011 |
| WO | WO 2013/016439 A1 | 1/2013 |

OTHER PUBLICATIONS

Armstrong, J., et al, "Comparison of Asymmetrically Clipped Optical OFDM and DC-Biased Optical OFDM in AWGN", IEEE Communications Letters, May 2008, pp. 343-345, vol. 12, No. 5, IEEE.

Chau, Y. A., et al., "Space Modulation on Wireless Fading Channels", IEEE Vehicular Technology Conference, Oct. 2001, pp. 1668-1671, vol. 3, IEEE.

European Patent Office, Communication pursuant to Rule 164(2)(b) and Article 94(3) EPC for Application No. 12790625.3, dated Jun. 8, 2017, 12 pages, Germany.

Intellectual Property Office of the United Kingdom, Search Report for Application No. GB1119063.4, dated Mar. 8, 2013, 2 pages, UK.

International Searching Authority, International Search Report for International Application No. PCT/GB2012/052732, dated Jul. 3, 2013, 6 pages, European Patent Office, The Netherlands.

Japan Patent Office, Notification of Reason(s) for Refusal for Application No. 2014-539404, dated Oct. 20, 2016, 51 pages, Japan.

Japan Patent Office, Search Report for Application No. 2014-539404, dated Oct. 6, 2016, 17 pages, Japan.

Jeganathan, J., et al., "Spatial Modulation: Optimal Detection and Performance Analysis", IEEE Communications Letters, Aug. 2008, pp. 545-547, vol. 12, No. 8, IEEE.

Langlotz, Tobias, et al., "Unsynchronized 4D Barcodes: Coding and Decoding Time-Multiplexed 2D Colorcodes", Proceedings of the 3rd International Conference on Advances in Visual Computing Part I, 2007, pp. 363-374.

Mesleh, R. Y., et al.,"Spatial Modulation", IEEE Transactions on Vehicular Technology, Jul. 2008, pp. 2228-2241, vol. 57, No. 4, IEEE.

PCT/US12/48164 filed on Jul. 25, 2012 which is published, claims the benefit of U.S. Appl. No. 13/422,580.

United States Patent and Trademark Office, Office Action for U.S. Appl. No. 13/669,284, dated Jul. 17, 2015, 20 pages, U.S.A.

United States Patent and Trademark Office, Office Action for U.S. Appl. No. 13/699,284, dated Feb. 23, 2016, 18 pages, U.S.A.

United States Patent and Trademark Office, Office Action for U.S. Appl. No. 13/669,284, dated Oct. 17, 2016, 22 pages, U.S.A.

Woo, Grace, et al., "VRCodes: Unobtrusive and Active Visual Codes for Interaction by Exploiting Rolling Shutter", IEEE International Symposium on Mixed and Augmented Reality, Nov. 5-8, 2012, pp. 59-64, IEEE, Atlanta, GA.

Woo, Grace, et al., Abstract for "Grace Woo's Thesis Defense", MIT Media Lab, Aug. 24, 2012. Downloaded from <http://www.media.mit.edu/events/2012/08/24/grace-woo-thesis-defense> on Mar. 7, 2013.

Woo, Grace, et al., Screendump "Newsflash: A Demonstration of VRCodes" video and accompanying comments, Sep. 12, 2012. Downloaded from <http://www.youtube.com/watch?v=aZuLnoPbhz0> on Mar. 7, 2013.

Yokoi, Atsuya, et al., "CSK constellation in all color band combinations", IEEE 802.15 15-0247-00-0007, Mar. 2011, retrieved from <https://mentor.ieee.org/802.15/dcn/11/15/11/0247-00/0007-csk-constellation-in-all-color-band-combinations.pdf> on Oct. 12, 2016.

Abu-Alhiga, et al., "Subcarrier Index Modulation OFDM," IEEE, Institute for Digital Communications, Joint Research Institute for Signal and Image Processing, School of Engineering, The University of Edinburgh, pp. 177-181, (2009).

* cited by examiner

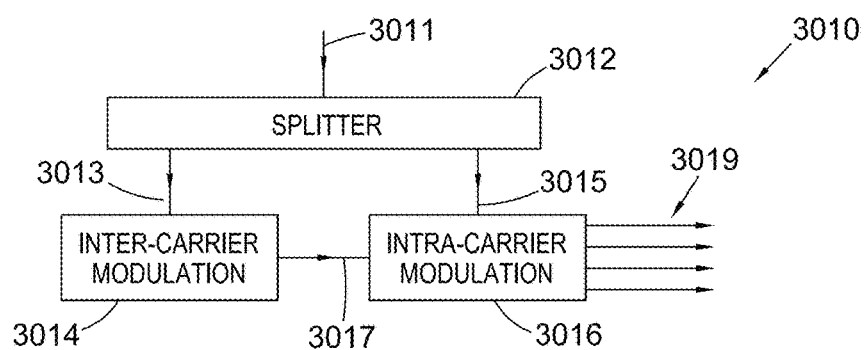

Fig. 17D         Fig. 17E
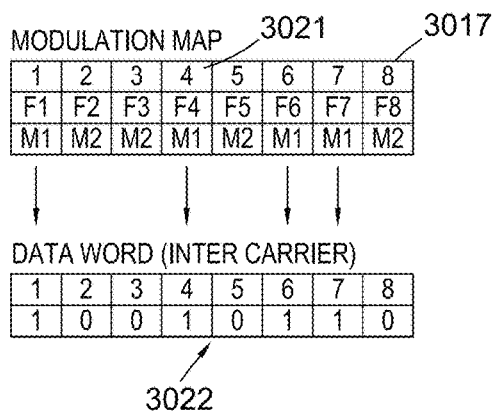
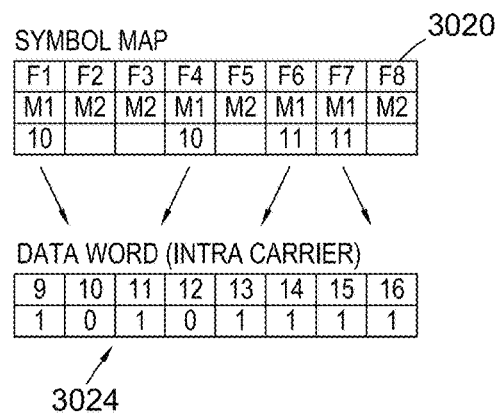
Fig. 17F         Fig. 17G

Fig. 18A

| 1 | 2 | 3 | 4 | 5 | 6 | 7 | 8 | 9 | 10 | 11 | 12 | 13 | 14 | 15 | 16 | 17 | 18 | 19 | 20 | 21 | 22 | 23 | 24 |
|---|---|---|---|---|---|---|---|---|----|----|----|----|----|----|----|----|----|----|----|----|----|----|----|
| 1 | 1 | 0 | 0 | 1 | 0 | 1 | 1 | 0 | 1  | 0  | 1  | 0  | 1  | 1  | 1  | 0  | 1  | 1  | 1  | 0  | 1  | 1  | 0  |

| 1 | 2 | 3 | 4 | 5 | 6 | 7 | 8 |
|---|---|---|---|---|---|---|---|
| 1 | 1 | 0 | 0 | 1 | 0 | 1 | 1 |

Fig. 18C

| 9 | 10 | 11 | 12 | 13 | 14 | 15 | 16 |
|---|----|----|----|----|----|----|----|
| 0 | 1  | 0  | 1  | 0  | 1  | 1  | 1  |

| 17 | 18 | 19 | 20 |
|----|----|----|----|
| 0  | 1  | 1  | 1  |

MODULATION MAP

| 1  | 2  | 3  | 4  | 5  | 6  | 7  | 8  |
|----|----|----|----|----|----|----|----|
| F1 | F2 | F3 | F4 | F5 | F6 | F7 | F8 |
| M1 | M2 | M2 | M1 | M2 | M1 | M1 | M2 |

SYMBOL MAP

| F1 | F2 | F3 | F4 | F5 | F6 | F7 | F8 |
|----|----|----|----|----|----|----|----|
| M1 | M2 | M2 | M1 | M2 | M1 | M1 | M2 |
| 10 | 0  | 0  | 1  | 1  | 10 | 11 | 11 | 11 | 0 |

INTER CARRIER DATA WORD

| 1 | 2 | 3 | 4 | 5 | 6 | 7 | 8 |
|---|---|---|---|---|---|---|---|
| 1 | 1 | 0 | 0 | 1 | 0 | 1 | 1 |

M1 INTRA CARRIER DATA WORD

| 9 | 10 | 11 | 12 | 13 | 14 | 15 | 16 |
|---|----|----|----|----|----|----|----|
| 1 | 1  | 0  | 1  | 0  | 1  | 1  | 1  |

Fig. 18I

M2 INTRA CARRIER DATA WORD

| 17 | 18 | 19 | 20 |
|----|----|----|----|
| 0  | 1  | 1  | 1  |

3044

|      | $T_1$ | $T_2$ | $T_3$ | $T_4$ |
|------|-------|-------|-------|-------|
| 1 $F_1$ | off | 8-QAM | 8-QAM | off |
| 1 $F_2$ | off | 8-QAM | 8-QAM | off |
| 0 $F_3$ | BPSK | 4-QAM | 4-QAM | BPSK |
| 1 $F_4$ | off | 8-QAM | 8-QAM | off |
|      |     | 0     | 0     | 1     |

COMMUNICATION APPARATUS AND METHOD

CROSS-REFERENCE TO RELATED APPLICATIONS

This application is a continuation of U.S. patent application Ser. No. 13/669,284, filed on Nov. 5, 2012, which claims priority to United Kingdom Application No. 1119063.4, filed Nov. 4, 2011, each of which are hereby incorporated by reference herein in their entirety.

The present invention relates to a communication method and apparatus and an associated receiver, particularly relating to receiving a communications signal using an optical sensor.

BACKGROUND

Data may be encoded using radiation by time modulating a radiation source. For example, in visible light communications, the intensity of light produced from a light source, such as an LED, may be modulated over time in order to encode data in a light signal. A photo-detector can then be used to receive the time-modulated signal which is decoded to reveal the data that was transmitted by the light source.

A digital camera can be conveniently used to receive the signal, which is then processed to extract the encoded data. In order to achieve an acceptably high transmission rate and achieve communication without obvious light flickering by the transmitting light source(s), the transmitting light source must be switchable between intensity levels at a suitably high rate. Conversely, the photo-detector must meet certain requirements, for example, by having an image capture rate fast enough to distinguish between the intensity transitions. However, at the same time, it would be beneficial if such communications methods could be used with common or off the shelf apparatus.

In certain communications methods, particularly in visible light communications, it is desirable to change the power of the radiation emitted by the transmitter, i.e. to use dimming of the radiation source. However, these changes can affect the data transmission capabilities.

Various techniques are employed in the art in an attempt to address this problem. For example, in the IEEE 802.15.7 standard, a method referred to as variable pulse position modulation (VPPM) is used. This involves changing the pulse duration depending on the dimming level required. In VPPN, the data rate is independent of the dimming level, but the bandwidth efficiency is poor. Other techniques employed to address this problem involve changes of the light intensity level. Problems associated with at least some of these techniques include degradation of the data rate performance for high dimming (low optical power).

Orthogonal frequency division multiplexing (OFDM) methods are popular for modulating signals in order to transmit data over dispersive channels. However, it is desirable to reduce the power consumption of communication systems. For example, this may be to maximise battery life for portable devices, or simply to save operating costs or reduce energy usage.

A variation on the OFDM modulation scheme, called SIM-OFDM, has been proposed in order to reduce the power required by communications devices relative to those that use traditional OFDM. The SIM-OFDM technique is described in "Subcarrier Index Modulation OFDM" by R. Abualhiga and H. Haas, in Proc. of the International Symposium on Personal, Indoor and Mobile Radio Communications (PIMRC), Tokyo, Japan, Sep. 13-16, 2009.

SIM-OFDM introduces an additional dimension alongside conventional OFDM encoding, the additional dimension coming from the state, i.e. active or inactive, of each frequency carrier available. In this way, frequency carrier states (i.e. used or unused) are used to encode data according to an on-off keying modulation scheme. As in OFDM, each active carrier transmits a signal that is modulated using a conventional modulation scheme such as but not limited to M-QAM. Each inactive carrier is set to a zero state. Hence, the power used to convey each M-QAM signal can also be used to encode further data by simply being present or not in a particular frequency carrier band. The SIM-OFDM concept is illustrated in FIG. 1.

In this case, the incoming bit stream is divided into blocks of bits, each having a length of N(0.5*log 2(M)+1), where N is the number of frequency carriers, and M is the constellation size of the respective M-QAM modulation scheme that is used. Each of these blocks is divided into two parts. The first N bits of the block form a first sub-block ($B_{OOK}$). The remaining $0.5*N.\log_2(M)$ bits form a second sub-block ($B_{QAM}$). The first sub-block ($B_{OOK}$) is inspected and the majority bit type is determined by checking which bit value, 1 or 0, has most occurrences. The frequency carriers that have the same position inside the OFDM frame as the bits from the majority bit type in $B_{OOK}$ are classified as "active", and the rest of the frequency carriers (i.e. those that correspond to the minority bit type) are classified as "inactive". Inactive carriers are given the amplitude value 0+0j, where $j=\sqrt{-1}$. The first 0.5*N active frequency carriers are given amplitude values corresponding to the M-QAM constellation symbols necessary to encode the second sub-block ($B_{QAM}$). The remaining active carriers can be used to signal the majority bit type of $B_{OOK}$ to the destination receiver and they will be assigned a signal whose power is equal to the average power for the given M-QAM scheme. Afterwards, an N-point IFFT transformation is performed in order to obtain the time-domain signal, which is transmitted.

In this way, for example, if the binary sequence [0 1 0 0 0 1 1 1 0 1 0 1] is to be transmitted using 4-QAM and 6 carriers, then the sequence is divided into a first sub-block [1 1 0 1 0 1] and a second sub-block [0 1 0 0 0 1]. The second sub-block is modulated into frequency carriers using 4-QAM modulation. Since the majority bit in the first sub-block is 1, then an active carrier is chosen to represent 1. In this case, the 4-QAM modulated signals are transmitted on the first, third and fifth frequency carrier channels. The sixth carrier, which is also active, can be used to convey to the destination what the majority bit type in $B_{OOK}$ is. It will be allocated power equal to the average power of the respective M-QAM scheme. Its positive amplitude will represent the majority bit type—in this case 1. This carrier channel allocation effectively encodes the first sub-block as [1 1 0 1 0 1].

A slight modification of SIM-OFDM involves signalling the majority bit type either through secure communication channels, or by reserving one particular frequency carrier and transmitting the desired value with a sufficiently high signal to noise ratio. It should also be noted that this modulation scheme saves power from all inactive carriers at the expense of spectral efficiency. The described configuration has been referred to as Power Saving Policy (PSP). In an alternative embodiment, for each single OFDM frame, the unused power from the inactive carriers can be reallocated to the active ones, which could lead to a performance enhancement.

Once a signal has been received by the receiver at the destination, it is transformed into the frequency domain with a fast Fourier transform operation. Then all the frequency carriers are inspected. Those carriers whose power is above a predetermined threshold are marked as active, and the rest of the carriers are marked as inactive. At least half of the total number of carriers are active. Hence, in case that less than 0.5*N active carriers are detected, the threshold value is decreased by a small step and the inspection is performed again. This procedure is done iteratively until at least 0.5*N active carriers are detected. Then the first sub-block ($B_{OOK}$) is reconstructed from the detected states of the carriers and the known majority bit type. Afterwards, the first 0.5*N active carriers are demodulated according to the respective M-QAM scheme in order to reconstruct the second sub-block ($B_{QAM}$) in the conventional manner. The spectral efficiency of this scheme is:

$$\frac{\log_2(M)}{2} + 1 \frac{\text{bits}}{\text{carrier}}$$

It is an object of at least one embodiment of the present invention to improve the performance of the SIM-OFDM scheme. The bit error rate (BER) performance of SIM-OFDM in an Additive White Gaussian Noise (AWGN) channel is illustrated in FIG. 2.

It is at least one object of at least one embodiment of the present invention to provide an improved or alternative communication system and detector and/or to at least partially address at least one problem with the prior art.

STATEMENTS OF INVENTION

According to a first aspect of the present invention is a detection system for use with a communications system, the detection system comprising at least one radiation detector for receiving a radiation signal, wherein the at least one radiation detector comprises a plurality of sensing elements, and wherein the detection system is configured to detect the radiation signal using differing subsets of sensing elements at differing times and determine data encoded in the radiation signal based on the radiation detected by the different subsets of sensing elements.

The radiation signal may comprise a modulated radiation signal, such as an intensity modulated radiation signal. The detection system may be configured to determine data encoded in the radiation signal by determining the radiation intensity and preferably the average radiation intensity detected by each subset of sensing elements.

The radiation detector may be configured to generate one or more images from the received radiation signal. Each image may be generated within an image detection period.

The radiation detector may be configured to capture different portions of each image at different times within the associated image period. Each portion of the image may be detected by a differing subset of sensing elements. The detection system may be configured to sample a plurality and preferably all of the subsets of sensing elements within each image detection period. The detection system may be configured to generate each image by combining the portion of the image generated by each subset of sensing elements within the associated image period in order to form the image.

Each subset may comprise different sensing elements to at least one and preferably each of the other subsets. Each subset may be sampled for a predetermined sample time.

The at least one radiation detector may comprise an image sensor. The at least one radiation detector may comprise a CMOS photodetector an active pixel sensor or a charge coupled device (CCD) or the like. Each sensing element may comprise a photodiode or a reverse bias p-n junction or the like. The radiation detector may comprise an infra-red detector, such as a passive infra-red detector or an ambient light sensor or a photo-voltaic element.

The at least one radiation detector may be a pixelated detector. Each sensing element may comprise or be comprised in an associated pixel of the detector. The sensing elements may be formed in an array, grid or matrix. The sensing elements may be arranged in rows and/or columns.

The detector may comprise or be comprised in a digital camera.

At least one and preferably each subset of sensing elements comprises a block of sensing elements. Each block of sensing elements may comprise one or more sensing elements.

Preferably each subset of sensing elements may comprise one or more rows or columns of sensing elements. The detection system may be configured to sample the radiation detector on a row by row or column by column or pixel group by pixel group basis.

The detection system may be operable using a rolling shutter and/or a line scan technique. The rolling shutter may comprise using the radiation detector to collect an image by sampling the sensing elements on a row by row or column by column or pixel group by pixel group basis and generating an image by combining the output of each sampled row or column or pixel group of sensing elements.

The detection system may be configured to determine elements of the data, such as bits, each data element being determined from the radiation detected by an associated subset of sensing elements, for example, by using the average intensity of radiation detected by the associated subset of sensing elements.

The radiation signal may be modulated or encoded using on-off keying.

The detection system may be configured to normalise the average intensity of radiation detected by each subset of sensing elements, for example, the signal or average intensity may be normalised between 0% and 100%.

The radiation may comprise light such as visible light, infra-red, near infra-red or ultra-violet light or the like.

The detection system may be configured to remove at least a portion of a background image from the portion of the image generated by each subset of sensing elements.

The system may be configured to illuminate the background at a predetermined intensity, such as an intensity corresponding to one or more intensity levels that are used to modulate/encode data in the radiation signal for a time sufficient for at least one and preferably each subset of sensing elements to be sampled. The predetermined intensity may be an unmodulated intensity. The detection system may generate a background image using the radiation detected from at least one and preferably each subset of sensing elements when illuminated at the predetermined intensity. The processor may be configured to subtract a corresponding portion of the background image from the portion of the image generated by each subset of sensing elements.

The detection system may be configured to average several image portions generated by each subset at varying times in order to generate a corresponding portion of the background image for each subset. The detection system may be configured to filter the signal received by adjacent subsets of sensing elements in order to normalise the intensities and generate corresponding portions of the background image from the normalised intensities.

The detection system may be configured to perform brightness and/or contrast normalisation over a detected image (i.e. over one or more subsets), for example, if an image is bright in one area and dark in another.

The detection system may be configured to perform clock recovery, for example, by determining a frequency and/or phase of the transmitted signal by analysing a plurality of data bits (e.g. each data bit being determined from a corresponding subset of sensing elements) and determining the time of changes of intensity of the radiation signal relative to the sample time of each subset.

The detection system may be configured to perform error correction, for example using forward error correction techniques.

The sensing elements may be configured to detect colour. The data may be encoded into the radiation signals using intensity modulation and/or colour keying.

The detection system may be configured to apply interference cancellation and/or multi-user detection methods such as successive interference cancellation, joint detection, joint transmission, precoding techniques (dirty paper coding), superposition coding or minimum mean square error (MMSE) estimation.

The radiation detector may comprise or be comprised in a camera of a portable electronics device, such as a mobile phone or other personal communications device, a tablet computer, a palm top computer, a notebook computer, a digital camera, a PDA, a laptop computer, a personal computer or the like. Processing of any signals generated by the sensing elements and/or control of the sensing elements and/or detection system may be at least partially carried out by one or more processors of the portable electronics device, for example when suitably programmed and/or configured.

The portable electronics device may comprise an ambient light sensor. The ambient light sensor may be used as an alternative or additional radiation detector to the digital camera.

The processor may be configured to use radiation intensity detected by the ambient light sensor to normalise the image and/or construct the background image.

The radiation signal may be generated by a light source. The light source may comprise an LED. The light source may comprise a screen or monitor or projector or projection screen. The average intensity of light output by the display may be controlled to modulate the light it emits and thereby encode the data. For example, the light emitted by the monitor or screen may be modulated by intensity modulating the light output by the backlight of the display, or by shifting the intensity levels output by the LEDs of an LED display or OLEDs of an OLED display or pixels of a pixelated display, or by displaying an image that results in a required light intensity output.

The light source may be a light source comprised in a portable device such as a mobile phone/smartphone, a tablet computer or the like. For example, the light source may comprise an LED light source provided in a portable device for illumination, for example, when taking a picture with an in-build camera. In this way, using the LED or screen of the portable device as a transmitter and a camera of a portable device as a receiver may permit device to device optical communications.

The light source may comprise a screen or monitor on which an image is produced by scanning and modulating a spot or a line. Temporal modulation of the intensity of the spot or line may be applied in a manner that has little effect on the perceived image content yet encodes data temporally or spatially within the image for later detection.

The detection system may be directly and/or indirectly in communication with a processing resource and/or a secondary data store, the processing resource accessing secondary data from the data store dependent on the data determined by the detection system. For example, the secondary data may comprise location data and/or data associated with a product and/or data associated with the transmission system used to generate the signal or a further system associated with the transmission system.

According to a second aspect of the present invention is method for detecting a radiation signal in a communications system, the method comprising:
  receiving the radiation signal using at least one radiation detector, wherein the at least one radiation detector comprises a plurality of sensing elements;
  sampling differing subsets of sensing elements at differing times; and
  determining data encoded in the radiation signal based on the radiation detected by the different subsets of sensing elements.

The method may comprise one or more method steps corresponding to one or more features described in relation to or involving use of the apparatus described in connection with the first embodiment.

According to a third aspect of the present invention is a system comprising a transmission system and a detection system according to the first aspect, the transmission system comprising a light source and being configured to modulate the output of the light source in order to encode data for transmission to the detection system.

The transmission system may be configured to encode data by modulating the intensity of light emitted by the light source in order to encode the data.

The light source may comprise one or more light emitters, such as LEDs or OLEDs (organic light emitting diodes).

The light source may be a light source comprised in a portable device such as a mobile phone/smartphone, a tablet computer or the like.

The light source may comprise a screen or monitor on which an image is produced by scanning and modulating a spot or a line. Temporal modulation of the intensity of the spot or line may be applied in a manner that has little effect on the perceived image content yet encodes data temporally or spatially within the image for later detection The light source may comprise a display such as a computer monitor or television screen or projection system or the like. The transmission system may be configured to modulate the light produced by at least a portion and preferably the whole of the display so as to encode the data.

The light source may be configured to produce a plurality of colours. The light source may comprise a plurality of light emitters, at least one light emitter being configured to produce a different colour to at least one other light emitter. The light source may be configured to selectively produce a plurality of colours by varying or controlling the colour temperature of at least one and optionally each light emitter, which may comprise individually controlling the colour temperature of light emitters. The transmission system may be configured to encode the data by encoding data elements by colour, for example, by selectively activating an appropriately coloured light emitter to encode a data element. The transmission system may be configured to encode the data using colour shift keying, for example, by using mixes of different colours in certain combinations to convey different bit sequences.

The light source may comprise a plurality of spatially separated light emitters. The transmission system may be configured to encode the data by spatially encoding data elements, for example, by selectively activating an appropriately positioned light emitter to encode a data element.

The transmission system may be configured to encode data at a rate in the order of and/or corresponding to the sample time required for the detection system to sample each subset, for example such that each individual data element (e.g. a bit) is encoded by operating the light source for a period that is substantially equivalent to, the same as or of the same order as the sample time that each subset of sensing elements of the detector system is sampled for.

According to the fourth aspect of the invention is a method of communicating data, using the communication system of the third aspect, the method comprising encoding data by modulating a radiation signal and transmitting it using the transmission system and receiving the radiation signal using the detection system and sampling differing subsets of sensing elements of the detection system at differing times and determining data encoded in the radiation signal based on differences in the radiation detected by the different subsets of sensing elements.

The method may comprise using the detection system described above in relation to the first aspect.

According to a fifth aspect of the present invention is a geolocation or navigation device comprising a detection device according to the first aspect, wherein the detection device is adapted to receive radiation signals that encode location data and wherein the detection system is configured to sample differing subsets of sensing elements of the detection system at differing times and determine the location data encoded in the radiation signal based on differences in the radiation detected by the different subsets of sensing elements.

The location data may comprise a location identifier and/or coordinates. The navigation device may be configured to access a data store and access data associated with the determined location, such as a location name, location coordinates, or commercial or user interest data such as items for sale near the location, advertisements, activities available near the location and the like. The data associated with a determined location may comprise information or a presentation associated with a display or exhibit or other feature associated with the determined location, such as information or a presentation associated with a display at a determined location in a museum or with a painting at a determined location in a gallery or with a location in a historical building and so on.

The geolocation or navigation device may be comprised in or configured for use with a geolocation and navigation system, the geolocation or navigation system comprising at least one and preferably a plurality of spatially separated transmission systems according to the third aspect, each transmission system being associated or associatable with a location and configured to encode and transmit location data associated with the location and/or transmission system.

According to a sixth aspect of the present invention is a geolocation or navigation system comprising at least one and preferably a plurality of spatially separated transmission systems, the at least one transmission system comprising a light source and being configured to modulate the output of the light source in order to encode data for transmission to the detection system of the first aspect, each transmission system being associated or associatable with a location and configured to encode and transmit location data associated with the location and/or transmission system.

The geolocation and/or navigation system may be configured for use with the one or more geolocation and/or navigation devices according to the fifth aspect.

According to a seventh aspect of the present invention is an apparatus reporting system comprising an apparatus configured to monitor at least one parameter, the apparatus comprising at least one transmission system, the at least one transmission system comprising a light source and being configured to modulate the output of the light source in order to encode data associated with the at least one parameter for transmission to the detection system of the first aspect.

The apparatus may comprise a light source such as a light bulb. The apparatus may comprise a piece of plant or machinery. The at least one parameter may comprise a parameter of the apparatus.

According to an eighth aspect of the present invention is a method of preventing copying of an image, the method comprising displaying or encoding an image to be displayed such that the intensity of the image is varied or modulated.

The intensity may be modulated or varied by switching between one or more intensity levels. Varying or modulating the intensity of the image may comprise lowering the intensity of at least some and preferably each pixel of an image. The method may comprise switching between intensity levels of the image at a switching rate that is equal to or of the same order of magnitude as a rolling shutter scan frequency used in a camera system, for example, more than 30 times per second, preferably more than 150 times per second and most preferable more than 300 times per second.

The image may comprise a moving image such as a movie or television clip or one or more still images.

In this way, if someone tries to take an unauthorised digital photograph or movie clip of the image using a camera that employs a rolling shutter, then the resulting digital photograph or movie clip would possess bands or stripes of varying intensity, thereby spoiling the image. However, by providing this at a fast modulation rate, the changes would be imperceptible to the eye, which would only register the average intensity.

According to a ninth aspect of the present invention is image carrier medium, comprising an image, and comprising means for implementing the method of the eighth aspect.

The image may comprise a moving image, such as a movie, film, television program, video clip or the like. The image may comprise one or more still images. The image may comprise a digital image.

According to a tenth aspect of the present invention is an image display apparatus configured to display an image and adapted to implement the method of the eighth aspect.

According to an eleventh aspect of the present invention is a transmission system, the transmission system comprising at least one transmitter element, the transmission system being configured to encode at least one data symbol or element by providing one or more signals in selected transmission carriers or channels, the selection of transmission carriers or channels being representative of the at least one data symbol or element, the transmission system being configured to vary the output power of the transmission system by varying the number of carriers or channels used to encode at least some and optionally each data symbol or element.

The transmission system may be configured to perform dimming and/or vary the level of dimming, which may be used to encode at least some and optionally each data symbol or element.

Each data symbol or element may comprise one or more bits of binary data.

The transmission system may be configured to transmit communications signals in a communications system.

The transmission system being configured to encode data symbols or elements by providing one or more signals in selected transmission carriers or channels and leaving at least one unselected channel inactive or having no or reduced signal.

The transmission system may be configured to encode one or more of the data symbols or elements using spatial modulation or space shift keying. The transmission may comprise a plurality of spatially separated transmitter elements, such as radiation emitters. Each transmission carrier or channel may comprise a spatially separated transmission carrier or channel, wherein each transmission carrier or channel may be associated with at least one different and/or corresponding spatially separated transmitter element.

The transmission system may be configured to encode data symbols or elements by selectively activating and/or encoding data symbols or elements using one or more transmitter elements and/or selectively deactivating and/or not encoding data symbols or elements using one or more transmitter elements. The transmission system may be configured to selectively activate transmitter elements, such as LEDs, so as to emulate a signal waveform, which may be used to encode data symbols or elements.

The transmission system may be configured to encode at least some of the units of data using temporal modulation. Each transmission carrier or channel may comprise a different time slot.

Each transmitter element may comprise an optical transmitter, preferably one or more LEDs. The communications system may comprise an optical communications system.

Data transmitted may comprise at least a first portion of data comprising the at least one data symbol or element and at least a second portion of data comprising at least one further data symbol or element.

The transmission system may be configured to encode the first portion of data using spatial or temporal modulation, for example as spatial or temporal symbols. The transmission system may be configured to encode the further data symbols or elements as signal symbols, for example, by using amplitude or phase modulation.

The transmission system may be configured to encode the further data elements by modulating at least one, optionally a plurality and preferably each transmission carrier or channel, i.e. by performing intra-channel or intra-carrier modulation. The intra-channel or intra-carrier modulation may comprise, for example, M-QAM modulation, on-off keying, binary phase shift keying or the like.

The signals may be receivable by a receiver. The receiver may be configured to determine intensity differences or an intensity pattern in the received signal, for example, caused by different locations of the transmitter elements. The detector may be configured to determine the data symbols or elements of the first portion of data from the determined intensity differences, for example, by comparing the determined intensity differences or pattern with reference patterns associated with reference data elements.

In this way, by providing a first portion of data encoded using spatial or temporal encoding by selection of the transmission channels used to provide signals and providing a further portion of the data by conventionally encoding the data in each signal, the bandwidth efficiency is increased relative to conventional signal modulation techniques such as 4-QAM alone. Note that the order in which encoding/decoding techniques applied is entirely interchangeable, i.e. the first portion may be encoded using conventional signal modulation, whilst the second portion may be modulated using spatial and/or temporal modulation.

The signal power output by the transmission system may be varied using the above method by varying the number of channels used to encode each data element. For example, if spatial modulation is used, a transmission system may be provided that comprises a plurality (for example four) spatially separated LEDs as transmitter elements. Each of the transmitter elements may be assigned a binary combination, e.g. 00, 01, 10 or 11. In this way a selected data element 00, 01, 10 or 11 can be transmitted at any time by activating the associated LED. The further data elements can be encoded by modulation of the output of the selected LED in the usual manner, for example, by using 4-QAM. In this way, each data element is transmitted using one selected transmitter element in the form of an LED from the four LEDs at a time and the dimming level is 25%. However, the data elements may also be encoded based on which LED is switched off rather than which LED is switched on. For example, instead of emitting light on a second LED from the four LEDs to encode the data element 01, the first, third and fourth LED may be turned on and the second LED may be turned off. In this case, the dimming level of the transmitter is 75%. The data elements may be similarly encoded using combinations of two LEDs switched on and two switched off and assigning combinations to represent particular data elements. In this way 50% dimming may be achieved.

Similar effects may be achieved using time slots or frequency slots (sub carriers) rather than spatial separation. In this case, the dimming is achieved by varying the proportion of a time slot or frequency slot (sub carrier) that the transmitter elements are active for in order to encode the data elements.

Using the transmission system, variation in the dimming level of the transmission system can be achieved without reducing the transmission rate, which may be improved over conventional signal modulation methods.

The transmission system may be configured to encode data elements by varying the dimming and/or power and/or intensity output by the transmission system. For example, each dimming level of the transmission system may be associated with a value of a data element and the dimming level may be controlled/switched in order to encode the data elements. The dimming level may be used to encode third data elements of a third portion of the data. In this way, controlled dimming may be used to implement an M-PAM (multilevel pulse amplitude modulation) encoding scheme without the need for a digital to analogue converter at the transmitter to generate the different intensity levels. This may be used alternatively to or additionally with the modulation/encoding schemes detailed above in order to provide an alternative encoding scheme or increased bandwidth efficiency.

According to a twelfth aspect of the present invention is a method for transmitting signals in a communications system, the method comprising encoding data elements by providing one or more signals in selected transmission carriers or channels, the selection of transmission channels being representative of the data elements, and varying the output power of the transmission system by varying the number of carriers or channels used to encode each data element.

The method may comprise using a transmission system according to the previous aspect.

According to a thirteenth aspect of the present invention is a communications system, comprising a transmission system as described above and a receiver, the transmission system being configured to encode data elements by providing one or more signals in selected transmission carriers or channels, the selection of transmission channels being representative of the data elements, the transmission system being configured to vary the output power of the transmission system by varying the number of carriers or channels used to encode each data element, and the receiver being configured to receive the signals.

The receiver may be configured to determine intensity differences or an intensity pattern in the received signal, for example, caused by different locations of the transmitter elements. The detector may be configured to determine the data elements of the first data from the determined intensity differences, for example, by comparing the determine intensity differences or pattern with reference patterns associated with data elements.

According to a fourteenth aspect of the present invention is a communications method comprising encoding data elements by providing one or more signals in selected transmission carriers or channels, the selection of transmission channels being representative of the data elements, varying the output power of the transmission system by varying the number of carriers or channels used to encode each data element, and receiving the signals.

The method may further comprise determining intensity differences or an intensity pattern in the received signal, for example, caused by different locations of the transmitter elements. The method may comprise determining the data elements of the first data from the determined intensity differences, for example, by comparing the determined intensity differences or pattern with reference patterns associated with data elements.

According to a fifteenth aspect of the invention is a receiver for use with the transmission system and/or the communication system as described above, the receiver being configured to determine intensity differences or an intensity pattern in a received signal and determine data elements from the determined intensity differences.

The receiver may be configured to compare the determine intensity differences or pattern with reference patterns associated with data elements in order to determine the encoded data element.

According to a sixteenth aspect of the invention is a method for receiving a signal from the transmission system and/or in communication system as described above, the method comprising determining intensity differences or an intensity pattern in a received signal and determining data elements from the determined intensity differences.

According to a seventeenth aspect of the invention is a transmission system for transmitting data as part of a communications system, the data comprising a plurality of data symbols or elements, the transmission system being configured to divide the data into at least a first data portion and a second data portion, wherein the first data portion is communicated by transmitting signals in selected carrier channels, wherein the transmission system is configured to encode at least one data symbol or element by selecting a relative order of at least one first carrier channel having a first operational state and at least one second carrier having a second operational state.

One of the first or second operational states may comprise a signal being carried by the associated carrier channel. The other of the first or second operational states may comprise an inactive and/or unused and/or zero state carrier channel or transmitting a signal at a level that is lower or otherwise distinguishable from the signals of the first state.

The data symbol or element may comprise at least one bit of binary data.

The signals being carried by the carrier channels may comprise a modulated or encoded signal, such as a M-QAM signal. At least one of the signals being carried by the carrier channels may modulate or encode the second data portion.

The carrier channels may be sequential.

For example, one of a data bit 0 or 1 may be encoded by providing a signal on a preceding or first carrier channel of a pair of carrier channels and leaving a following or second carrier channel of the pair of carrier channels inactive. The other of data bits 1 or 0 may be encoded by leaving the preceding or first carrier channel of the pair of data carrier channels inactive and providing a signal on the following or second carrier channel.

At least one and optionally each carrier channel may comprise a different frequency band or channel. At least one and optionally each carrier may comprise a different time slot. At least one and optionally each carrier may comprise a different spatial position, for example, or a transmitter element such as an LED.

The number of first carrier channels may be equal to the number of second carrier channels.

The encoding may be based on a predetermined look-up table or the like. The encoding may be based on an algorithm that matches blocks of bits to a combination of carrier channels within a sub-block of the total number of carrier channels.

The transmitter may be configured to convert at least one bipolar signal into one or more unipolar signals by transmitting only the absolute values of a bipolar signal and encoding the signs separately. The signs may be encoded within the same frame, preceding frames, or following frames. The signs may be encoded within the relative order of the carrier channels, which may be frequency, time, or spatial carrier channels, and may be encoded as symbols that modulate the carrier channels, or may be encoded in a separate modulation scheme on a separate part of the transmission stream. The signs may also be conveyed to the destination on a separate transmission channel, or a separate part of the communication system.

Signs, phase or other information may be transmitted using spatial and/or spectral modulation. For example, a first transmitter element, such as a first LED, may be activated when the sign is positive, and a second transmitter element, such as a second LED, may be activated when the sign is negative. Similarly, at least a pair of LEDs having different colours or an LED configured to produce two or more colours (e.g. by varying it's temperature) may be provided and the respective differing colours may be associated with positive or negative signs respectively.

These techniques used to transmit signs need not be limited to transmission of signs, e.g., they could be used to transmit other data such as phase information. For example, phase information may be encoded in the spatial domain, which may comprise use of a transmitter with a plurality of transmitter elements, such as LEDs, wherein use of selected transmitter element may be indicative of a different phase.

For example, the first transmitter element may be indicative of a first phase, such as 45°, use of the second transmitter element may be indicative of a second phase, such as 90°, use of the third transmitter element may be indicative of a third phase such as 135° and use of the fourth transmitter element may be indicative of a fourth phase such as 0°. Whilst it will be appreciated that the above example uses four phases and transmitter elements for use with QPSK signals, it will be appreciated that other encoding schemes and numbers of transmitters/phases may be used.

In a specific but non-limiting example, the transmitter may be configured to convert at least one multipolar signal into two or more unipolar signals. The unipolar signals may comprise, for example, time resolved signals/signals modulated in the time domain and/or frequency resolved signals/signals modulated in the frequency domain and/or spatially resolved signals/signals modulated in the spatial domain. At least one of the unipolar signals may be inactive or have zero intensity or at least an intensity that is distinguishable from any signal intensity used in at least one other of the unipolar signals. At least one other of the unipolar signals may have a magnitude that is equal or equivalent to a magnitude of the multipolar signal. The transmitter may be configured to encode a sign (e.g. positive or negative) of the multipolar signal by using a relative order of at least two of the converted unipolar signals. For example, if the unipolar signal having the same magnitude as the original signal is provided first and the inactive signal is provided second, then this may be representative of a positive signal having a magnitude equal to the first converted signal and if an inactive or zero converted signal is provided first and a converted signal having the magnitude of the original signal is provided second, then this may be representative of a negative signal having a magnitude that is equivalent to the magnitude of the second signal. It will be appreciated that the orders used to represent positive and negative signals may be reversed if preferred.

According to an eighteenth aspect of the invention is a method for transmitting data in a communications system, the data comprising a plurality of data symbols or elements, the method comprising dividing the data into at least a first data portion and a second data portion, communicating the first data portion by transmitting signals in selected carrier channels, wherein the relative order of at least one first carrier channel having a first operational state and at least one second carrier having a second operational state is representative of each data symbol or element of the first data portion.

The method may comprise using a transmitter as described above.

According to a nineteenth aspect of the invention is a communications system comprising a transmission system as described above and a receiver for receiving a data signal from the transmission system, wherein the receiver is configured to determine the relative order of at least one carrier channel having a first operational state and at least one second carrier channel having a second operational state in order to determine at least a portion of the data.

According to a twentieth aspect of the present invention is a method of communicating data that comprises a plurality of data symbols or elements, the method comprising:
dividing the data into at least a first data portion and a second data portion, communicating the first data portion by transmitting signals in selected carrier channels, wherein the relative order of at least one first carrier channel having a first operational state and at least one second carrier having a second operational state is representative of each data element or symbol of the first data portion;
receiving the signal from the transmission system, determining the relative order of the at least one carrier channel having a first operational state and the at least one second carrier channel in order to determine at least the first portion of the data.

The method may comprise a method as described above and/or comprise use of a transmission system as described above and/or a communications system as described above.

According to a twenty first aspect of the invention is a transmitter and/or encoder for transmitting and/or encoding at least one bipolar signal, the transmitter and/or encoder being configured to encode a magnitude or absolute value of the at least one bipolar signal into at least one unipolar signal and further configured to encode and/or transmit a sign or phase of at least one bipolar signal separately and/or differently to the corresponding magnitude or absolute value of the at least one bipolar signal.

The signs or phases of the at least one bipolar signal may be encoded within the same frame, preceding frames, or following frames. The signs or phases may be encoded within the relative order of carriers that carry the unipolar signals, which may be frequency, time, or spatial carriers, and may be encoded as symbols that modulate the carriers, or may be encoded in a separate modulation scheme on a separate part of the transmission stream. The signs or phases may also be conveyed to the destination on a separate transmission channel, or a separate part of the communication system.

Optionally but not essentially, the transmitter and/or encoder may be configured to encode each bipolar signal into two or more corresponding unipolar signals, which may be encoded on first and second carrier channels. The transmitter may be configured to encode the sign or phase of the bipolar signal based on the relative order of the first and second operational states. One of the first or second operational states may be indicative of the magnitude or absolute value of the bipolar signal.

According to a twenty second aspect of the present invention is a receiver for receiving a signal from a transmission system, the receiver being configured to receive at least one unipolar signal from the transmission system, determine a magnitude of at least one bipolar signal from the at least one unipolar signal and determine a sign or phase of the at least one bipolar signal, wherein the sign or phase of the at least one bipolar signal is encoded and/or transmitted separately and/or differently to the corresponding magnitude of the at least one bipolar signal.

The receiver may be configured to reconstruct the bipolar signal using the determined magnitude and sign or phase of the bipolar signal.

The signs or phases of the at least one bipolar signal may be encoded within the same frame, preceding frames, or following frames. The signs or phases may be encoded within the relative order of the carriers, which may be frequency, time, or spatial carriers, and may be encoded as symbols that modulate the carriers, or may be encoded in a separate modulation scheme on a separate part of the transmission stream. The signs may also be conveyed to the destination on a separate transmission channel, or a separate part of the communication system.

Optionally but not essentially, the receiver may be configured to determine the relative order of at least one carrier channel having a first operational state and at least one second carrier channel having a second operational state in order to determine the sign or phase of the bipolar signal based on the relative order of the first and second operational states.

The receiver may be configured to receive a signal from a transmission system as described above and/or be configured for use in a communications system as described above.

According to a twenty third aspect of the present invention is a method for decoding a signal received from a transmission system, the method comprising receiving at least one unipolar signal from the transmission system, determining a magnitude of at least one bipolar signal from the at least one unipolar signal and determining a sign or phase of the at least one bipolar signal, wherein the sign or phase of the at least one bipolar signal is encoded and/or transmitted separately and/or differently to the corresponding magnitude of the at least one bipolar signal.

The method may comprise receiving a signal sent using the method as described above or from a transmission system as described above.

According to a twenty fourth aspect of the present invention is a method of converting at least one bipolar signal into at least one unipolar signal, the method comprising determining a sign or phase of at least one component of the bipolar signal, encoding and/or transmitting the absolute values of a bipolar signal in the unipolar signal and encoding and/or transmitting the sign or phase of the at least one bipolar signal separately and/or differently to the encoding and/or transmitting the absolute values of a bipolar signal.

For example, the method may comprise converting at least one of the components of the multipolar signal into corresponding first and second unipolar signal components. The first and second unipolar signal components may have different amplitudes or magnitudes. The order of the first and second unipolar signal components may be dependent on the sign or phase of the corresponding multipolar signal component.

At least one of the first or second unipolar signal components may be indicative of the intensity or magnitude of the corresponding multipolar signal component. The other of the first or second multipolar signal components may have an amplitude or magnitude of zero and/or comprise an inactive or empty carrier channel.

The order of the first and second unipolar signal components over time may be dependent on the sign or phase of the corresponding multipolar signal component. The first and second unipolar signal components may be resolved and/or separated in the time, frequency and/or spatial domains.

According to a twenty fifth aspect of the present invention is a computer program product adapted to implement the apparatus or method of one or more of the preceding aspects.

According to a twenty sixth aspect of the present invention is a carrier medium comprising the computer program product of the twenty fifth aspect or a programmable apparatus when programmed with the computer program product of the twenty fifth aspect.

It will be appreciated that features analogous to those described above in relation to any of the above aspects may be equally applicable to any of the other aspects.

Apparatus features analogous to those described above in relation to a method and method features analogous to those described above in relation to an apparatus are also intended to fall within the scope of the present invention.

BRIEF DESCRIPTION OF THE DRAWINGS

Examples of the present invention will be described in relation to the following drawings:

FIG. 16 schematically illustrates a suitable encoding/transmitter apparatus;

FIGS. 17A to 17G schematically illustrate an example of how information (FIG. 17A) is divided into a first information portion (FIG. 17B) and a second information portion (FIG. 17C), the allocation of different modulations types to different orthogonal subcarriers based on the first information portion (FIG. 17D), which symbols from the second information portion are modulated onto which subcarriers (FIG. 17E), the recovery of a data word representing the first information portion (FIG. 17F) and the recovery of a data word representing the second information portion (FIG. 17G);

FIGS. 18A to 18I schematically illustrate an example of how information (FIG. 18A) is divided into a first information portion (FIG. 18B), a second information portion (FIG. 18C) and a third information portion (FIG. 18D), which different modulations types are allocated to which orthogonal subcarriers based on the first information portion (FIG. 18E), which symbols from the second information portion are modulated onto which subcarriers and which symbols from the third information portion are modulated onto which subcarriers (FIG. 18F), the recovery of a data word representing the first information portion (FIG. 18G), the recovery of a data word representing the second information portion (FIG. 18H) and the recovery of a data word representing the third information portion (FIG. 18I);

DETAILED DESCRIPTION OF THE DRAWINGS

Embodiments of the present invention relate to systems that time modulate radiation to encode and transmit data or other information. In a specific embodiment that relates to light communications, the intensity of light produced from a light source is modulated over time in order to encode data or other information. A photo-detector can then be used to receive the time-modulated signal which is decoded to reveal the data which was transmitted by the illumination source.

A digital camera can be conveniently used to receive the modulated light signal, which is then processed to extract the encoded data. In order to achieve an acceptably quick transmission rate and/or achieve communication without too much noticeable light flickering by the transmitting light source(s), the photo-detector must meet certain requirements, for example, by having an image capture rate (i.e. frames per second) above a certain minimum that is dependent on the application. However, at the same time, it would be beneficial if such communications methods could be used with common or off the shelf apparatus.

In particular, it would be beneficial to be able to use a portable communications device that comprises a digital camera, such as a smart phone or tablet computer to receive and process the modulated light signals or to use the apparatus commonly used in such devices to provide a low cost, readily available receiver. However the image capture rate (frames per second) of the cameras provided with such devices is often too low to permit a desired data transmission rate to be achieved. For example, digital cameras used in portable devices typically have frame capture rates of less than and up to 30 frames per second. If a visible light signal was captured at one sample per frame then the maximum bit rate would only be 30 bits per second. In addition, data transmission at these slow rates may result in excessive flickering of the light source, which can be disconcerting and off putting for users.

Advantageously, the present inventors have found that a previously undesirable artefact of camera devices that use rolling shutter techniques in order to capture images can be advantageously used to increase the data receiving rate of light communication systems.

Figure 1:
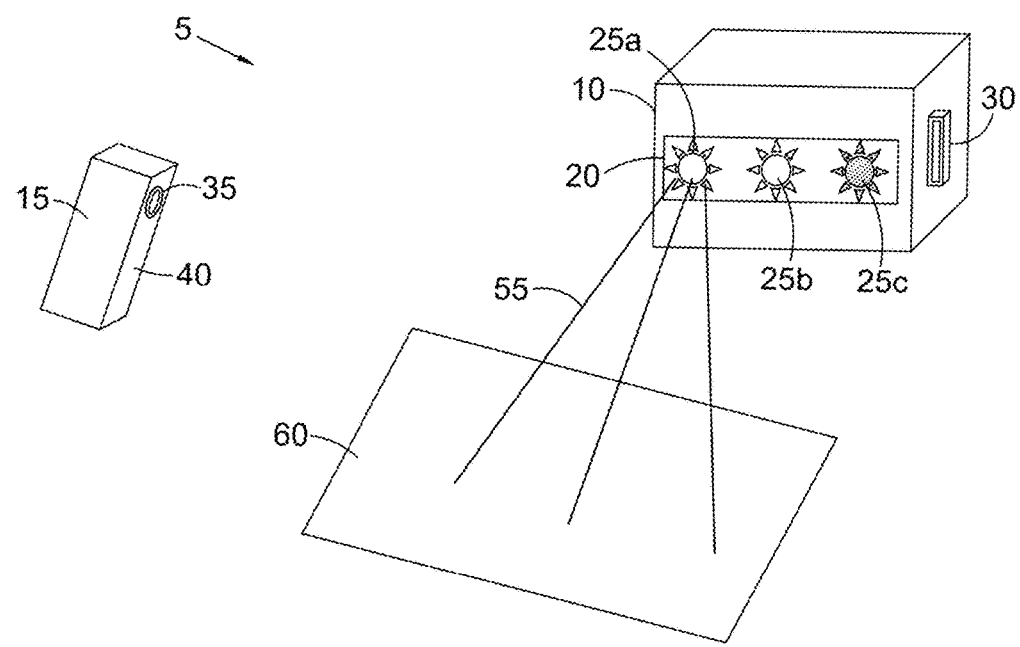
FIG. 1 is a schematic of communication system.

FIG. 1 shows a communications system 5 that operates using light modulation to encode and transmit data. The system comprises a transmitter 10 and a receiver 15.

The transmitter comprises a light source 20, such as a light source comprising one or more LEDs 25a, 25b, 25c. The light source 20 is coupled to a transmitter processor 30 that converts data to be transmitted into a modulation scheme indicative of the data. In the present embodiment, the modulation used comprises intensity modulation of the light emitted by the light source 20. Specifically, use of on-off intensity modulation is described. However, it will be appreciated that other intensity modulation schemes, such as multi-level intensity modulation, may also be used. It will also be appreciated that alternative or additional modulation schemes such as colour or spatial modulation may be used.

Figure 2:
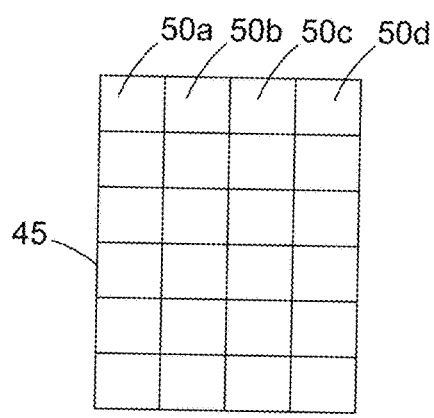
FIG. 2 is an expanded view of a photodetector of a detection system for use in the communications system of FIG. 1.

The receiver 15 comprises a digital camera 35. In the present embodiment, the digital camera 35 is conveniently incorporated into a portable electronics device 40 such as a smart phone, a tablet computer or a palmtop computer, as shown in FIG. 1. The digital camera 35 comprises a CMOS photodetector array 45 that comprises a pixelated grid matrix of photodiodes, as is known in the art, and shown in FIG. 2. The portable electronics device 40 is configured to operate the camera 35 using a rolling shutter or a line scan method. In this way, when an image is to be taken using the camera 35, the portable electronics device 40 sequentially samples the CMOS photodetector array 45 one line 50a, 50b, 50c, 50d (i.e. a column or row) of photodiodes at a time to generate corresponding columns or rows of an image until all of the lines of the photodetector 45 have been sampled. Each of the rows or columns of the image collected using each of the lines of pixels of the CMOS photodetector 45 are subsequently combined to produce an entire image. Although such rolling shutters or line scans are often produced electronically by sequentially sampling lines of pixels of the detector, it will be appreciated that the rolling shutter may alternatively be implemented using other techniques, such as a mechanical shutter.

By using a rolling shutter, the processing resource required to collect the image is greatly reduced, thus allowing a lower cost camera arrangement and reducing the processing overhead required relative to systems that collect the entire image concurrently (i.e. a global shutter). Furthermore, it is possible to increase the sensitivity of the detector. However, in some situations, the use of this technique can also result in undesirable artefacts in the image obtained. For example, if an image of a fast moving object is being taken, the resulting image can appear skewed, since each line of the image is taken at a different time period and not simultaneously. Therefore, a fast moving object often moves in the time between each line of the photodetector being sampled such that the corresponding lines of the image are not in register, resulting in the fast moving object appearing smeared or skewed in the resulting image. Furthermore, if the lighting conditions change suddenly or rapidly during the collection of the image, then this can result in a change in brightness and/or contrast of the image across the image. The change in brightness and/or contrast may be continuous or result in bands of varying brightness and/or contrast in the picture depending on the speed of the change in lighting relative to the scan rate of the detector. This effect may result from, for example, a camera flash being fired during only part of an image collection (and thereby affecting some scanned lines but not others) or as a result of strobe lights (e.g. the flashing lights of emergency vehicles) or during light bursts having varying intensity, such as lightning. These artefacts are typically undesirable, and it is usual for manufacturers and users to wish to minimise or eliminate these effects.

However, in at least one embodiment of the present invention, artefacts of the rolling shutter are advantageously used to increase the data collection rate of the detector when used as a receiver 15 for a visible light communications system 5. In this case, the transmitter processor 30 modulates data that comprises a header, a payload and a tail, into a light signal 55 by modulating the light produced by the light source 20. In this embodiment the modulation is by intensity modulation of the produced light, and specifically by on-off keying (OOK). In this case, the light source 20 is turned on and off, each of the on- and off states representing a different binary bit.

The suitably programmed and configured portable electronics device 40 is used to collect an image that is illuminated by the modulated light source 20. In this case, the camera 35 is pointed at a surface 60 illuminated by the light source 20, or alternatively can be pointed towards the light source 20 itself. A processor of the portable device 40 activates the camera 35 in order to capture one or move images illuminated by the light source 20. The captured images can comprise one or more "still" images or the captured images can be comprised in a movie, for example as frames of the movie.

The light source 20 is modulated at a rate that is correlated with or in the range of the rolling shutter or line scan rate of the camera 35. For example, the intensity of the light source 20 can be modulated at a predetermined rate that is equivalent to the time taken for a predetermined number of lines of the photodetector 45 to be scanned or sampled. For example the predetermined rate could be equivalent to the time taken to scan or sample one or alternatively two or more columns 50a, 50b, 50c, 50d or rows of the photodetector 45 in order to minimise synchronisation effects. It will be appreciated that the modulation rate need not exactly correspond to a line scan rate (e.g. due to differences in synchronisation between the transmitter 10 and receiver 15) and that the technique would still work if the majority of a particular data collection period corresponded to receiving the desired light intensity, such that once the signal is averaged or binarised over all of the photodiodes in the row or column 50a, 50b, 50c, 50d of the photodetector 45, the various intensity levels of the modulation scheme can still be discriminated.

In this way, the images collected by the digital camera 35 will contain horizontal or vertical stripes 65 of differing brightness or intensity corresponding to the switching on or off of the light source 20 that encodes the OOK data. The processor of the portable device 40 can then decode these stripes 65 to reveal the encoded data.

Using this technique, the maximum rate of the data transfer is determined by the camera 35 itself. For example, in video camera mode, an Apple iphone 4 has 720 horizontal lines (720 rows of pixels) and the frame rate is 30 frames per second. In theory, up to 720×30=21,600 samples per second can be obtained due to the rolling shutter. However, since the transmitter may not be synchronised to the camera clock, a bit of information (i.e. a pulse of illumination, or period of light or dark) may lie between the samples and so the actual data rate may advantageously be made lower than the theoretical maximum rate to avoid the need for accurate synchronisation. For example, the data rate used may be 10 kbit/s.

The image could optimally be taken of a plain, light coloured surface 60. However, any illuminated surface 60 or even object can be used, since the "image noise" can be removed by post-processing. The image does not need to be focussed.

The received images are decoded by measuring the average intensity of each row (or column 50a, 50b, 50c, 50d, depending on which is scanned as part of the rolling shutter) of the image and the intensities normalised between 100% and 0%. After any filtering and normalisation the data can be obtained via a binary threshold.

Figure 3A:
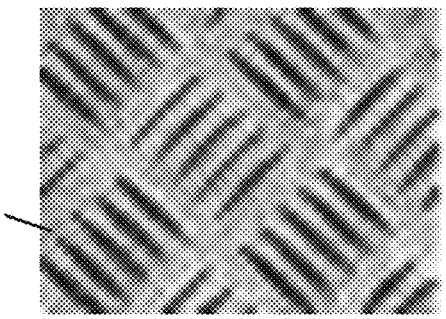
FIG. 3a is an image generated by a detector of the system of FIG. 1.
Figure 3B:
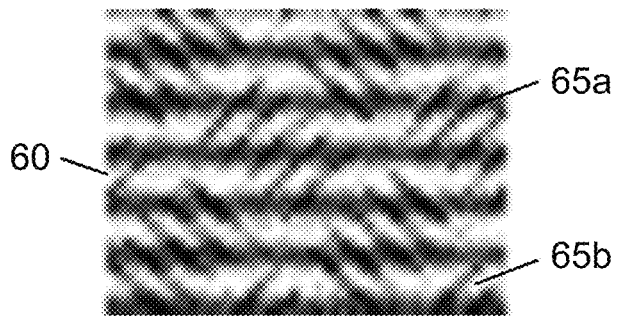
FIG. 3b is another image generated by the detector of the system of FIG. 1.
Figure 3C:
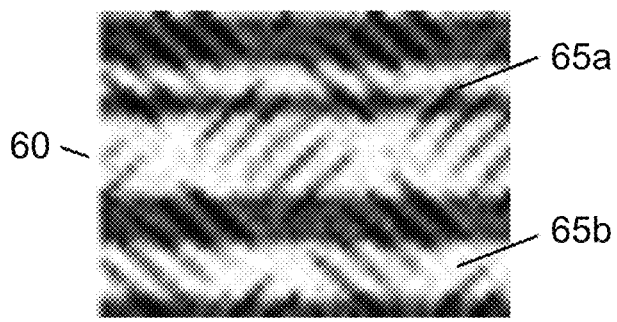
FIG. 3c is another image generated by the detector of the system of FIG. 1.

As an example, the surface 60 shown in FIG. 3a is illuminated using an LED based light source 20. The surface is illuminated by a white LED lamp. FIG. 3a shows the image collected when no modulation is applied to the light source 20. FIG. 3b shows the image obtained when the LED 20 has been modulated by a square wave, i.e. in a 101010101010 sequence. In this case, each of the dark bands 65a correspond to 0's whilst the light bands 65b correspond to 1's (although the inverse may be alternatively used). FIG. 3c shows the image collected when the LED 20 is modulated with data using OOK and the data sequence shown is decoded as 001011100110. In this case, the variation in intensity detected within each image collected can be advantageously used to determine data encoded in a modulated light signal at a higher detection rate than would be possible if each frame/image was used to detect each bit of information, by utilising an artefact of rolling shutter or line scan techniques that was conventionally considered to be generally undesirable.

The portable device 40 is configured to apply post-collection processing to the collected images. For example, image processing can be used to remove the background from the collected image(s). This is particularly beneficial if the camera 35 is pointed at an object rather than a blank surface 60 or the light source 20 itself. A particularly unfavourable background is one having horizontal stripes which run parallel to the rows of the photodetector 45. In this case, if background removal is not performed, then this can cause false readings in the data extracted from the image. Two examples of suitable methods for reducing the image noise are detailed below, which may be used alone or in combination. However, it will be appreciated that a skilled person could apply other suitable noise reduction and/or background cancellation techniques.

As an example of a background removal/noise reduction method, an entire frame or several frames could be periodically collected with no modulation of the light produced by the light source 20 (or the light being provided at a known intensity). In this way, an image such as that shown in FIG. 3*a* is obtained. The image within these un-modulated frames can then be filtered out of subsequent frames that are subject to data modulated illumination in order to remove noise due to the background image.

As another example of a background removal/noise reduction method, a series of frames/images that comprise illumination using modulated light can be averaged to obtain the background image, which can then be subtracted from subsequent frames/images. This method advantageously generates the background image "in use" and does not require the system to take a dedicated background image under specified lighting, thereby increasing the time available for transmitting data. However, this method may require a good balance of ones and zeros in the signal and averaging may need to be carried out over several frames/images in order to obtain an acceptable background image. This technique is also particularly suited to slow moving images (when the camera is held still). However, filtering across adjacent lines of the detector to normalise the intensities can be used to reduce some of the noise caused by zero/one imbalances.

The portable device 40 is optionally configured to apply brightness and contrast normalisation. If an image is bright in one area and dark in another area, the image can be normalised. This variation in brightness/contrast within the background image might be caused by, for example, less light falling on parts of a surface or by the differing reflective properties of the surfaces within an image. Adjusting or normalising the brightness and contrast over the area of an image can make it easier for the data to be recovered.

Another technique that is optionally applied is clock recovery. To minimise errors in the decoding of the data, the timing of each bit must be known with a reasonable degree of accuracy. This can be done with off-line processing. For example, the transmitter clock can be assumed to be stable across many frames/images. The clock parameters to be determined are the frequency and phase and these can be determined from multiple bits and/or frames/images by detecting the position of data changes relative to the detected frame/image rows.

In addition, standard forward error correction methods can be used with the data to reduce bit errors. Because the data can be post-processed over many frames there is considerable scope for interference cancellation and other signal reconstruction techniques known in the art.

Various techniques may be used in order to increase the data transmission rate. For example, it will be appreciated that other modulation schemes may be used alternatively or additionally with the intensity modulation scheme described above.

For example, spatial modulation may be used. In a particular example of this, the light source comprises a plurality of LEDs 25*a*, 25*b*, 25*c*, the LEDs 25*a*, 25*b*, 25*c* being spatially separated, for example, in a row or column direction (depending on whether the photodetector 45 is sampled on a row by row or column by column basis respectively). In this case, the data may be encoded temporally by exploiting the rolling shutter or line scan method, as detailed above, and also spatially in order to increase the data transmission rate.

As another additional or alternative modulation example, colour modulation can be used. In this case, the light source is provided with a plurality of light emitters 25*a*, 25*b*, 25*c* of varying colour or is provided with one or more light emitters 25*a*, 25*b*, 25*c* whose colour is changeable and/or selectable, for example by varying the colour temperature of the required light emitter 25*a*, 25*b*, 25*c*. In this way, further data may be encoded by modulating and detecting/extracting data by colour, or colour temperature. In a particularly advantageous example of colour modulation, colour shift keying can be used where a mix of different colours is used in certain combinations to convey different bit sequences, to thereby increase the data transmission rate.

Furthermore, varying intensity modulation schemes can be used to encode the data. For example, although the embodiment of the invention that is described above uses on-off keying, it will be appreciated that a multi-level intensity modulation scheme may be used to encode the data, in which a three or more pre-determined intensity levels can be assigned to represent given data elements rather than just on or off, in order to increase the data transmission rate.

In addition, techniques known in the art of telecommunications such as Interference cancellation and multi-user detection can be used for multiple user access and removal of co-channel interference such as successive interference cancellation, joint detection, joint transmission, precoding techniques (e.g., dirty paper coding), superposition coding or minimum mean square error (MMSE) estimation. Alternatively, multiuser interference can be avoided using coordinated multiuser access using techniques such as TDMA (time division multiple access), FDMA (frequency division multiple access), SDMA (space division multiple access), or CDMA (code division multiple access).

In an embodiment of the present invention, the portable device is equipped with an ambient light sensor (not shown). These may be provided in the device to determine an overall or average light level experienced by the sensor, the results of which can be used, for example, in the calculation of exposure times for a camera 35 or to determine a parameter of an optical sensor. The ambient light sensor can optionally be utilised to improve operation of the device as a detector in a communications system 5. For example, the ambient light sensor can be used additionally or alternatively to the camera 35 to decode the data if the ambient light sensor can react and be read fast enough. In cases where both the ambient light sensor and the camera 35 are used, there is thus an alternative or secondary source of information to that received by the camera 35. The ambient light sensor can also be used as an input to any post processing, e.g. to help normalise the images.

In the examples described above, an LED based lamp or array 25*a*, 25*b*, 25*c* is used as a light source 20. However, it will be appreciated that this need not be the case. For example, the screen or monitor of another device could be used as the light source. This may be achieved by way of example through the modulation of a backlight of an LCD display or the image displayed on the monitor or screen can be varied in order to modulate the light intensity emitted by the monitor. In another example, a light source comprised in a portable device such as a mobile phone/smartphone, a tablet computer could be used. For example, the light source could comprise an LED light source provided in a portable device for illumination, for example, when taking a picture with an in-build camera. In this way, using the LED or screen of the portable device as a transmitter and a camera of a portable device as a receiver may permit device to device optical communications.

Although visible light is preferably used, it will be appreciated that non-visible portions of the electromagnetic spectrum may be used, such as infra-red or near-infra red radiation. Use of these wavelengths can be advantageous in some applications in that these wavelengths are detectable by many readily available photodetectors but are not visible to a user of the system and do not interfere with or distract their vision. Use of these wavelengths also allows use of existing systems such as presence detection systems that operate using near infra red or infra red sensors to operate as detectors in a communication system such as that described above.

It will be appreciated that the system 5 described above allows communications based on light modulation to be more widely used and lead to creative ways to communicate. For example, users may be able to download an "app" or other program that allows their smart phone or other mobile electronics device to be used to receive and utilise data communicated using light modulation.

For example, a supermarket or other store could provide various light sources 20 such as LED's in the store, each of which can be modulated to encode and repeatedly transmit an associated identifier. The store or supermarket could provide an application that, when run by the user, activates a camera 35 of the user's smart phone 40 and implements the camera operation scheme described above in order to collect and extract data encoded in the images received by the camera 35 and exploiting the properties resulting from the rolling shutter. In this way, when the camera 35 of the smart phone 40 collects an image that is illuminated by the light emitted by a particular light source, the processor of the smart phone 40 is operable to extract the identifier encoded in the light emitted by the particular light source. The downloaded application is then operable to access a look-up table or database that contains details of where the detected light source (and thereby the user) is located in the store. This location information can be used, for example, to guide the user around the store or to download comments, advertisements or offers relating to stock that is held near that location. In addition, the determined location data can also be used by the store, for example, in aggregating consumer behaviour such as who was shopping, how long they spent in each area and so on. Other examples include the ability to provide targeted promotions and/or tie the collected location data with loyalty scheme data in order to provide cross referenced information, such matching location and actual purchase data.

Another example of an application of the above transmission technique is a smart light bulb. For example, an LED light bulb may be provided that contains a processor and memory that allows it to log usage and other data such as a unique ID, lamp type and spec, the date and time it was first switched on, its on/off operations or usage since first activation, its total power consumption and the like. The data can be encoded by modulation of the light produced by the LED as described above to transmit the information. The user can then access the usage data for that particular light source, simply by pointing their smart phone 40 or other camera containing device at the light and running an application that implements the camera 35 operation and data extraction scheme detailed above in order to extract the encoded data.

Of course, other applications will be apparent to a skilled person. For example, data may be encoded within a computer program or television program or advertisement by modulating the intensity of the computer monitor or TV screen to encode the data. The user may then simply point the camera 35 of their camera based electronic device 40 (e.g. smart phone) at the monitor or screen and activate a previously downloaded application that implements the above camera operation scheme and associated data extraction. In this way, the computer program, television program or advertisement can be used to transmit an activation code to the phone which is used to determine an associated action contained in a look-up table in the phone. In this way, a degree of interaction between the computer program, television program and/or advertisement is possible using the user's mobile phone 40.

Further embodiments of the invention are now described.

Figure 4:
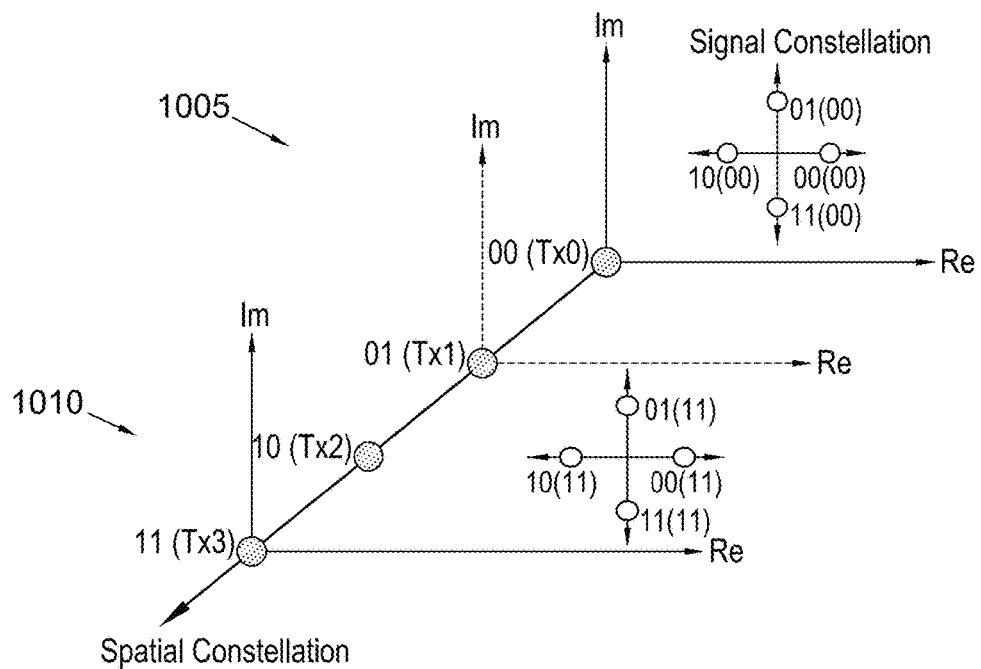
FIG. 4 is an illustration of a spatial modulation system.

FIG. 4 shows a spatial modulation system 1005 for illustrating an embodiment of the present invention. The system comprises a transmitter 1010 that, in this embodiment, comprises four transmitter elements in the form of LEDs (Tx0, Tx1, TX2, Tx3). The transmitter 1010 comprises or is communicatively linked to processing apparatus (not shown) for encoding data comprising one or more data elements (e.g. one or more bits of binary data) into light signals for transmission to a corresponding receiver (not shown) by controlling and modulating the operation of the individual transmitter elements (Tx0, Tx1, TX2, Tx3).

The receiver comprises optical detection means known in the art such as one or more CMOS or CCD photodetectors, photodiode arrays or the like, for detecting the optical signal emitted from the transmitter. The receiver, for example, may comprise the receiver 15 shown in FIG. 1. The receiver also comprises or is communicatively linked to a receiver side processing apparatus for recovering the encoded data from the received signal. The receiver is thereby configured to determine intensity differences or an intensity pattern in a received optical signal and determine data elements from the determined intensity differences. For example, the determined intensity differences or pattern is compared with reference patterns associated with reference data elements in order to determine the encoded data element.

Each transmitter element (Tx0, Tx1, TX2, Tx3) is operable to selectively transmit a 4-QAM (quadrature amplitude modulation) encoded signal. Each transmitter element (Tx0, Tx1, TX2, Tx3) is able to transmit the 4-QAM-symbol indicated by the two-bit sequences shown in bold, which will be referred to as a signal-symbol. In addition, each transmitter (Tx0, Tx1, TX2, Tx3) is assigned a unique two-bit sequence (shown in normal type); referred to this a spatial-symbol. In this way, for example, a four bit data unit can be encoded by generating a light signal by using an LED (Tx0, Tx1, TX2, Tx3) associated with two of the bits of the data unit and encoding the other two bits of the data unit in the signal using signal modulation schemes known in the art, such as 4-QAM. At every transmission step, four bits (two that constitute a signal-symbol, and two that constitute a spatial-symbol) are transmitted within the bandwidth of 4-QAM. The optical receiver is able to detect the spatial-symbol by the exploitation of intensity differences at the receiver caused by the different locations of the LEDs. The signal-symbol is decoded in a traditional way using an appropriate detector. As a consequence the bandwidth efficiency is doubled compared to pure 4-QAM.

In the Example shown in FIG. 4, if the transmitter 1010 is to send a data [0 1 1 1], then the transmitter element TX selects the transmitter element Tx1 to transmit a 4-QAM modulated signal that is representative of the bit sequence [1 1]. Since the emitter Tx1 is associated with the bit sequence [0 1], when the receiver detects an intensity distribution pattern indicative of a signal emitted from the position of Tx1, the receiver determines that the first bits are [0 1]. The receiver then decodes the modulated signal to extract the sequence [1 1] from the 4-QAM modulation scheme in the usual fashion. The original data unit of [0 1 1 1] can then be reconstructed.

In the example given above, only one out of four transmitter elements (Tx0, Tx1, TX2, Tx3) are on at any given time. In this case, the dimming is 25%. However, the transmitter 1010 is switchable between differing dimming states, i.e. different output powers or intensities, in a manner that integrates dimming and data transmission. It does this by switching between modes in which a differing number of LEDs are used to send each signal, i.e. to encode the spatial symbol. This allows for a variation in dimming levels of the transmitter 1010, and at the same time maintains the high bandwidth efficiency for digital data transmission.

For example, 75% dimming can be achieved by an inversion of the transmission convention for the spatial-symbol. Specifically, each spatial-symbol is represented by switching all LEDs on, but one. The spatial-symbol determines which LED is off. For example, if the sequence [1 0] is to be transmitted in the spatial domain, Tx2 would be switched off.

50% dimming can also be achieved by switching on two LEDs at any given time instance and having the remaining LEDs switched off. There are 4!/(2!×2!)=6 combinations for selecting two out of four LEDs, where '!' denotes factorial. With 6 combinations $\lfloor \log_2(6) \rfloor = 2$ bits can be encoded, where $\lfloor \cdot \rfloor$ denotes rounding to the lower integer.

In the above dimming scheme, two more combinations are obtained than would be required to encode 2 bits. This excess of combinations can be utilised to select the combinations that minimise the error performance at the receiver, the error performance at the receiver being determined using methods known in the art, for example, maximum likelihood (ML) detection, sphere decoding, maximum receive ratio combining (MRRC), and the like.

With the above method, the dimming is changed between 25%, 50% and 75% without affecting the transmission rate, which is still twice as high as can be achieved with conventional 4-QAM.

Although an example is described above that uses four transmitter elements (Tx0, Tx1, TX2, Tx3), this concept can be generalised to other numbers of transmitter elements. If N transmitter elements in the form of LEDs are provided in an array, the dimming level can be specified by L=(n/N)×100%, where n is the number of simultaneously active LEDs. The bandwidth efficiency, η, is the number of bits transmitted per transmission step. In conventional on-off-keying (OOK) systems, η=1. Here, η can be determined as follows:

$$\eta \lfloor \log_2(N!/(n!(N-n)!)) \rfloor$$

Figure 5:
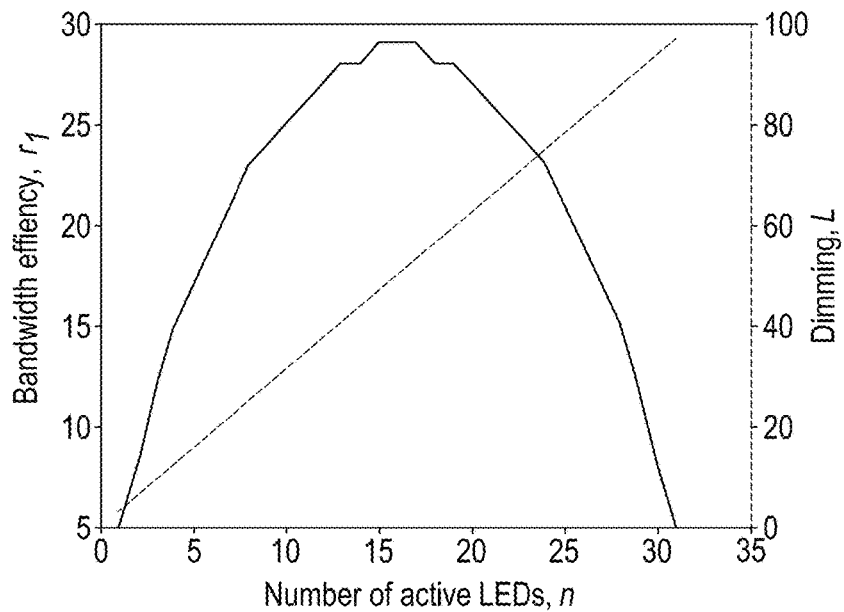
FIG. 5 is a plot of bandwidth efficiency and dimming for a spatial modulation system having thirty two transmitter elements.
Figure 6:
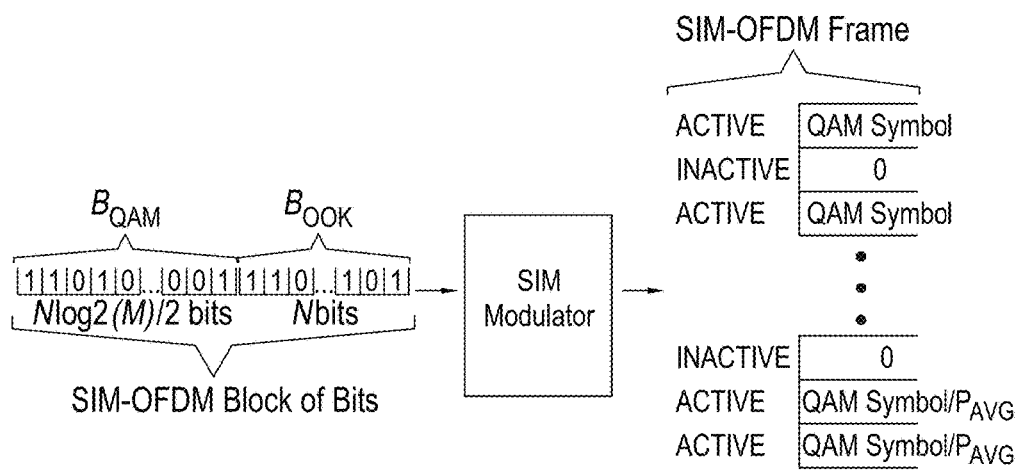
FIG. 6 is an illustration of a prior art SIM-OFDM method.

For example, for N=32, the bandwidth efficiency and corresponding dimming levels are depicted in FIG. 5.

In this example, the minimum bandwidth efficiency is five (for dimming of 1/32×100%=3.1% and 31/32=96.9%) which, for a transmitter having thirty two LEDs, is five times higher than in OOK. The bandwidth efficiency is even further improved when approaching a dimming of 50%. The maximum is achieved for 50% dimming, and is a factor of twenty nine times larger than OOK. For example, if OOK achieves 10 Mbps, with this system and 50% dimming, a transmission rate of 290 Mbps can theoretically be achieved.

Although the above example uses the spatial domain to encode a portion of the data, the same technique is also applicable to the frequency and/or time domains.

In the case of time domain encoding, instead of assigning symbols or data units to corresponding spatially separated LEDs or combinations of spatially separated LEDs, the transmitter is configured to associate time slots with particular data units or symbols. For example, the signal could be transmitted by a single LED or group of LEDs and the signal is divided into sequential time windows, each time window having, for example, four sequential time slots. In this case, the first time slot may be associated with a symbol of [0 0], the second time slot may be associated with a symbol of [0 1], the third time slot may be associated with a symbol of [1 0] and the fourth time slot may be associated with [1 1]. If the data unit [0 1 1 1] is to be sent in any given time window, then a signal in which [1 1] is encoded using conventional modulating techniques, such as 4-QAM, is sent in the second time slot. The receiver that receives the signal determines that a received signal was transmitted during the second time slot and determines that the first part of the data corresponds to [0 1]. The 4-QAM modulated signal is then demodulated to extract the data symbol [1 1] in the conventional fashion. In this way the original data [0 1 1 1] may be determined.

When using the frequency domain, e.g. using OFDM, instead of assigning symbols or data units to corresponding spatially separated LEDs or time slots, each frequency sub-carrier is associated with particular data units or symbols. In this way, switching selected subcarriers on/off can be used to encode the corresponding symbol or data unit. Therefore, information can be encoded in the frequency domain similarly to the encoding in the time and spatial domains described above. At the same time, switching off subcarriers provides an additional benefit of reducing the average output signal power.

Using the dimming method described above, the power or intensity of the signal may be varied by varying the number of time slots within each time window used to encode the data, in an equivalent manner to the variation of the number of LEDs used to transmit each signal given in the above spatial modulation based example. In this case, if the duration of the time slots is suitably small, then the observed, averaged optical power or intensity output by the transmitter is raised or lowered dependent on the number of time slots used to encode each symbol.

In the time domain, the technique becomes a form of pulse position modulation (PPM). Again using the example with N=32, this is equivalent to thirty two different time slots into which a pulse can be provided. For dimming of 1/32×100%=3.1%, only one pulse can be present but in any of the 32 slots (giving the equivalent of 5 bits of information). For dimming of 16/32×100%=50%, there are over six hundred million different combinations of sixteen pulses in any of the thirty two time slots (giving the equivalent of 29.2 bits of information).

The spatial modulation and PPM techniques can be combined to encode the data in both space and time. For example with four LEDs and eight time slots it is possible to create a space-time constellation with N=32. Thereby, the bandwidth efficiency can be increased.

The different dimming levels lead to different combination numbers and so data bits must be mapped to the potential combinations depending on the dimming level. At the receiver, the dimming level will be known and so reverse mapping can be used to decode the data.

Advantageously, the techniques for varying dimming of the transmitter described above can be used to implement a multilevel pulse amplitude modulation (M-PAM) without the need for a digital to analogue converter.

In encoding schemes that use M-PAM in conjunction with intensity modulation, the intensity level of a single optical transmitter is divided into M different intensity levels (typically M equally spaced intervals) and each intensity level is associated with a corresponding symbol or data element. Thereby, each symbol or data element of a signal can be transmitted by operating the optical transmitter to produce light at an intensity associated with that symbol or data unit.

The number of bits that can be transmitted with this scheme is $\log_2(M)$. This, however, requires a digital to analogue converter at the transmitter to generate the different power or intensity levels.

However, if there are instead M optical transmitter element (e.g. single LEDs) in an LED array, M different receive power levels can be generated by switching on one or more, i.e. 1, 2, 3, ..., M, LEDs at the same time. It is possible to control the overall power or intensity in this way because intensity signals only add incoherently (i.e., there is no fading effect as compared to radio frequency (RF)). This means, while the transmit power of each individual LED is the same, i.e., no DAC is required, the intensity at the receiver is subject to M different levels depending on how many LEDs are on at the same time. It will be appreciated that a corresponding approach based on time modulation, as detailed above, may be used instead of or additionally to spatial modulation.

In this way, M-PAM encoding may be used instead of, or advantageously in addition to, spatial or temporal modulation techniques and/or the normal amplitude or phase modulation of signals using methods such as 4-QAM to encode data, giving three encoding schemes that may be used to encode or modulate portions of the data to be transmitted and thereby increasing the bandwidth efficiency.

Further embodiments of the invention will now be described.

At least one embodiment of the present invention comprises a transmitter, having at least one radiation emitter or transmitter element for emitting a signal and a processor for modulating the radiation emitter(s) in order to encode data comprising at least one data symbol or element. Examples of suitable transmitters and/or receivers are shown, e.g. in FIGS. 1, 20, 25, and 30 to 32. Preferably but not essentially, the transmitter is an optical transmitter and the at least one radiation emitter comprises an optical transmitter such as an LED.

The signal from the transmitter is received by a receiver, comprising at least one corresponding receiving element, such as a CMOS or CCD detector or a photodiode array, and a processor for extracting the data from the received signal.

As discussed above, communications systems can be configured to transmit data using one or more of various known modulation or encoding schemes, such as OFDM and SIM-OFDM.

Figure 7:
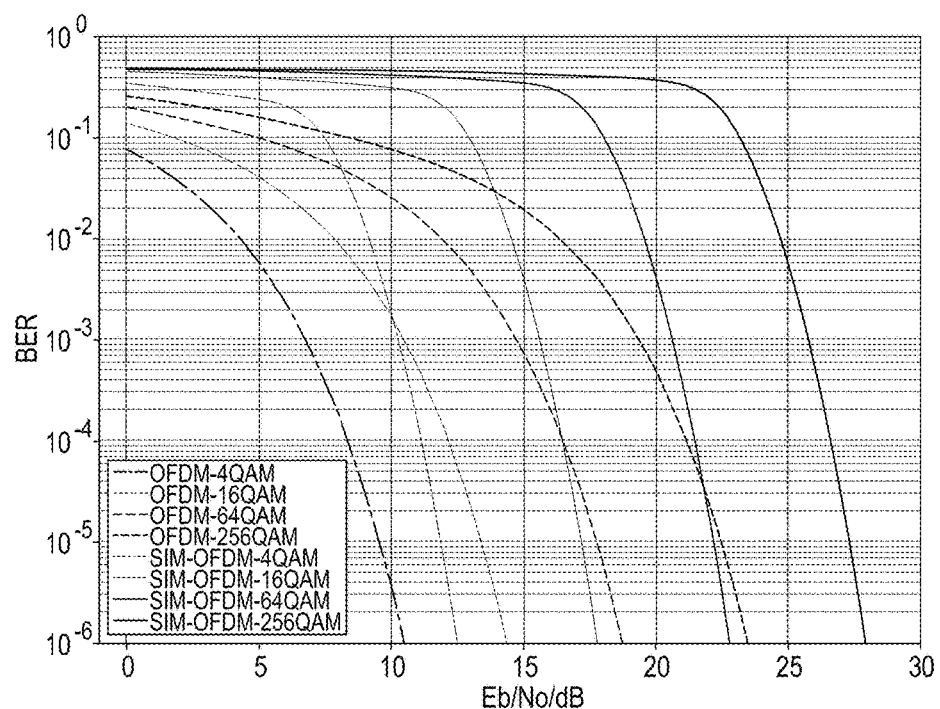
FIG. 7 is a plot showing the performance differences between SIM-OFDM and OFDM for differing QAM constellation sizes.

The authors have found by studying the SIM-OFDM method in the presence of Additive White Gaussian Noise that the expected improved system performance compared to conventional OFDM modulation techniques is not achievable, as can be seen from FIG. 7. Without wishing to be bound to any particular theory, there may be various possible reasons for this. First, using coherent on off keying (OOK) detection requires a threshold, whose level should not be higher than the power of the M-QAM symbol closest to 0. Otherwise, symbols whose power is lower than the threshold will not be detectable even under high SNR conditions and a constant BER floor will be reached above zero. The low threshold level does not allow the OOK scheme to take full advantage of the high power in each carrier for higher order M-QAM. Second, in order to correctly demodulate a given M-QAM symbol, it is not only necessary to correctly detect the state (i.e. active or inactive) of its carrier, but also the states of all carriers before it. This is necessary because incorrect detection of a carrier state causes the bits in the second sub-block ($B_{QAM}$) to be misplaced and become out of sequence, which completely destroys the M-QAM information in any subsequent active carriers.

One possible solution would be to transmit the exact number of excess carriers, $N_{ex}=N_a-N/2$, separately for each frame, just like the majority bit type is sent to the destination, where $N_a$ represents the number of active carriers. That way, instead of using a threshold for on-off keying (OOK) detection, the number of active carriers $N_a$ with the highest power can be taken as active for each frame, provided that $N_{ex}$ is securely transmitted to the destination. This technique leads to better performance, but is still insufficient. If all active carriers are used to transmit M-QAM symbols, the spectral efficiency is slightly increased to:

$$\frac{E[N_a]}{N}\log_2(M) + 1 \frac{\text{bits}}{\text{carrier}}$$

where $E[N_a]$ stands for the statistical expectation of $N_a$.

Figure 8:
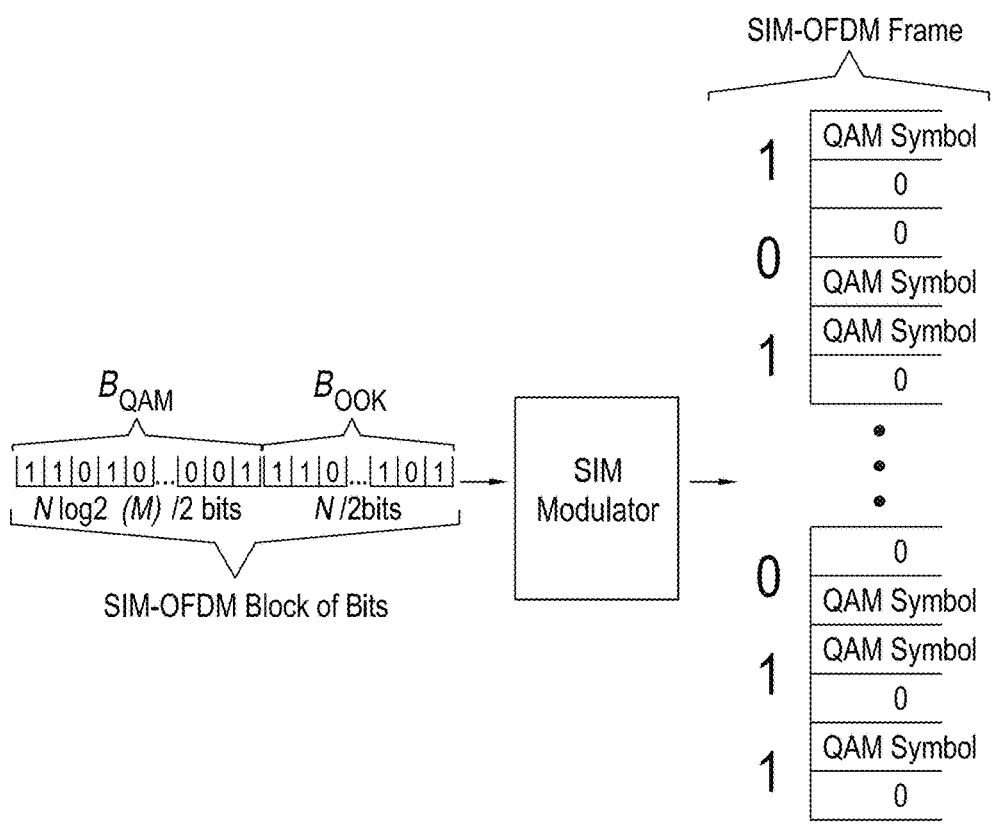
FIG. 8 illustrates an encoding or modulation method.

FIG. 8 illustrates an encoding or modulation method according to an embodiment of the present invention. As in SIM-OFDM, data is split into at least two portions, wherein a first portion ($B_{OOK}$) of the data is encoded by transmitting signals using selected carrier channels, wherein the remaining (i.e. non-selected carrier channels) are left inactive and/or at zero or low intensity. A second portion ($B_{QAM}$) of the data is encoded by modulating the active carrier channels, for example, by using amplitude modulation techniques known in the art such as M-QAM.

However, instead of using every carrier state to encode a bit (or other data element), as is the case in SIM-OFDM, the present invention uses the states of two or more carriers, in this case, a carrier pair. The processor of the transmitter is configured to encode bits in the first data portion $B_{OOK}$ by selecting which carrier from the pair is active. In this case, when a data bit 1 is encountered, the first or preceding carrier is selected to be active (i.e. a signal is provided/carried on the first or preceding carrier) and the second or following carrier is left inactive. When a data bit 0 is encountered, the first or preceding carrier is left inactive and the second or following carrier is made active (i.e. a signal is provided on it). The processor of the transmitter is configured to encode the bits in the second data portion $B_{QAM}$ by modulating all of the active carriers using an modulation scheme such as M-QAM, so that each active carrier channel encodes a data symbol or data element of the second data portion $B_{QAM}$ in the form of an M-QAM symbol.

At the receiver, once the signal is received, the processor of the receiver is configured to process the carriers in the received signal two at a time and the carrier states, active or inactive, are determined by comparing the relative power levels of each carrier in the pair. The carrier with more power is considered active. Based on the determined states of the carrier pairs, the first data portion $B_{OOK}$ is determined.

Afterwards, all of the active carriers are demodulated according to the associated demodulation scheme (in this case M-QAM) and the second portion of the data $B_{QAM}$ is reconstructed.

In this approach, it is not necessary to determine and transmit majority bit type, as the determination of which carrier is active is based on a comparison of a pair of carriers and not an individual carrier with a threshold. Using this technique, the overall spectral efficiency is slightly reduced to:

$$\frac{\log_2(M)}{2} + \frac{1}{2}\frac{\text{bits}}{\text{carrier}}$$

However, any error in the detection of the carrier states influences only the M-QAM symbol encoded in the relevant carrier.

Figure 9:
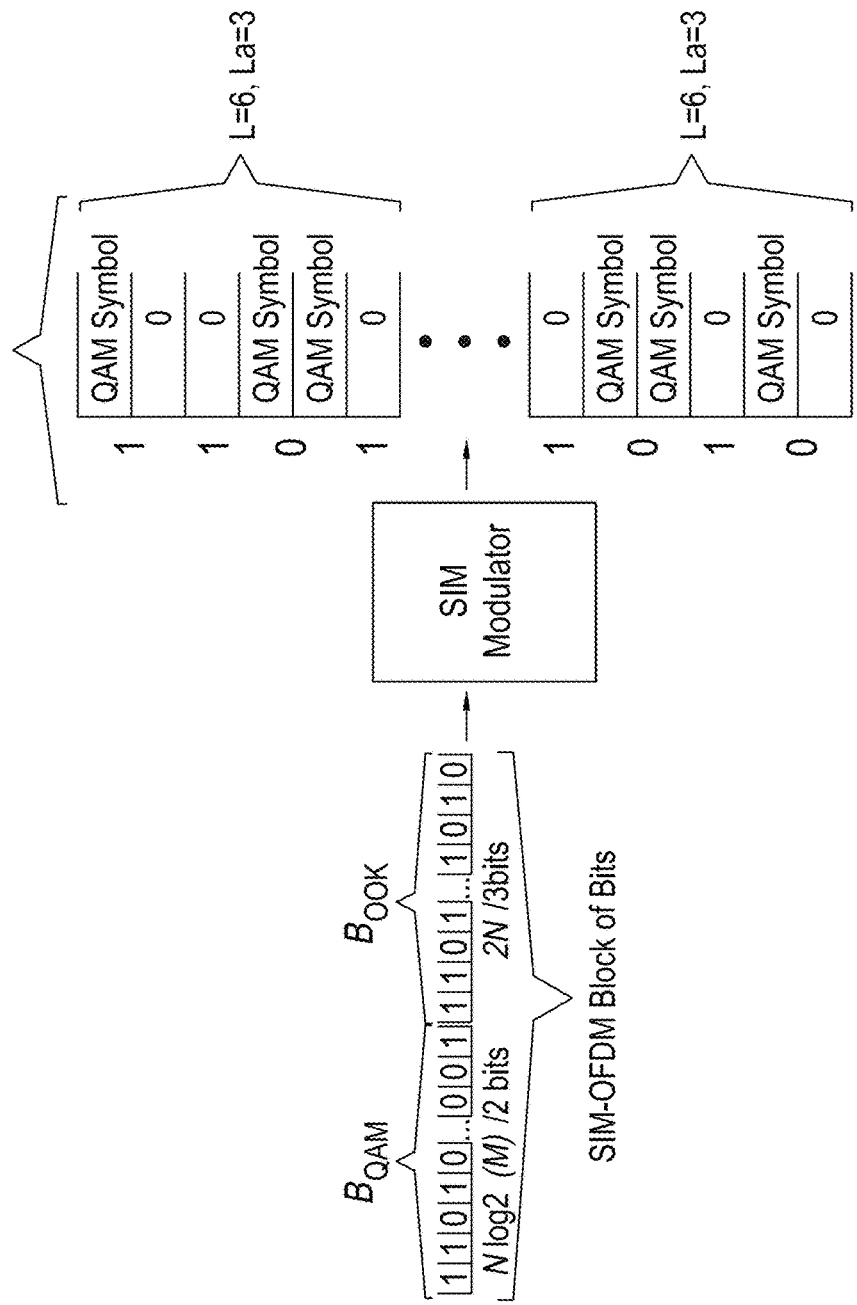
FIG. 9 shows a specific example of the method of FIG. 8, where the total number of carriers is six and the number of active carriers is three.

Optionally, the concept can be extended to using more than two carriers at a time to represent bits from the first data portion $B_{OOK}$. For example, six carriers can be used, with three carriers being set as active and the rest of the carriers being set as inactive. In this example, there are 6!/3!3!=20 possible combinations to represent bits. This means that a total of four bits ($2^4$=16<20) can be encoded in 6 carriers' states when three are active, as depicted in FIG. 9. The encoding can be based either on a predetermined table or an algorithm that matches blocks of bits to a combination of $L_a$ active carriers in a sub-block of L carriers in total. The spectral efficiency is thereby increased.

Extending this to a group of L carriers of which $L_a$ of the carriers are set as active, the spectral efficiency of the system becomes:

$$\frac{L_a \log_2 M}{L} + \frac{\left\lfloor \log_2\left(\frac{L!}{L_a!(L-L_a)!}\right)\right\rfloor}{L}\frac{\text{bits}}{\text{carrier}}$$

The BER performance can get worse as L increases, since the negative effects described for the original SIM-OFDM method appear inside each group of L carriers. As $L_a$ approaches L, the spectral efficiency of the system gets closer to that of conventional OFDM. As L approaches N, and $L_a$ approaches 1, the spectral efficiency of the system starts to resemble that of Pulse Position Modulation (PPM). As L approaches N, and $L_a$ approaches N/2, the spectral efficiency of the system gets closer to that of the former SIM-OFDM scheme. In any case, the present invention has an advantage over SIM-OFDM because it keeps a constant number of active carriers and requires no majority bit type information.

In cases where inter-symbol interference is not an issue, OFDM does not provide particular advantages to the system. In this case, the concept can be realized in the time domain in exactly the same manner, where the carriers would correspond to time samples rather than frequency carriers.

Use of the above method may result in a number of advantages over the existing SIM-OFDM technique. For example, the number of active carriers, $N_a$, is known at each instant, so it need not be transmitted and the usage of a threshold is not necessary. In addition, the number of active and inactive samples is the same in each frame, so majority bit type does not need to be relayed to the destination. Furthermore, false detection of a carrier state influences only the M-QAM symbol it encodes and the error does not propagate in the rest of the frame. Advantageously, the bit error rate vs. $E_b/N_o$ performance is improved compared to the former SIM-OFDM scheme and in certain cases compared to conventional OFDM. Additionally, peak-to-average power ratio (PAPR) is reduced relative to the SIM-OFDM and OFDM schemes and a power efficient modulation scheme for optical wireless communication is introduced.

Figure 11:
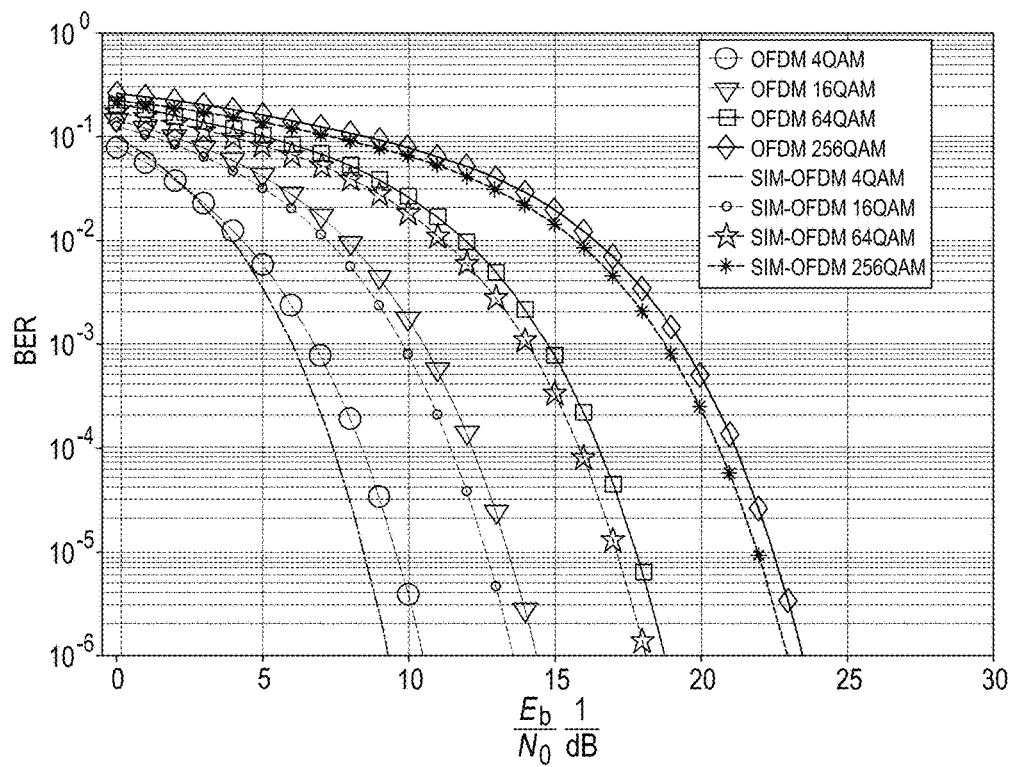
FIG. 11 shows the performance of the method illustrated in FIG. 8 relative to OFDM.

A comparison of the performance of a communications system that operates using the above encoding method relative to a corresponding system using the conventional OFDM method in the presence of Additive White Guassian Noise (AWGN) is illustrated in FIG. 11. As can be clearly seen from this, a system using the modulation/encoding scheme of the present invention achieves better bit error ratio results than the prior art systems under the same conditions.

Further research of the properties of SIM-OFDM based techniques by the present inventors have shown that such systems can achieve better peak-to-average power ratio (PAPR) than equivalent systems using conventional OFDM. For OFDM with square constellation M-QAM, the PAPR is calculated as:

$$\frac{N3(\sqrt{M}-1)}{\sqrt{M}+1}$$

A general formula for PAPR estimation is:

$$\frac{N_a 3(\sqrt{M}-1)}{\sqrt{M}+1}$$

The PAPR depends on both the number of active carriers, expressed by Na, and the way they are modulated, expressed by the ratio:

$$\frac{3(\sqrt{M}-1)}{\sqrt{M}+1}$$

The best PAPR is achieved using Frequency Shift Keying (FSK), since Na=1 and $$\frac{3(\sqrt{M}-1)}{\sqrt{M}+1}=1.$$

The worst is achieved in the case of conventional OFDM when Na=N, and both N and M are as high as possible. An advantage of the above encoding method of the present invention over conventional OFDM and SIM-OFDM comes from the fact that in general it requires less active carriers to represent the same amount of information.

Figure 10A:
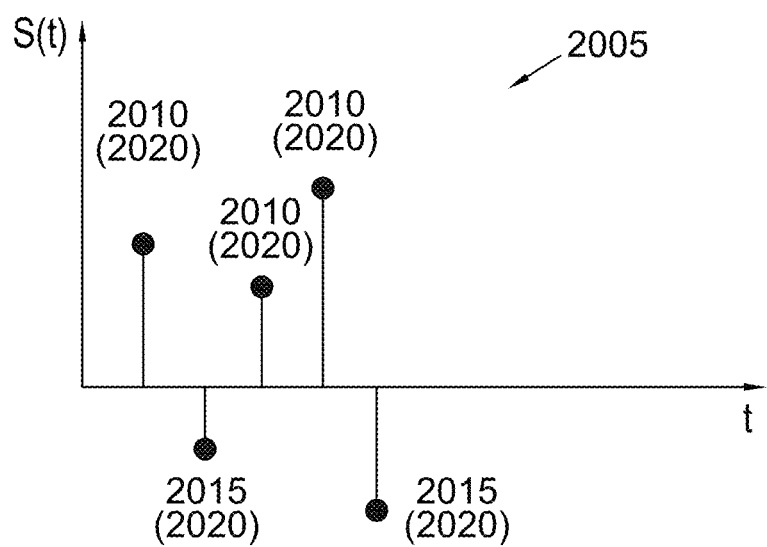
FIG. 10a shows an OFDM signal in the time domain.
Figure 10B:
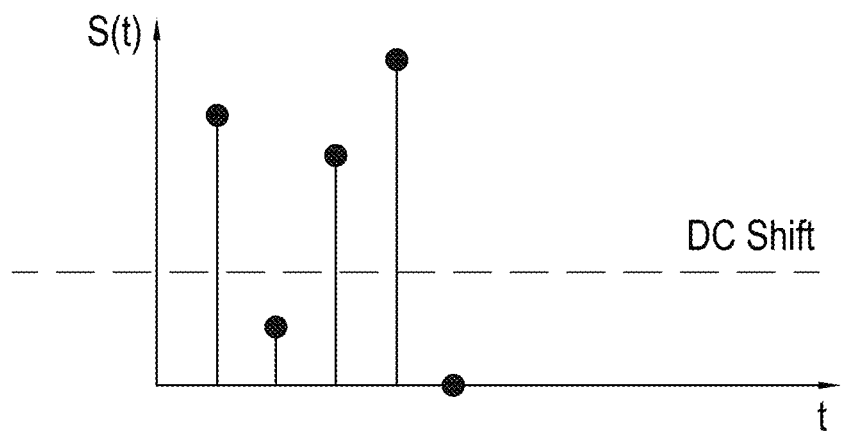
FIG. 10b shows the OFDM signal of FIG. 10a that has been subjected to a DC shift.

For the particular purpose of optical wireless communication using intensity modulation (IM) at the transmitter and direct detection (DD) at the receiver, another embodiment of the present invention can be realized. In optical communication systems, there is an issue with using optical communications systems to transmit bipolar data signals 2005, i.e. signals having both positive 2010 and negative 2015 signal components, as an optical transmitter such as an LED can generally only transmit positive real signal values. In OFDM, N time domain samples 2020 of a real OFDM frame with N carriers are obtained after the required modulation steps, as shown in FIG. 10*a*. Such a signal is made real for the purposes of IM/DD communication. Additionally, the OFDM signal can be made positive by introducing a DC shift as depicted in FIG. 10b. This approach is known as DCO-OFDM.

An alternative approach is known as ACO-OFDM in which properties of Fourier transforms are exploited so that a positive signal can be obtained in the time domain by simply ignoring (cutting off) any negative values. However, this approach has half the spectral efficiency of DCO and half the power efficiency for bipolar signals.

Figure 10C:
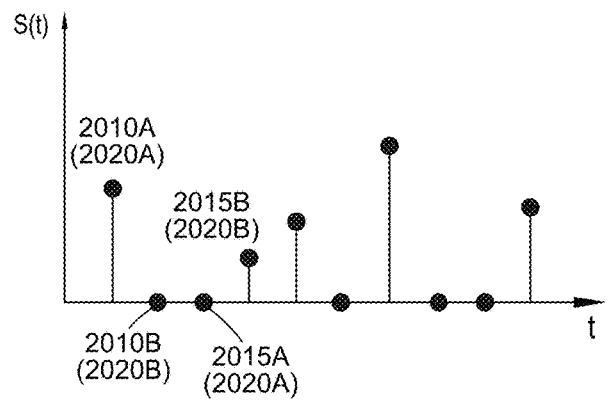
FIG. 10c shows the OFDM signal of FIG. 10a transformed using the method of an embodiment of the present invention.

An embodiment of the present invention (referred to as Unipolar orthogonal frequency division multiplexing, U-OFDM, by the present inventors), provides a more elegant solution, that outperforms ACO. As shown in FIG. 10c, in the U-OFDM method according to an embodiment of the present invention, each time sample 2020 of the bipolar OFDM signal of FIG. 10a is transformed into two time samples 2020A, 2020B. If the original time sample 2020 was positive 2010, the first one 2010A of the two new time samples 2020A, 2020B is equal to the amplitude of the original time sample 2010, so it can be called an "active sample". The second time sample 2010B is equal to zero, so it can be called an "inactive sample". If the original time sample 2020 in the bipolar signal 2005 of FIG. 10a is negative 2015, the first one 2015A of the two new unipolar samples 2020A, 2020B is set to zero, so it can be called "inactive sample". The second unipolar time sample 2015B is made equal to the absolute value of the original bipolar time sample 2015, so it can be called an "active sample". This way, only the absolute value of the signal 2005 is transmitted, and the sign of each sample 2020 is encoded in the position of the "active" and "inactive" samples in each pair.

This concept can be easily extended intuitively. The essential part of the U-OFDM algorithm is in transmitting only the absolute values of the bipolar signal and the signs separately. The signs, which are effectively equal to one bit of information each, can be encoded in a variety of different ways. The case presented in FIG. 10c shows how the signs can be encoded in the relative position of the active and inactive samples. Additionally or alternatively, the signs can be encoded as bits and/or can be modulated on frequency carriers, time carriers and/or spatial carriers. They can be part of the current frame, the previous frame, the next frame, etc. They can also be conveyed to the destination on a parallel communications channel or as a separate part of the system. The modulation type can be any existing digital modulation scheme. Different approaches towards the sign encoding will lead to different spectral efficiencies and different bit error rate performances.

In the specific example given in FIG. 10c, the spectral efficiency of OFDM is halved since no bits are transmitted in the inactive sample states. This can be mitigated in a similar manner to the previously described concept by encoding more than one sample sign in a group of more than two samples. At the receiver, the maximum of each sample pair is taken. Its amplitude becomes the amplitude of the original sample, and the sign or phase is retrieved from its position in the pair. Afterwards, the demodulation process can continue as in conventional OFDM.

Figure 12:
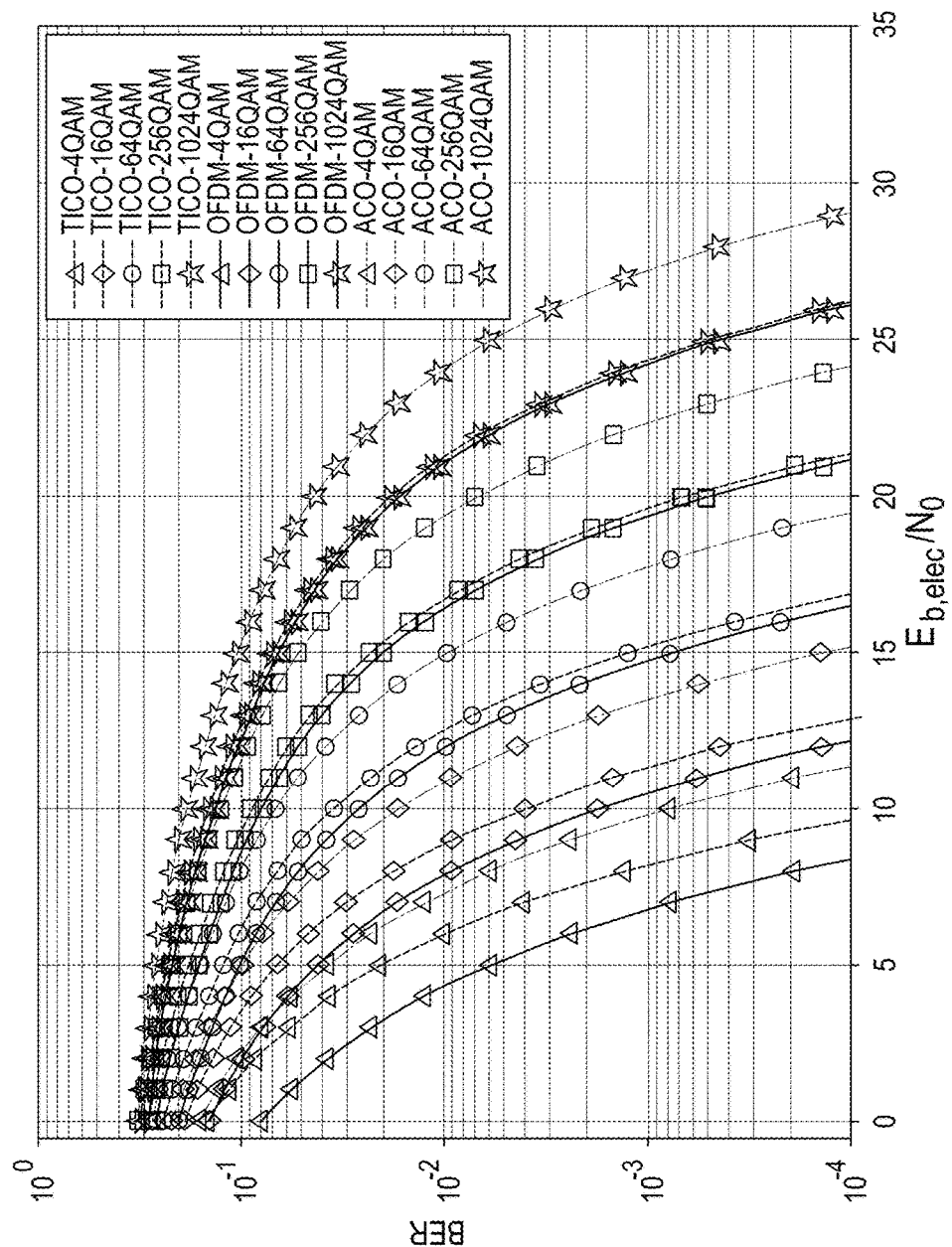
FIG. 12 shows the performance of the method illustrated using FIG. 10c relative to ACO and OFDM for bipolar signals as a function of the electrical signal to noise ratio.
Figure 13:
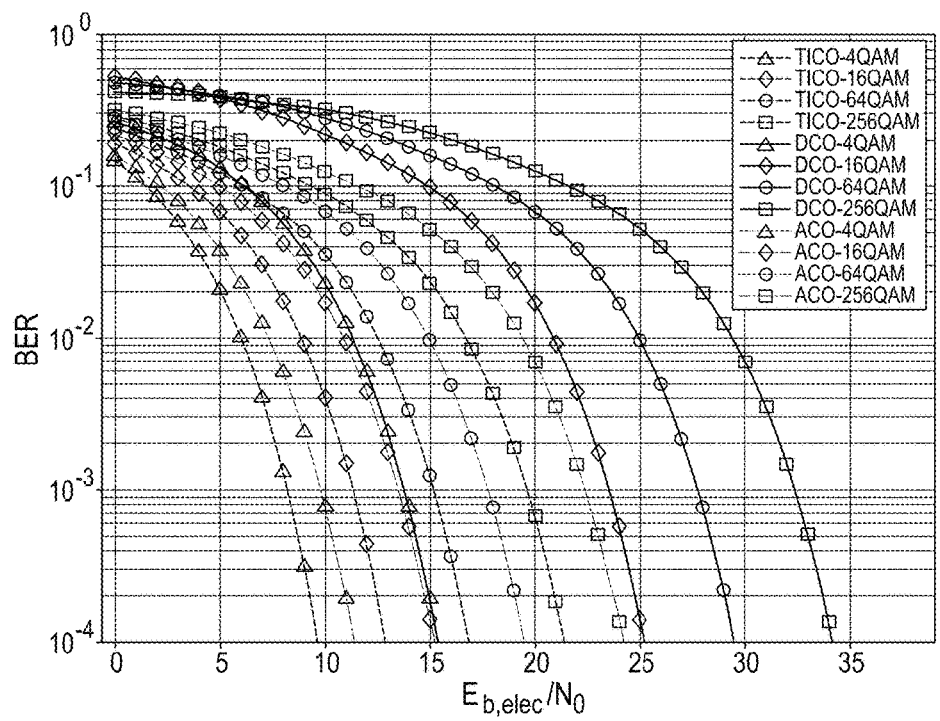
FIG. 13 shows the performance of the method illustrated using FIG. 10c relative to ACO and DCO for unipolar signals as a function of the electrical signal to noise ratio.
Figure 14:
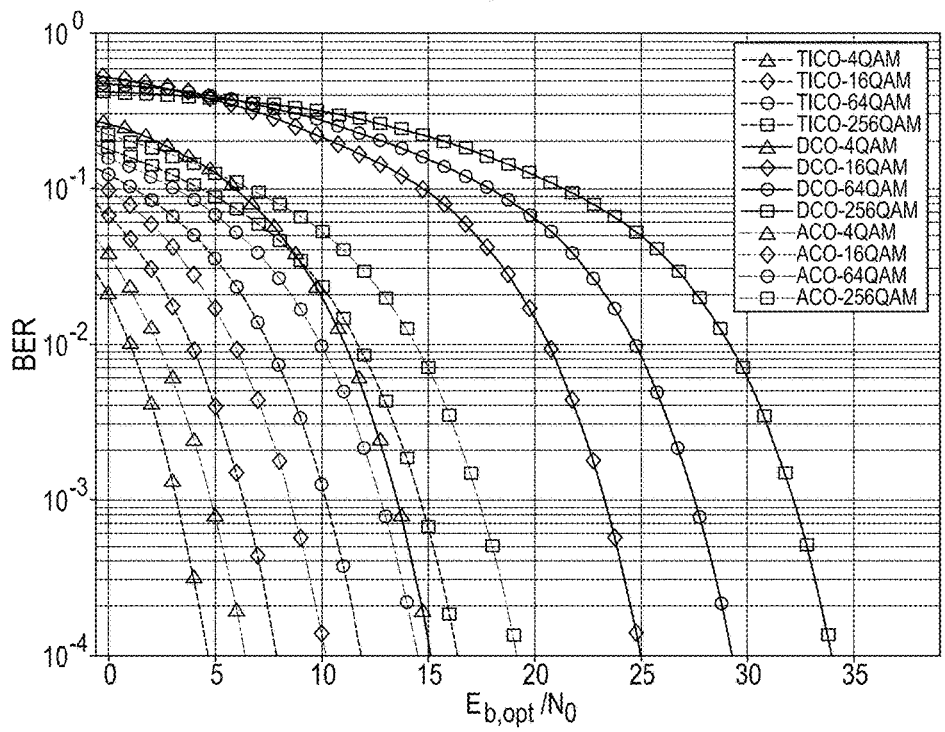
FIG. 14 shows the bit error rate performance of the method illustrated using FIG. 10c relative to ACO and DCO as a function of the optical signal to noise ratio.

By employing the U-OFDM method described above, the performance of the communication system can be improved over communication systems that use the existing DCO-OFDM and ACO-OFDM techniques, as shown in FIGS. 12 to 14. The BER performance of U-OFDM in the presence of Additive White Gaussian Noise (AWGN) compared to pure OFDM and ACO-OFDM for bipolar signals is illustrated in FIG. 12. Performance of U-OFDM compared to DCO and ACO for unipolar signals is illustrated in FIG. 13. The biasing levels for DCO are adopted from J. Armstrong and B. J. C. Schmidt, "Comparison of Asymmetrically Clipped Optical OFDM and DC-Biased Optical OFDM in AWGN" IEEE Communication Letters 12(5):343-345, May 2008, such that no noticeable distortion is experienced in the BER curves due to signal clipping. FIG. 14 presents the comparison between U-OFDM, ACO and DCO for optical SNR introduced in the above article by Armstrong et. al. for the purpose of comparing optical efficiency of the modulation schemes.

As a summary example of an embodiment of the present invention, two copies of a bipolar signal are made. The bipolar signal is made up of a plurality of samples/portions. The first copy is kept in its original form. Samples of the second signal are switched in polarity (multiplied by −1 so that positive become negative and negative become positive). Then the negative samples in both copies are clipped. In this way, the first copy retains the original positive samples and substitutes the negative samples with zeros. The second copy retains the original negative samples as positive samples and substitutes the original positive samples with zeros. Both copies are now unipolar.

The copies can be transmitted in two separate time slots, streams, or divisions of other transmission mechanisms. At the receiver, the original signal can be reconstructed from the first and second copy after both are received, for example, by simple subtraction of the second signal copy from the first one. In this way, positive samples of the first signal copy will stay unaltered and positive samples of the second signal copy will shift polarity again to become negative samples. Of course, the zero samples will have no influence on any of the reconstructed samples since adding or subtracting a zero does not introduce a change.

Alternatively, samples in both signal copies could be examined in corresponding pairs (e.g. the first sample of the first copy is compared with the first sample of the second copy, the second sample of first copy is compared with the second sample of the second copy, and so on) to determine whether the original sample is contained in the first or the second copy (e.g. the value of a sample in one copy will be zero whilst the value in the corresponding sample in the other copy will be a positive number). In this way, the value and sign associated with the original sample can be determined. Since there is noise present at each sample, an example of a method for determining which copy holds a sample and which copy holds a zero is to take the higher value of the two as the sample an to consider the other (lower) one as a zero. In that way, zero samples can be disregarded instead of added to the "active" samples, and ideally the noise power could be reduced by half compared to the other approach.

Importantly, techniques such as the above comprise the division of an original sample into negative and positive samples in two separate unipolar information sequences which can be recombined later without breaking the original frame structure.

Some optional features that may be used in or with any of the the methods and apparatus' described above are described below.

The following features relates to communicating information by modulating multiple carriers. In particular, some of the following features relate to communicating information by modulating orthogonal frequency division multiplexing (OFDM) subcarriers.

Modulation is a technique by which a carrier wave is modified or modulated to encode information.

As an example, for a fixed frequency carrier wave, modulation of the carrier wave may be achieved by varying the amplitude of the carrier wave or the phase of the carrier wave to encode information. To improve disambiguation between different encoded information, the variation of the amplitude of the carrier wave or the phase of the carrier wave to encode information is typically discrete.

To increase bandwidth (the amount of information transmitted per second) the carrier wave may be separated into orthogonal components (I and Q components) that differ in phase by $\pi/2$ radians. The orthogonal components are then independently modulated.

Examples of current modulation techniques include, for example, binary phase shift keying (BPSK) and multilevel quadrature amplitude modulation (M-QAM).

Modulation increases information transmission rates by enabling that within a given bandwidth more information is conveyed (upper bounded by the Shannon equation).

In orthogonal division multiple multiplexing (OFDM), multiple carrier waves are defined. These subcarriers are orthogonal to each other. This enables each subcarrier to be independently modulated.

It would be desirable to provide for better data transmission and reception.

Described herein is a method of communicating information comprising dividing the information into at least a first information portion and a second information portion; modulating a plurality of domain resources to encode the first information using an index or grammar; and encoding the second information by modulation of domain resources.

Modulating the plurality of domain resources to encode the first information can comprise allocating at least two different modulation types to a plurality of sub-carriers. Encoding the first information portion can comprise selecting which modulation type is allocated to which domain resource according to the index or grammar, which applies meaning to which modulation type is allocated to which domain resource.

Modulating the plurality of domain resources to encode the first information can comprise encoding at part of the first information portion using one or more domain resources of a first domain and another part of the first information portion is encoded using one or more domain resources of a second domain.

Modulating the plurality of domain resources to encode the first information can comprise encoding at least a further part of the first information portion using one or more domain resources of a third domain. The first, second and/or third domains can comprise the frequency, time and/or spatial domains and/or the domain resources can comprise sub-channels of a frequency domain, beams arranged in a spatial domain and/or time slots in a time domain.

Values can be associated with domain resources of at least one domain and wherein at least part of the first information portion is encoded by providing a signal using a domain resource indicative of the value of the portion of the data. Values can be associated with domain resources of at least two domains, and wherein the first information portion is at least partially encoded by providing a signal using domain resources from the at least two domains indicative of the value of parts of the first information portion.

Described herein is a method of communicating information comprising dividing the information into at least a first information portion and a second information portion; encoding the first information portion by allocating at least two different modulation types to a plurality of subcarriers; and encoding the second information by modulation of subcarriers belonging to a subset of the plurality of subcarriers.

Encoding the first information portion can comprise selecting which modulation type is allocated to which subcarrier according to a grammar that applies meaning to which modulation type is allocated to which subcarrier. Each subcarrier can be associated with an index in a ordered series of indexes, wherein the modulation type of a subcarrier assigns a value to the associated index and wherein assigned values, ordered according to the ordered series of indexes, provide a data word representing the first information portion.

Optionally, the method comprises encoding the first information portion by allocating only two different modulation types to the subcarriers.

The first information portion optionally comprises a first subset of information bits and a second subset of information bits. The method can further comprise selecting a first information encoding scheme from a plurality of different first information encoding schemes, each of which has a different allocation of modulation types to the first and second subsets.

The plurality of different first information encoding schemes can be predetermined and shared with a receiver. Control information that identifies the selected first information encoding scheme can be transmitted. The control information is optionally encoded by modulation of subcarriers.

A first subset of information bits and a second subset of information bits are optionally identified within the first information portion; the majority subset of the first and second subsets selected; and the majority subset used to allocate a first modulation type to a first plurality of subcarriers. A first information encoding scheme, for determining the allocation of the at least two different modulation types amongst the plurality of subcarriers, that maximises the available bandwidth for the remaining information portions can be selected.

Some of the bandwidth for encoding control information and/or for degenerate encoding a portion of the second information portion can be utilised. Optionally, at least two different modulation types comprise a first modulation type that modulates a subcarrier with a first fixed amplitude and a second modulation type that modulates a subcarrier with a second fixed amplitude.

Optionally, at least two different modulation types enable on-off keying (OOK), the first amplitude representing suppression of subcarriers and the second amplitude representing non suppression of the subcarriers. The method can comprise power reallocation from the suppressed subcarriers to the non suppressed subcarriers. At least two different modulation types can comprise a first modulation type that modulates a subcarrier with a higher order modulation and a second modulation type that modulates a subcarrier with a lower order modulation. The plurality of subcarriers optionally comprise subcarriers of two or more domains, for example, the frequency domain, the time domain and the spatial domain.

Described herein is a transmitter apparatus comprising means for dividing the information into at least a first information portion and a second information portion; means for encoding the first information portion by allocating at least two different modulation types to a plurality of subcarriers; and means for encoding the second information by modulation of subcarriers belonging to a subset of the plurality of subcarriers.

The transmitter apparatus optionally comprises means for performing any of the methods described above.

Also described herein is a transmitter apparatus comprising: splitter circuitry configured to divide the information into at least a first information portion and a second information portion; inter-carrier modulation circuitry configured to encode the first information portion by allocating at least two different modulation types to a plurality of subcarriers; and intra-carrier modulation circuitry configured to encode the second information by modulation of subcarriers belonging to a subset of the plurality of subcarriers.

Described herein is a method of communicating information comprising: decoding first information portion by determining the allocation of at least two different modulation types to a plurality of subcarriers; and decoding second information by demodulation of subcarriers belonging to a subset of the plurality of subcarriers; and combining the first information portion and the second information portion.

Decoding the first information portion optionally comprises determining which modulation type is allocated to which subcarrier and applying meaning according to a grammar that applies meaning to which modulation type is allocated to which subcarrier.

Each subcarrier can be associated with an index in a ordered series of indexes, wherein the modulation type of a subcarrier assigns a value to the associated index and wherein assigned values, ordered according to the ordered series of indexes, provide a data word representing the first information portion.

The method optionally comprises determining which modulation type is allocated to which subcarrier; decoding the first information portion according to different encoding schemes by applying meaning according to a grammar which applies a meaning to which modulation types are allocated to which subcarriers, wherein each encoding scheme has its own grammar; and selecting one of the first information portions created according to different encoding schemes. The method optionally comprises identifying the encoding scheme is use; and decoding the first information portion by determining which modulation type is allocated to which subcarrier and applying meaning according to a grammar of the identified encoding scheme that applies meaning to which modulation type is allocated to which subcarrier.

At least two different modulation types can comprise a first modulation type that modulates a subcarrier with a higher order modulation and a second modulation type that modulates a subcarrier with a lower order modulation.

Described herein is a receiver apparatus comprising means for decoding first information portion by determining the allocation of at least two different modulation types to a plurality of subcarriers; means for decoding second information by demodulation of subcarriers belonging to a subset of the plurality of subcarriers; and means for combining the first information portion and the second information portion;

Optionally, the receiver apparatus comprises means for performing the method of the fourth aspect.

Described herein is a receiver apparatus comprising inter-carrier modulation detection circuitry configured to decode first information portion by determining the allocation of at least two different modulation types to a plurality of subcarriers; intra-carrier demodulation circuitry configured to decode second information by demodulation of subcarriers belonging to a subset of the plurality of subcarriers; and combiner circuitry configured to combine the first information portion and the second information portion.

Described herein is a system comprising a receiver apparatus as described above and a transmitter apparatus described above.

Described herein is a method of communicating information comprising dividing the information into at least a first information portion and a second information portion; communicating the first information portion by allocating an operational pattern to a plurality of wireless channels; and communicating the second information by wireless communication via one or more of the wireless channels.

The wireless channels optionally have a plurality of potential different states wherein the first information is communicated by allocating a state for each wireless channel, wherein the collection of states form the operational pattern.

The wireless channels can include orthogonal subcarriers that have different modulation states. The wireless channels optionally include time slots that have different modulation states.

Described herein is a method of communicating information comprising dividing the information into at least a first information portion and a second information portion; encoding the first information portion by allocating at least two different modulation types to a plurality of orthogonal multiplexing domain subunits; and encoding the second information by modulation of orthogonal multiplexing domain subunits belonging to a subset of the plurality of orthogonal multiplexing domain subunits.

Described herein is a method of communicating information comprising: dividing the information into at least a first information portion and a second information portion; encoding the first information using domain resource-index modulation; and encoding the second information by modulation of domain resources.

Described herein is a method of communicating information comprising dividing the information into at least a first information portion and a second information portion; encoding the first information using inter-domain resource differentiation; and encoding the second information by modulation of domain resources.

Described herein is a method of communicating information comprising: dividing the information into at least a first information portion, a second information portion and a third information portion; encoding the first information portion by allocating at least two different modulation types to a plurality of first orthogonal multiplexing domain subunits; encoding the second information portion by allocating at least two different modulation types to a plurality of second orthogonal multiplexing domain subunits; and encoding the third information by modulation of orthogonal multiplexing domain subunits belonging to a subset of the plurality of first orthogonal multiplexing domain subunits and second orthogonal multiplexing domain subunits.

Described herein is a method of communicating information comprising: dividing the information into at least N portions; encoding the each one of M of the N portions by allocating at least two different modulation types to a plurality of orthogonal multiplexing domain subunits; and encoding the N-M portion(s) by modulation of orthogonal multiplexing domain subunits.

Optionally, the method comprises encoding at least one of the M portions by allocating at least $2^M$ different modulation types to a plurality of orthogonal multiplexing domain subunits. The plurality of orthogonal multiplexing domain subunits optionally comprises domain subunits from at least two domains, for example, the frequency domain, the time domain and the spatial domain.

Figure 15:
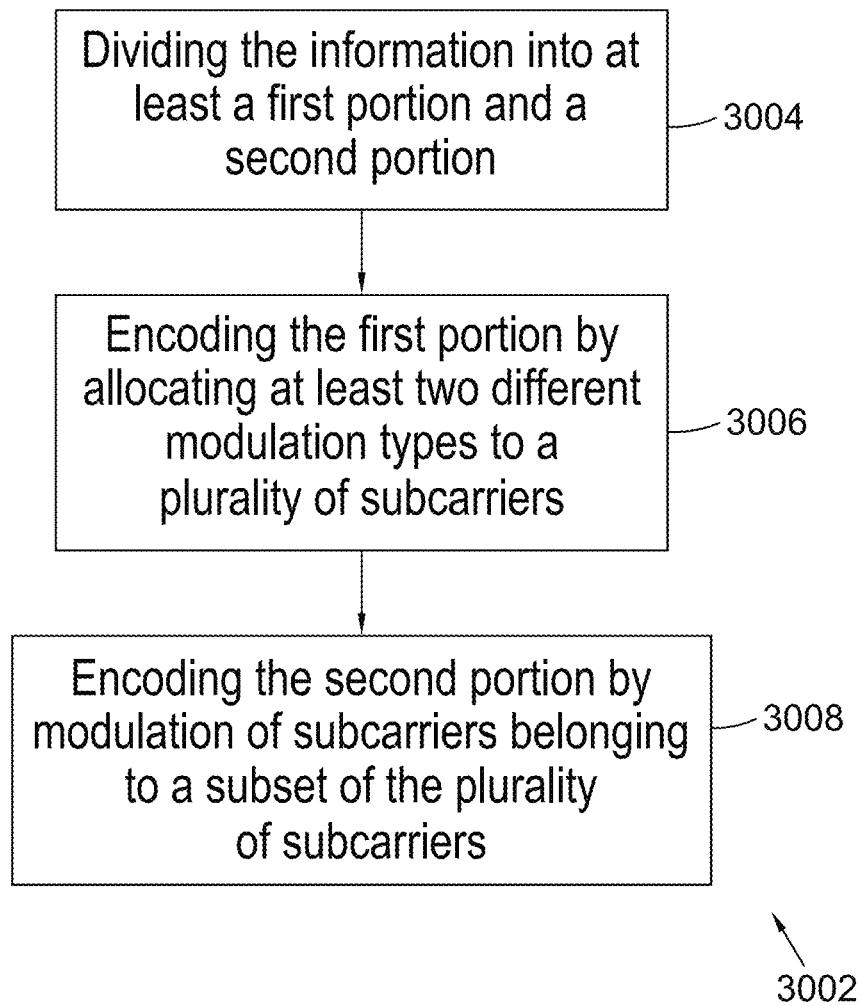
FIG. 15 schematically illustrates a method of communicating information.
Figure 19:
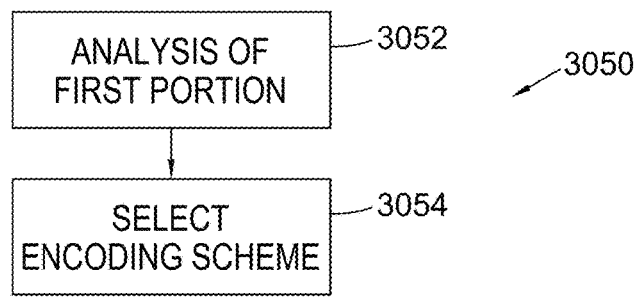
FIG. 19 schematically illustrates a method for selecting an encoding scheme from a plurality of different encoding schemes, each of which has a different allocation of modulation types to the first information portion.

FIG. 15 schematically illustrates a method 3002 of communicating information. The method comprises a series of sequential blocks 3004, 3006, 3008.

At block 3008, information is divided into at least a first information portion and a second information portion.

As illustrated in FIG. 17A, the information 3011 may be a series of information bits, such as, for example the series of binary bits illustrated.

As illustrated in FIGS. 17B and 17C, the first information portion 3013 and the second information portion 3015 are non-overlapping portions of the information 3011.

Referring back to FIG. 15, at block 6 the first information portion 3013 is encoded by allocating at least two different modulation types to a plurality of orthogonal frequency division multiplex (OFDM) subcarriers.

An example of an allocation of different modulations types M1, M2 to orthogonal subcarriers F1 to F8 is illustrated in FIG. 17D. This Figure illustrates a modulation map 3017 that records which modulation type is allocated to which subcarrier.

Encoding the first information portion 3013 comprises selecting which modulation type is allocated to which subcarrier according to a grammar that applies meaning to which modulation type is allocated to which subcarrier.

The modulation map has an ordered series of indexes 3021. In this example the indexes increase sequentially from 1 to 8. Each of the indexes 3021 is associated with a particular information bit of the first information portion 3013. Each of the subcarriers F1-F8 is associated with a particular index 3021. The bit value of the first information portion 3013 at a particular index assigns the modulation type of the subcarrier associated with that index.

In this example, it can be observed that the grammar assigns the modulation type M1 to bit values of 1 in the first information portion 3013 and the modulation type M2 to a bit values of 0 in the first information portion 3013.

The grammar is shared with a receiver so that the receiver by detecting the modulation types of the subcarriers can reproduce the first information portion 3013 as the data word 3022. At the receiver, the modulation type of a subcarrier assigns a value to the associated index. The assigned values, ordered according to the ordered series of indexes, provide a data word 3022 representing the first information portion 3011 as illustrated in FIG. 17F.

Encoding of the first information portion 3013, results in different modulation types being used with different subcarriers. In the example of FIG. 17D, two different types of modulation M1, M2 are used. A first subset of the eight subcarriers (subcarriers F1, F4, F6, F7) are modulated using the first type of modulation M1. A second subset of the eight subcarriers (subcarriers F2, F3, F5, F8) are modulated using the second type of modulation M2.

Referring back to FIG. 15, next at block 3008 the second information portion 3015 is encoded by modulation of subcarriers belonging to a subset of the plurality of subcarriers.

Referring to FIG. 17E, a symbol map 3020 records which symbols are modulated onto which subcarriers. The second information portion 3015 is divided into symbols and each symbol is modulated, in order, onto a subcarrier. In this example, all the symbols are modulated onto only the first subset of the eight subcarriers (subcarriers F1, F4, F6, F7).

In summary, the block 3006, encodes the first information portion 3013 using inter-carrier modulation. Information is encoded by creating differences between subcarriers. The first information portion 3013 is encoded by allocating modulation types to subcarriers according to a grammar that applies meaning to which modulation type is allocated to which subcarrier. The block 3008, encodes the second information portion using intra-carrier modulation. A symbol is encoded by creating detectable differences (e.g. phase and/or amplitude) within a subcarrier.

FIG. 16 schematically illustrates a suitable encoding apparatus 3010. The apparatus 3010 comprises a splitter block 3012, an inter-carrier modulation block 3014 and an intra-carrier modulation block 3016.

For example, the splitter block performs block 3004 of the method 3002, the inter-carrier modulation clock 3014 performs block 3006 of the method 3002 and the intra-carrier modulation block 3016 performs block 3008 of the method 3002.

The blocks may be implemented using software, hardware or a combination of software and hardware.

The splitter block 3012 divides the information 3011 into at least a first information portion 3013 and a second information portion 3015.

The inter-carrier modulation block 3014 encodes the first information portion 3013 by allocating at least two different modulation types to a plurality of subcarriers.

The intra-carrier modulation block 3016, receives data 3017 identifying the allocation of modulation types to subcarriers by the inter-carrier modulation block 3014, and encodes the second information portion 3015 by modulation of a subset of the subcarriers. The modulated subcarriers 3019 are then transmitted.

Figure 20:
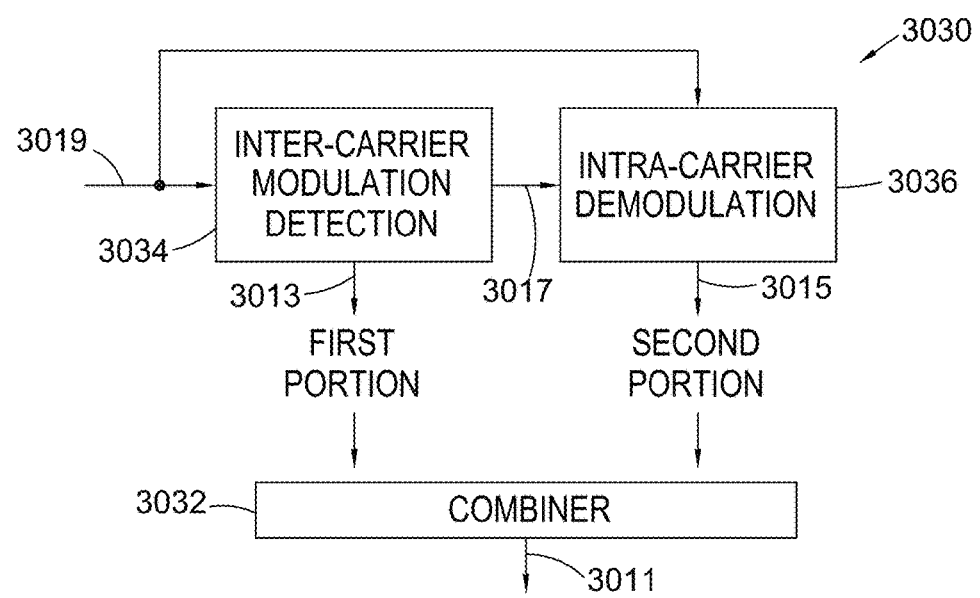
FIG. 20 schematically illustrates a suitable decoding/receiver apparatus.

FIG. 20 schematically illustrates a suitable decoding apparatus 3030. The apparatus 3030 comprises a combiner block 3032, an inter-carrier modulation detection block 3034 and an intra-carrier demodulation block 3036.

The blocks may be implemented using software, hardware or a combination of software and hardware.

The inter-carrier detection block 3014 decodes the first information portion 3013 by detecting the modulation type of each subcarrier. The detected modulation type assigns a value to the carriers associated index according to a grammar. The assigned values, ordered according to the ordered series of indexes, provide a data word 3022 representing the first information portion 3011 as illustrated in FIG. 17F.

The intra-carrier demodulation block, receives data 3017 identifying the allocation of modulation types to subcarriers, and decodes a data word 3024, representing the second information portion 3015, by demodulation of a subset of the subcarriers.

The combiner block 3032 combines the first information portion 3013 and the second information portion 3015 to recreate the information 3011.

In the example illustrated in FIGS. 17A-17G, two different modulation types are illustrated M1 and M2.

In one embodiment, the first modulation type M1 may modulate an allocated subcarrier with a first fixed amplitude and the second modulation type modulates an allocated subcarrier with a second fixed amplitude. The fixed amplitudes may be used to enable on-off keying (OOK) in which only the first modulation type is used to encode the second information portion 3015. On-Off keying is enabled by letting the second amplitude represent suppression of subcarriers and the first amplitude represent non suppression of the subcarriers.

Different power control strategies may be used in the event that subcarriers are suppressed. Suppression of a subcarrier means that it is not transmitted and therefore has zero associated power.

In one power control strategy, there is no reallocation of power. If a subcarrier is suppressed then that power is saved.

In a different power control strategy, there is reallocation of power. The total transmit power is kept constant, with the power per subcarrier increasing as more subcarriers are suppressed. This results in an increase in power per subcarrier. There is therefore a better signal to noise ratio, and a reduced bit-error ratio or there is an opportunity to select a higher order modulation scheme that results in even higher transmission rates.

In other embodiments, both modulation types M1, M2 may be used to encode the second information portion 3015.

In other embodiments, both modulation types M1, M2 may be used to encode the second information portion 3015 and an additional third information portion 3040. One example of this will now be described with reference to FIG. 15 and FIGS. 18A to 18I.

At block 3004, information 3011' is divided by splitter block 3012 into at least a first information portion 3013, a second information portion 3015 and a third information portion 3040.

As illustrated in FIG. 18A, the information 3011' may be a series of information bits, such as, for example the series of binary bits illustrated.

As illustrated in FIGS. 18B, 18C and 18D, the first information portion 3013, the second information portion 3015 and the third information portion 3040 are non-overlapping portions of the information 3011'.

Referring back to FIG. 15, at block 3006 the first information portion 30013 is encoded, at the inter-carrier modulation block 30014, by allocating at least two different modulation types to a plurality of orthogonal frequency division multiplex (OFDM) subcarriers.

An example of an allocation of different modulations types M1, M2 to orthogonal subcarriers F1 to F8 is illustrated in FIG. 18D. This illustrates a modulation map 3017 that records which modulation type is allocated to which subcarrier. Encoding of the first information portion 3013, results in different modulation types being used with the subcarriers. In this example, a first subset of the eight subcarriers (subcarriers F1, F4, F6, F7) are modulated using the first type of modulation M1. A second subset of the eight subcarriers (subcarriers F2, F3, F5, F8) are modulated using the second type of modulation M2.

Referring back to FIG. 15, next at block 3008 the second information portion 3015 is encoded, at the intra-carrier modulation block 3016, by modulation of subcarriers belonging to the first subset of the plurality of subcarriers.

Referring to FIG. 18F, a symbol map 3042 records which symbols are modulated onto which subcarriers.

The second information portion 3015 is divided into symbols and each symbol is modulated, in order, onto a subcarrier. In this example, all the symbols are modulated onto only the first subset of the eight subcarriers (subcarriers F1, F4, F6, F7).

Referring back to FIG. 15, next block 3008 is repeated using the third information portion 3040. At block 3008 the third information portion 3040 is encoded, at the intra-carrier modulation block 3016, by modulation of subcarriers belonging to the second subset of the plurality of subcarriers.

In this example, the third information portion 3040 is divided into symbols and each symbol is modulated onto one of the second subset of the subcarriers (subcarriers F2, F3, F5, F8).

At the decoder 3030, the inter-carrier detection block 3014 decodes the first information portion 3013 by detecting the modulation type of each subcarrier. The detected modulation type assigns a value to the carriers associated index according to a grammar. The assigned values, ordered according to the ordered series of indexes, provide a data word 3022 representing the first information portion 3011 as illustrated in FIG. 18G.

The intra-carrier demodulation block, receives data 3017 identifying the allocation of modulation types to subcarriers. It decodes the second information portion 3015 by using the appropriate demodulation technique (for modulation type M1) on the subcarriers identified as using the modulation type M1. This demodulation produces the data word 3024 which reproduces the second information portion 3015. It decodes the third information portion 3015 by using the appropriate demodulation technique (for modulation type M2) on the subcarriers identified as using the modulation type M2. This demodulation produces the data word 3044 which reproduces the third information portion 3040.

The combiner block 3032 combines the first information portion 3013, the second information portion 3015 and the third information portion 3040 to recreate the information 3011'.

The first modulation type M1 and the second modulation type M2 have different orders. In the illustrated example, the first modulation type M1 has a higher order than the second modulation type M2. The first modulation type uses symbolic modulation, where the symbol length L1=2. The second modulation type uses symbolic modulation, where the symbol length L2 is different to L1. In this example, the second modulation is of a lower order (L2<L1) as L2=1.

M-QAM modulation may, for example, be used as the first modulation type M1. Binary phase shift keying BPSK may, for example, be used as the second modulation type M2.

This implementation results in an improved spectral efficiency compared to the on-off keying embodiment described previously but at the cost of increased complexity at the receiver 3030.

At block 3006 in FIG. 15, the first information portion 3013 is encoded by selecting which modulation type is allocated to which subcarrier according to a grammar that applies meaning to which modulation type is allocated to which subcarrier. In the example of FIG. 17D, it can be observed that the grammar assigns the modulation type M1 to bit values of 1 in the first information portion 3013 and the modulation type M2 to a bit values of 0 in the first information portion 3013. This grammar defines a particular first information encoding scheme.

It is possible to define different first information encoding schemes using different grammars.

For example, a different grammar could assigns the modulation type M1 to bit values of 0 in the first information portion 3013 and the modulation type M2 to a bit values of 1 in the first information portion 3013. This grammar defines a different first information encoding scheme.

FIG. 5 schematically illustrates a method 3050 for selecting an encoding scheme from a plurality of different encoding schemes, each of which has a different allocation of modulation types to the subsets of the first information portion 3013.

At block 3052, the first information portion 3013 is analysed.

There may be a putative allocation of a first encoding scheme to the first information portion 3013. A quantitative value indicative of the available bandwidth for encoding the second information portion 3015 may then be determined.

There may be a putative allocation of a second encoding scheme to the first information portion 3013. A quantitative value indicative of the available bandwidth for encoding the second information portion 3015 may then be determined.

At block 3053, the encoding scheme with the greatest available bandwidth may then be selected. The selected encoding scheme determines how at least two different modulation types are allocated amongst the plurality of subcarriers in dependence upon the first information portion 3013 and maximises the available bandwidth for the remaining information portions.

As an example, consider the situation when the first information portion 3013 has the information bits 11010110. The first information portion 3013 has a first subset of information bits {1 1_1_1 1_} and a second subset of information bits {___0_0___0}.

According to a first encoding scheme, a bit value of 1 in the first information portion is associated with modulation type M1 and a bit value of 0 in the first information portion is associated with modulation type M2. The modulation type M1 corresponds to symbol encoding and the modulation type M2 corresponds to carrier suppression (on-off keying). Consequently there will be five subcarriers allocated to the first modulation type M1, each of which can communicate a symbol. The bandwidth is therefore five symbols.

According to a second encoding scheme, a bit value of 1 in the first information portion is associated with modulation type M2 and a bit value of 0 in the first information portion is associated with modulation type M1. The modulation type M1 corresponds to symbol encoding and the modulation type M2 corresponds to carrier suppression (on-off keying). Consequently there will be three subcarriers allocated the first modulation type M1, each of which can communicate a symbol. The bandwidth is therefore three symbols.

The first encoding scheme is therefore selected and used. The majority subset of the first subset (1's) and the second subset (0's) determines the encoding scheme in this example. The majority subset of the first information portion may be identified by calculating the Hamming weight of the first information portion 3013 at block 3052.

The available bandwidth is five symbols but only four symbols are required to encode the second information portion 3015. There is therefore an additional symbol for use. In some embodiments this symbol is used to encode again a symbol of the second information portion. This degenerate encoding increases the quality. In another embodiment, this symbol is used to indicate the selected encoding scheme to the receiver 3030. In other configurations of the first information portion 3013 there may be more than one extra symbol available and these symbols may be used for degenerate encoding and indicating the selected encoding scheme.

As another example, consider the situation when the first portion has the information bits 00010110. The first information portion 3013 has a first subset of information bits {0 0_0_0 0_} and a second subset of information bits {___1_1___1}.

According to a first encoding scheme, a bit value of 0 in the first information portion is associated with modulation type M1 and a bit value of 1 in the first information portion is associated with modulation type M2. The modulation type M1 corresponds to symbol encoding and the modulation type M2 corresponds to carrier suppression (on-off keying). Consequently there will be five subcarriers allocated to the first modulation type M1, each of which can communicate a symbol. The bandwidth is therefore five symbols.

According to a second encoding scheme, a bit value of 0 in the first information portion is associated with modulation type M2 and a bit value of 1 in the first information portion is associated with modulation type M1. The modulation type M1 corresponds to symbol encoding and the modulation type M2 corresponds to carrier suppression (on-off keying). Consequently there will be three subcarriers allocated the first modulation type M1, each of which can communicate a symbol. The bandwidth is therefore three symbols.

The first encoding scheme is therefore selected and used. The majority subset (0's) of the first subset (0's) and the second subset (1's) determines the encoding scheme in this example. The majority subset of the first information portion 3013 may be identified by calculating the Hamming weight of the first information portion 3013 at block 3052.

The available bandwidth is five symbols but only four symbols are required to encode the second information portion 3015. There is therefore an additional symbol for use. In some embodiments this symbol is used to encode again a symbol of the second information portion. This degenerate encoding increases the quality. In another embodiment, this symbol is used to indicate the selected encoding scheme to the receiver. It other configurations of the first information portion 3013 there may be more than one extra symbol available and these symbols may be used for degenerate encoding and indicating the selected encoding scheme.

As the encoder can use any one of a plurality of different encoding schemes for encoding the first information portion 3013, then the receiver 3030 will need to take this into account.

According to one embodiment, the receiver makes no assumption as to the encoding scheme used and performs the decoding process for each predetermined scheme. Error correction techniques are then used to determine which of the information 3011 produced for each scheme is the most accurate. However, this requires significant processing at the receiver 3030 and may require the introduction of forward error correcting codes which reduces bandwidth.

According to another embodiment, the encoder apparatus 3010 signals the encoding scheme used to the receiver apparatus 3030. The signalling may be done independently of the subcarriers 3019 or it may utilize the subcarriers 3019. For example, the signalling may utilize an extra symbol as described above.

In the example given above, a frequency domain resource is divided into domain subunits (subcarriers). Each of the domain subunits forms one of a plurality of multiplexed wireless channels. Each of the domain subunits is orthogonal and each is separately indexed by a domain resource index.

The encoding of the first information portion by allocating at least two different modulation types to a plurality of subcarriers allocates an operational pattern to the plurality of wireless channels/domain subunits. The channel/subunit has a plurality of potential different states and the first information is communicated by allocating a state to each channel/subunit. The collection of states form the operational pattern.

In other embodiments, a different domain resource is divided into domain subunits. Each of the domain subunits forms one of a plurality of multiplexed wireless channels. Each of the domain subunits is orthogonal and each is separately indexed by a domain resource index. The encoding of the first information portion allocates an operational pattern to the plurality of wireless channels/domain subunits. The channel/subunit has a plurality of potential different states and the first information is communicated by allocating a state to each channel/subunit. The collection of states form the operational pattern.

Thus different domain resources may be used in addition to or as an alternative to the frequency domain resource.

Figures 21, 22:
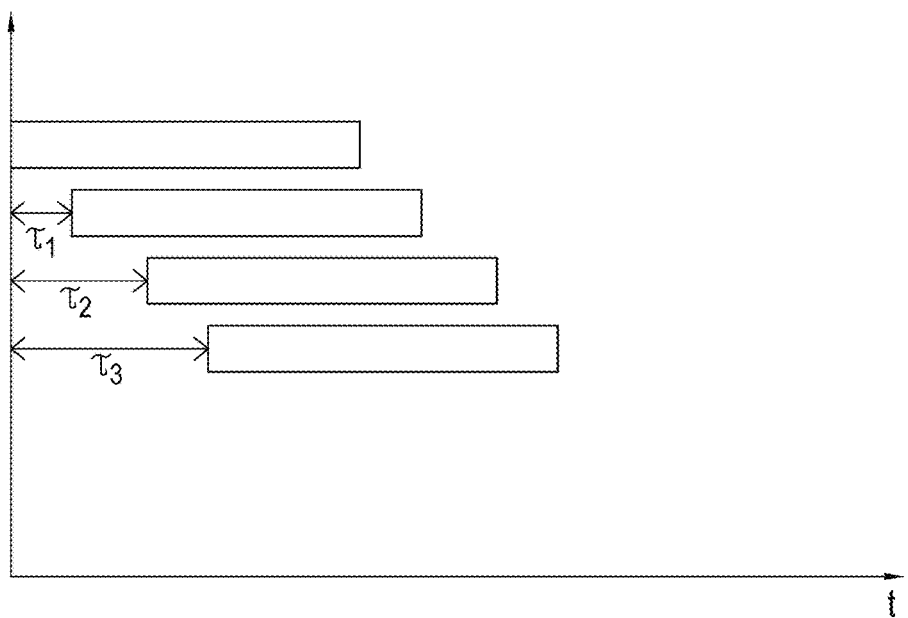
FIG. 21 schematically illustrates a time-frequency block.
FIG. 22 illustrates a cyclic delay diversity modulation scheme.

Examples of domains include the time domain where the channels/subunits are time slots, the spatial domain where the channels/subunits are antenna locations or beams. Another technique that may be used for encoding information is cyclic delay diversity. As illustrated in FIG. 22, in this technique, data streams may be offset by a variable delay. Information can be encoded by associating data values to specified delays, for example, by associating a binary bit zero with no delay and associating a binary bit one with the presence of a delay.

The index-modulation concept can be applied to multiple domains/channels (i.e. spatial, time slot, frequency) by having different groups of M1 and M2 for different domain/channel-subunits.

In the time domain, a transmission frame is subdivided into smaller time units of equivalent (however, not necessarily) length (time slots). We can index each time slot, and can assign different information to each of the time slots—similar to OOK the subcarriers described above. Thus first information 3010 may be encoded to two consecutive time slots, by allowing the first slot to include modulated information (second information) and keeping the second time slot empty.

In the spatial domain, in MIMO (multiple-input-multiple-output) systems such as beam forming systems, we have multiple beams and can index the beams. Thus first information 3010 may be encoded to two adjacent beams, by allowing the first beam to convey modulated information (second information) and preventing the second beam from conveying information (e.g. by switching it off).

It is possible to simultaneously use two or more domains. The first information is divided into subsections, one for each domain.

For example, consider FIG. 21. This Figure illustrate the encoding of a first subsection 1101 of the first information using four channel/subunits in the frequency domain and the encoding of a second subsection 1001 using four subunits/channels in the time domain.

For example, consider a scenario of four subcarriers associated with the binary word 1101, and four time slots associated with the binary word 1001.

For the frequency domain we can define two groups of modulation levels each of size 2, i.e. G1:{M1:off, M2:8-QAM}, and G2:{M1:BPSK, M2:4-QAM}.

Now, the binary word 1101 can be mapped to the frequency domain as follows G1 G1 G2 G1.

Similarly, the binary word 1001 can be mapped to the time domain as follows M1 M2 M2 M1. The resultant time-frequency block (chunk) can be found in the Figure.

Although the above example shows encoding of a first subsection of the first information using the frequency domain and the encoding of a second subsection using the time domain, i.e. two dimensional encoding, it will be appreciated that the first information can be encoded using more than two domains. An example of this is shown in FIG. 23, which illustrates encoding of the first information using the frequency, time and spatial domains, i.e. three dimensional encoding.

Figure 23:
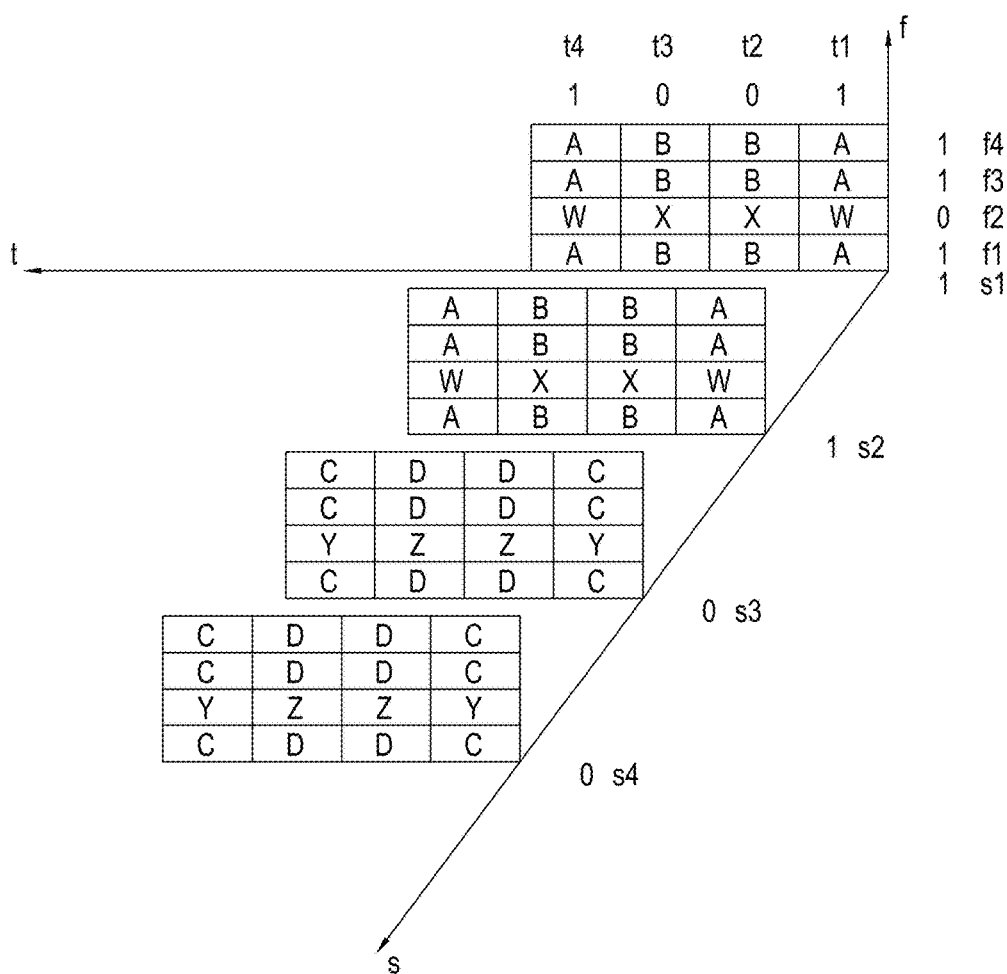
FIG. 23 schematically illustrates a time-frequency-spatial block.

In the example of FIG. 23, a first subsection of the first information is encoded using the frequency domain, a second subsection of the first information is encoded using the time domain and a third subsection of the first information is encoded using the spatial domain, for example, through the use of a MIMO system as described above. The example of FIG. 23 illustrates four sub carriers f1, f2, f3 and f4 in the frequency domain, four time slots t1, t2, t3 and t4 in the time domain and four spatially separated beams s1, s2, s3 and s4 in the spatial domain. It will be appreciated that other amounts of frequency sub carriers, time slots or beams could be used and that the amount of each need not be the same.

For the frequency domain, two groups G3 and G4 of modulation schemes are defined, each group comprising four modulation types G3:{A, B, C, D} and G4:{W, X, Y, Z}. As in the previous examples, the modulation types A, B, C, D, W, X, Y and Z may be selected from a wide range of suitable distinct modulation types known in the art, such as OOK, BPSK, 4-QAM, and the like. In this way, using modulation types A, B, C or D from the first group G3 for a particular frequency sub carrier indicates a binary value of 1, whilst use of modulation types W, X, Y or Z from the second group G4 for a particular frequency sub carrier indicates a binary value of 0.

For the time domain, two groups G5 and G6 of modulation types are defined, each group comprising four modulation types G5:{A, C, W, Y} and G6: {B, D, X, Z}. Use of modulation types A, C, W or Y from group G5 for a particular time slot indicates a binary value of 1, whilst use of modulation types B, D, X or Z from group G6 for a particular time slot indicates a binary value of 0.

For the spatial domain, two groups G7 and G8 of modulation types are defined, each group comprising four modulation types G7:{A, B, W, X} and G8: {C, D, Y, Z}. Use of modulation types A, B, W or X from group G7 for a particular beam indicates a binary value of 1, whilst use of modulation types C, D, Y or Z from group G8 for a particular beam indicates a binary value of 0.

Therefore, referring to FIG. 23, it can be seen that, regardless of time slot or beam, modulation types A, B, C or D from group G3 are used for each of frequency sub carriers f1, f2 and f4 and modulation types W, X, Y or Z from group G4 are used for frequency sub carrier f3. Therefore, in this case, the binary word 1 1 0 1 is encoded using the frequency domain.

In the time domain, modulation types A, C, W or Y from group G5 are used for each of time slots t1 and t4, whilst modulation types B, D, X or Z from group G6 are used for each of the time slots t2 and t3. Therefore, in this case, the binary word 1 0 0 1 is encoded using the time domain.

Similarly, only modulation types A, B, W or X from the group G7 are used for spatial beams s1 and s2, whilst only modulation types C, D, Y or Z from the group G8 are used for spatial beams s3 and s4. Therefore, in this case, the binary word 1 1 0 0 is encoded using the spatial domain.

In this way, three or more dimensions or domains can be used in order to increase the amount of information from the first block of information that can be encoded. It will be appreciated that other domains or techniques may be used instead of or in addition to the frequency, time and spatial domains described in relation to FIG. 23.

Figure 24:
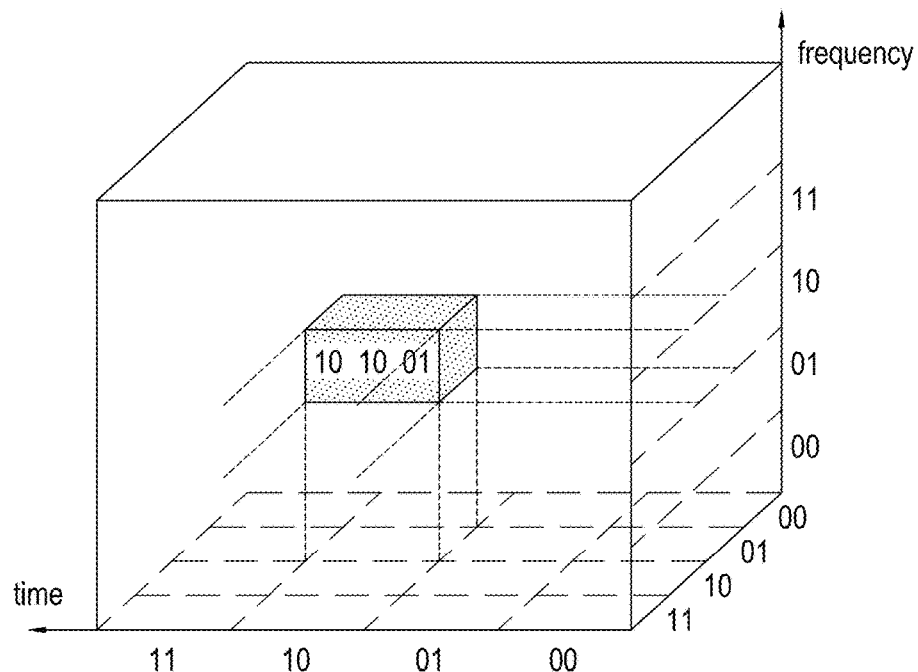
FIG. 24 schematically illustrates an example of multi-domain encoding.

Another scheme for encoding the first information portion using multiple domains is shown in FIG. 24. In this example, each discrete domain unit in each domain is assigned a value. In the example of FIG. 10, each sub-carrier in the frequency domain, each time slot in the time domain and each beam in the spatial domain is assigned a binary value, such as 0 0, 0 1, 1 0 or 1 1. Therefore, providing a signal in a bin formed by a particular frequency sub-carrier, on a particular beam and in a particular time slot would be indicative of a value formed by combining the values associated with the particular frequency sub-carrier, time slot and beam. In the example shown in FIG. 24, a signal is provided using the frequency sub-carrier associated with the binary value 1 0, in the time slot associated with the binary value 1 0 and using the beam associated with the binary value 0 1. Therefore, this signal is representative of the value 1 0 1 0 0 1. In this way, the total number of bits that can be encoded is $\log_2(N\_f)+\log_2(N\_s)+\log_2(N\_t)$, where $N\_f$ is the total number of frequency sub-carriers, $N\_s$ is the total number of beams and $N\_t$ is the total number of time slots.

The signal provided in each bin formed by a frequency sub-carrier, a time slot and a beam, may be subjected to a second modulation scheme, such as M-QAM, for encoding the second information portion. In this case, the total number of bits transmitted in each transmission is:

$$\log_2(N\_s)+\log_2(N\_t)+\log_2(N\_D+\log_2(M)$$

If the number of frequency sub-carriers is sixty four and the sampling frequency is 25 MHz, then the duration of one time slot is:

$$1/f\_s*N\_f=2.56\mu s$$

If the example is extended such that four time slots are provided per transmission, thirty two beam transmitters are provided and 256-QAM is used, then for one transmission, the maximum data rate for this example is:

$$\log_2(32)+\log_2(4)+\log_2(64)+\log_2(256)/(4*2.56\mu s)=\\2.05 \text{ Mbps}$$

By using this method, significant energy savings can be achieved. The number of bins in this example is 4*32*64=8192, which means that 1/8192 of the energy is used for the transmission.

As in the previous examples, more than one modulation scheme may be used to encode the data within the bins. For example, if all the sub-carriers in one of the domains, such as the frequency domain, were used for the transmission, and a first modulation type such as OOK was used for a first subset of the frequency sub-carriers and a second modulation type such as 256-QAM was used in the remaining frequency subcarriers, the achievable data rate would be (for 4 time slots, 32 beam transmitters, 32 frequency sub-carriers encoded using OOK and 32 frequency sub-carriers encoded using 256-QAM):

$$\log_2(4)+\log_2(32)+32\text{sub-carriers}(\times 1 \text{ bit per bin of}\\OOK)+32\text{sub-carriers}(\times 8\text{bits per bin for 256-}\\QAM)/(4*2.56\mu s)=28.81 \text{ Mbps}$$

This example would use $1/(N\_t*N\_s*2)=1/130$ of the energy that would be used if all time slots, all transmitters and all frequency sub-carriers were used.

Figure 25:
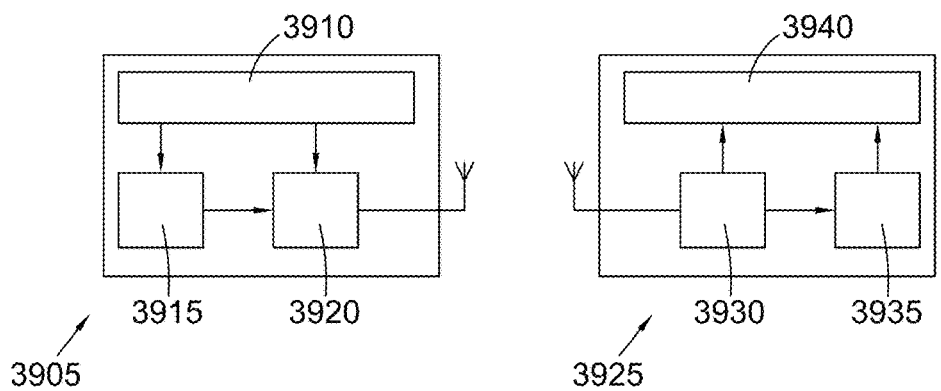
FIG. 25 schematically illustrates a transmitting and receiving apparatus suitable for applying multi-domain encoding.

Suitable apparatus for applying these multi domain techniques is illustrated in FIG. 25. It will be seen from this that a transmitter 3905 is provided with a splitter 3910 for splitting the data into at least a first section and a second section, a module 3915 for applying inter-carrier modulation to the first portion by assigning sub-carriers of at least two and preferably at least three, domains for transmission of the signal. Each sub-carrier in each domain is associated with a value. A grammar is used to store the values associated with each sub-carrier in each domain. The first data is divided into portions and each portion is assigned to a sub-carrier in a domain with an associated value equal to the value of the portion of the first data. A module 3920 for encoding the second data using intra-carrier modulation, for example, by applying a modulation scheme such as OOK or 256-QAM to the signal, is also provided.

By determining the sub-carriers in each domain used to transmit the signal and applying the grammar that indicates which sub-carriers in each domain are indicative of which values, the first data may be reconstructed. On receipt of the signal, the receiver 3925 de-modulates the received signal using a suitable demodulator 3935 to recover the second information portion and a module 3930 is provided for identifying the sub-carriers used for transmission and comparing the identified sub-carriers with the grammar in order to determine the first information portion. The original information signal can then be reconstructed by combining the portions of the first information and the second information using a combiner 3940.

Reference has been made to various examples in the preceding description. It should be understood that reference to an example implies that alternative, but not necessarily explicitly disclosed implementations can be used.

As used herein the term orthogonal may mean strictly orthogonal or substantially orthogonal (i.e. not significantly correlated).

The blocks illustrated in FIG. 15 may represent steps in a method and/or sections of code in the computer program. The illustration of a particular order to the blocks does not necessarily imply that there is a required or preferred order for the blocks and the order and arrangement of the block may be varied. Furthermore, it may be possible for some steps to be omitted.

Features described in the preceding description may be used in combinations other than the combinations explicitly described.

Although functions have been described with reference to certain features, those functions may be performable by other features whether described or not.

Although features have been described with reference to certain embodiments, those features may also be present in other embodiments whether described or not.

Whilst endeavoring in the foregoing specification to draw attention to those features of the invention believed to be of particular importance it should be understood that the Applicant claims protection in respect of any patentable feature or combination of features hereinbefore referred to and/or shown in the drawings whether or not particular emphasis has been placed thereon.

At least one of the following features may apply to one or more embodiments of the invention described above.

A method of communicating information optionally comprises dividing the information into at least a first information portion and a second information portion; modulating a plurality of domain resources to encode the first information using an index or grammar; and encoding the second information by modulation of domain resources.

Modulating the plurality of domain resources to encode the first information optionally comprises allocating at least two different modulation types to a plurality of sub-carriers. Encoding the first information portion optionally comprises selecting which modulation type is allocated to which domain resource according to the index or grammar, which applies meaning to which modulation type is allocated to which domain resource.

Modulating the plurality of domain resources to encode the first information optionally comprises encoding a part of the first information portion using one or more domain resources of a first domain and another part of the first information portion is encoded using one or more domain resources of a second domain. Modulating the plurality of domain resources to encode the first information optionally comprises encoding at least a further part of the first information portion using one or more domain resources of a third domain.

The first, second and/or third domains optionally comprise the frequency, time and/or spatial domains and/or the domain resources comprise sub-channels of a frequency domain, beams arranged in a spatial domain and/or time slots in a time domain. Values are optionally associated with domain resources of at least one domain and wherein at least part of the first information portion is encoded by providing a signal using a domain resource indicative of the value of the portion of the data. Values are optionally associated with domain resources of at least two domains, and wherein the first information portion is at least partially encoded by providing a signal using domain resources from the at least two domains indicative of the value of parts of the first information portion.

A method of communicating information optionally comprises dividing the information into at least a first information portion and a second information portion; encoding the first information portion by allocating at least two different modulation types to a plurality of subcarriers; and encoding the second information by modulation of subcarriers belonging to a subset of the plurality of subcarriers.

Encoding the first information portion optionally comprises selecting which modulation type is allocated to which subcarrier according to a grammar that applies meaning to which modulation type is allocated to which subcarrier. Each subcarrier is optionally associated with an index in a ordered series of indexes, wherein the modulation type of a subcarrier assigns a value to the associated index and wherein assigned values, ordered according to the ordered series of indexes, provide a data word representing the first information portion.

A method optionally comprises: encoding the first information portion by allocating only two different modulation types to the subcarriers. The first information portion optionally comprises a first subset of information bits and a second subset of information bits, further comprising selecting a first information encoding scheme from a plurality of different first information encoding schemes, each of which has a different allocation of modulation types to the first and second subsets. The plurality of different first information encoding schemes are optionally predetermined and shared with a receiver.

At least one of the above methods optionally comprises transmitting control information that identifies the selected first information encoding scheme. At least one of the above methods optionally further comprises encoding the control information by modulation of subcarriers.

At least one of the above methods optionally comprises identifying within the first information portion a first subset of information bits and a second subset of information bits; selecting the majority subset of the first and second subsets; and using the majority subset to allocate a first modulation type to a first plurality of subcarriers.

At least one of the above methods optionally comprises selecting a first information encoding scheme, for determining the allocation of the at least two different modulation types amongst the plurality of subcarriers that maximises the available bandwidth for the remaining information portions. At least one of the above methods optionally comprises utilising some of the bandwidth for encoding control information and/or for degenerate encoding a portion of the second information portion.

At least two different modulation types optionally comprise a first modulation type that modulates a subcarrier with a first fixed amplitude and a second modulation type that modulates a subcarrier with a second fixed amplitude.

Optionally, at least two different modulation types enable on-off keying (OOK), the first amplitude representing suppression of subcarriers and the second amplitude representing non suppression of the subcarriers.

At least one of the above methods optionally comprises power reallocation from the suppressed subcarriers to the non suppressed subcarriers.

At least two different modulation types optionally comprise a first modulation type that modulates a subcarrier with a higher order modulation and a second modulation type that modulates a subcarrier with a lower order modulation.

A transmitter apparatus optionally comprising means for dividing the information into at least a first information portion and a second information portion; means for encoding the first information portion by allocating at least two different modulation types to a plurality of subcarriers; and means for encoding the second information by modulation of subcarriers belonging to a subset of the plurality of subcarriers The transmitter apparatus optionally further comprises means for performing at least one of the methods described above.

A transmitter apparatus optionally comprising splitter circuitry configured to divide the information into at least a first information portion and a second information portion; inter-carrier modulation circuitry configured to encode the first information portion by allocating at least two different modulation types to a plurality of subcarriers; and intra-carrier modulation circuitry configured to encode the second information by modulation of subcarriers belonging to a subset of the plurality of subcarriers.

A method of communicating information optionally comprising decoding first information portion by determining the allocation of at least two different modulation types to a plurality of subcarriers; and decoding second information by demodulation of subcarriers belonging to a subset of the plurality of subcarriers; and combining the first information portion and the second information portion.

Decoding the first information portion optionally comprises determining which modulation type is allocated to which subcarrier and applying meaning according to a grammar that applies meaning to which modulation type is allocated to which subcarrier.

Each subcarrier is optionally associated with an index in a ordered series of indexes, wherein the modulation type of a subcarrier assigns a value to the associated index and wherein assigned values, ordered according to the ordered series of indexes, provide a data word representing the first information portion.

At least one method described above optionally comprises determining which modulation type is allocated to which subcarrier; decoding the first information portion according to different encoding schemes by applying meaning according to a grammar which applies a meaning to which modulation types are allocated to which subcarriers, wherein each encoding scheme has its own grammar; and selecting one of the first information portions created according to different encoding schemes.

At least one method described above optionally comprises identifying the encoding scheme is use; and decoding the first information portion by determining which modulation type is allocated to which subcarrier and applying meaning according to a grammar of the identified encoding scheme that applies meaning to which modulation type is allocated to which subcarrier.

At least two different modulation types optionally comprise a first modulation type that modulates a subcarrier with a higher order modulation and a second modulation type that modulates a subcarrier with a lower order modulation.

A receiver apparatus optionally comprises means for decoding first information portion by determining the allocation of at least two different modulation types to a plurality of subcarriers; means for decoding second information by demodulation of subcarriers belonging to a subset of the plurality of subcarriers; and means for combining the first information portion and the second information portion.

The receiver optionally further comprises means for performing at least one of the methods described above.

A receiver apparatus optionally comprising inter-carrier modulation detection circuitry configured to decode first information portion by determining the allocation of at least two different modulation types to a plurality of subcarriers; intra-carrier demodulation circuitry configured to decode second information by demodulation of subcarriers belonging to a subset of the plurality of subcarriers; and combiner circuitry configured to combine the first information portion and the second information portion.

A system optionally comprises at least one of the receiver apparatus described above and the at least one of the transmitter apparatus described above.

At least one method described above optionally comprises dividing the information into at least a first information portion and a second information portion; communicating the first information portion by allocating an operational pattern to a plurality of wireless channels; and communicating the second information by wireless communication via one or more of the wireless channels.

The wireless channels optionally have a plurality of potential different states and wherein the first information is communicated by allocating a state for each wireless channel, wherein the collection of states form the operational pattern. The wireless channels optionally include orthogonal subcarriers that have different modulation states. The wireless channels optionally include time slots that have different modulation states.

A method of communicating information optionally comprises dividing the information into at least a first information portion and a second information portion; encoding the first information portion by allocating at least two different modulation types to a plurality of orthogonal multiplexing domain subunits; and encoding the second information by modulation of orthogonal multiplexing domain subunits belonging to a subset of the plurality of orthogonal multiplexing domain subunits.

A method of communicating information optionally comprises dividing the information into at least a first information portion and a second information portion; encoding the first information using domain resource-index modulation; and encoding the second information by modulation of domain resources.

A method of communicating information optionally comprises dividing the information into at least a first information portion and a second information portion; encoding the first information using inter-domain resource differentiation; and encoding the second information by modulation of domain resources.

A method of communicating information optionally comprises dividing the information into at least a first information portion, a second information portion and a third information portion; encoding the first information portion by allocating at least two different modulation types to a plurality of first orthogonal multiplexing domain subunits; encoding the second information portion by allocating at least two different modulation types to a plurality of second orthogonal multiplexing domain subunits; and encoding the third information by modulation of orthogonal multiplexing domain subunits belonging to a subset of the plurality of first orthogonal multiplexing domain subunits and second orthogonal multiplexing domain subunits.

A method of communicating information optionally comprises dividing the information into at least N portions; encoding the each one of M of the N portions by allocating at least two different modulation types to a plurality of orthogonal multiplexing domain subunits; and encoding the N-M portion(s) by modulation of orthogonal multiplexing domain subunits.

At least one method described above optionally comprises encoding at least one of the M portions by allocating at least $2^M$ different modulation types to a plurality of orthogonal multiplexing domain subunits. The plurality of orthogonal multiplexing domain subunits optionally comprise domain subunits from two or more domains. The plurality of orthogonal multiplexing domain subunits optionally comprise domain subunits from two or more of the frequency domain, the time domain and the spatial domain.

The plurality of subcarriers optionally comprise subcarriers of two or more domains. The plurality of subcarriers optionally comprise subcarriers of two or more of the frequency domain, the time domain and the spatial domain.

A first information portion is optionally encoded using one or more sub-units of a first domain and at least a second information portion is encoded using one or more sub-units of a second domain. At least one method described above optionally comprises encoding at least a third information portion using one or more sub-units of a third domain. The domains optionally comprise the frequency, time and/or spatial domains.

Values are optionally associated with subcarriers of at least one domain and wherein a respective portion of the data is optionally encoded by providing a signal using a sub-unit indicative of the value of the portion of the data.

A portion of the data is optionally provided by allocating at least two different modulation types to a plurality of sub-units of at least one domain.

At least one embodiment of the present relates to invention wireless communication systems. At least one embodiment of the present invention relates to a novel and improved system and/or a method to enhance the performance of wireless communication systems employing multiple transmitter elements and at least one receiver element, sometimes referred to as multiple input multiple output (MIMO) systems for multiple receiver elements and multiple input single output (MISO) systems for a single receiver element.

In multiple input multiple output and multiple input single output systems (MIMO and MISO), Spatial Modulation is used. The fundamental component of Spatial Modulation is the exploitation of the spatial domain, i.e., the spatial position of the antenna at the transmitter-side, as a means for sending information through a wireless fading channel. In particular, the underlying principle of Spatial Modulation is twofold: i) at the transmitter-side, a one-to-one mapping of information data to transmit antennas, thus allowing them to convey information, and ii) at the receiver-side, the exploitation, thanks to the stochastic properties of wireless fading channels, of distinct multipath profiles received from different transmit antennas.

Contributions which are available for Spatial Modulation have been based on the same assumption: a uniform power allocation mechanism among the active transmit antennas is assumed a priori. The key problem of optimizing the effective spatial constellation pattern of Spatial Modulation has been addressed. However, the known optimization is based on the activation and de-activation of a set of antennas rather than on power allocation mechanisms. A uniform power allocation strategy is implicitly retained in the analysis.

Known solutions do also not fully exploit all degrees of freedom and potentialities of Spatial Modulation (SM) concept. In particular, the common limitation of all above techniques for SM is not taking maximum advantage of multiple antennas at the transmitter-side to obtain transmit-diversity gains. As a matter of fact, signal designs and optimal detectors available so far offer a diversity order that depends on the number of receive antennas only. As a consequence, SM methods proposed to date might find limited applicability to low-complexity and low-cost downlink settings and operations, where it is more economical to add equipment to base stations rather than to remote mobile units.

Spatial modulation is considered in: Y. Chau and S.-H. Yu, "Space shift keying modulation", U.S. Pat. No. 9,985,988, Filed Nov. 7, 2001, Pub. Date Jul. 18, 2002; and Y. A. Chau and S.-H. Yu, "Space modulation on wireless fading channels", IEEE Vehicular Technology Conference—Fall, vol. 3, pp. 1668-1671, October 2001.

The disadvantages of such SM methods are as follows:

Even though two transmit-antennas are employed in the communication link, the SM proposal of Chau and Yu offers a diversity order only equal to one.

The error probability in depends only on the channel power gain of the wireless link related to the antenna that can be either switched on or off during data transmission. As a consequence, in an adaptive system and for optimizing the system performance, the antenna with the best (average) channel conditions may be chosen as the one to be switched on and off.

The SM concept introduced by Chau and Yu, which is called Space Shift Keying (SSK) in which only one transmit-antenna is activated when message 1 has to be sent, while both transmit-antennas are activated when a message 2 needs to be sent. Thus when message 2 has to be sent, each antenna at the transmitter-side is required to transmit a signal with a corresponding energy. This leads to a power consumptions cost which is twice with respect to that required when message 1 is sent.

Other SM methods are proposed in: C.-W. Ahn, S.-B. Yun, E.-S. Kim, H. Haas, R. Mesleh, T.-I. Hyon, and S. McLaughlin, "Spatial modulation method and transmitting and receiving apparatuses using the same in a multiple input multiple output system", Filed Jul. 10, 2007, Pub. Date Feb. 14, 2008; R. Y. Mesleh, H. Haas, S. Sinanovic, C. W. Ahn, and S. Yun, "Spatial modulation", IEEE Transactions on Vehicular Technology, vol. 57, no. 4, pp. 2228-2241, July 2008; and J. Jeganathan, A. Ghrayeb, and L. Szczecinski, "Spatial modulation: Optimal detection and performance analysis", IEEE Communications Letters, vol. 12, no. 8, pp. 545-547, August 2008.

The disadvantages of such SM methods are as follows:

Even though two transmit-antennas are employed in the communication link, the SM proposal in Mesleh et al and Jeganathan et al offers, similar to Chau and Yu, a diversity order only equal to 1.

The error probability depends on both complex channel gains and, in particular, is a function of the difference of them. As a consequence, depending on the instantaneous channel conditions, constructive and destructive combinations can take place, thus preventing the full exploitation of the two transmit-antennas for diversity purposes.

The error probability is a function of the spatial correlation coefficient and, in particular, the more the wireless links are correlated, the worse the error probability is.

At least one embodiment described herein has an object of improving an error probability for wireless fading channels, i.e. increase the robustness and reliability of data transmission.

At least one embodiment described herein has an object of improving spectral efficiency for varying channel conditions.

At least one embodiment described herein has an object of providing a wireless communication system, based on Spatial Modulation, with transmit-diversity capabilities.

At least one method described herein optionally comprises a method of spatial modulation to identify a transmitter element within a transmission array of at least two transmitter elements, each transmitter element being located at a transmitter, wherein a signal is transmitted by one active transmitter element at a time over a channel to a receiver, the method comprising: allocating power to the transmitter elements wherein the power is allocated differently between at least two transmitter elements, receiving transmitted data at the receiver and detecting location of the active transmitter element using knowledge of the power allocated to the transmitter elements.

At least one method described herein optionally comprises determining an error probability of the signal and determining a power allocation model for the transmitter elements by optimizing the average bit error probability of the signal, wherein the step of allocating power to the transmitter elements is performed according to the determined power allocation model.

The error probability optionally comprises an average bit error probability.

Optionally, the channel comprises a wireless link. More preferably, the channel comprises an optical wireless link, for example using a coherent or incoherent light source.

Preferably, the transmitter elements could include radio frequency antennae or other signal emitters, such as loudspeakers, ultrasound transmitters, multiple LEDs (light emitting diodes), etc.

The receiver optionally comprises at least one receiver element, which can be for example a detector for radio frequency, acoustic or ultrasound signals or a photo detector.

Preferably, each channel has a defined impulse response which can include a fading condition of the related channel as gain. The fading condition is optionally determined by a statistical method, such as Rayleigh fading or Nakagami-m fading. If little or no fading is present, an additive white Gaussian noise distribution can optionally be used.

The impulse response of each channel optionally includes a delay of the related channel which can be independent and uniformly distributed at least in a predetermined interval. The delay can be known at the receiver. A time-synchronization is optionally performed at the receiver.

The impulse response of each channel optionally includes a phase of the related channel.

Preferably, the optimizing of the average bit error probability, also referred to as ABEP, includes a minimization of the average bit error probability.

Preferably, the average bit error probability of the signal is a function of the impulse responses of the respective channels.

Preferably, the receiver provides full information of the channel state, which is also referred to as channel state information (CSI). The full channel state information optionally comprises the knowledge of the gain, phase and delay of each channel. Preferably, phase information is not necessarily required, for example when incoherent light sources are used as transmitter elements. In alternative embodiments, other receivers, for example with partial channel state information, which have been developed in relation with spatial modulation performance analyses, can be used.

The respective channels are optionally correlated or uncorrelated. Correlation coefficients between the channels can optionally be determined at the receiver.

Preferably, the total power, i.e. the sum of the energies transmitted when data is transmitted from each transmitter element of the transmission array to the receiver, is fixed to a given value. In an alternative embodiment, a power control is optionally applied in which the total power depends on the channel environment and/or propagation of the signal.

The optimization or minimization of the average error probability is optionally obtained by using one or more either analytical or numerical methods. Preferably, a model of power allocation is generated at the receiver. The model of power allocation may consider the correlation coefficients between the channels. The model of power allocation may also consider the impulse responses, and/or the fading condition in particular, of the channels.

More preferably, the location of a transmitter element is detected by using data of the model of power allocation. Preferably, the active transmitter element can transmit modulated data, thereby conveying data by both an index of the transmitter element and by the modulated signal.

Preferably, each channel has a unique impulse response, and the method further comprises: predetermining a power allocation sequence of a transmitter element, in the step of allocating power to the transmitter elements, allocating the power allocation sequence to the transmitter elements, and in the step of detecting location of the active transmitter element, using knowledge of the power allocation sequence of the active transmitter element.

Preferably, the channel comprises a wireless link. More preferably, the channel comprises an optical wireless link, for example using a coherent or incoherent light source.

Preferably, the transmitter elements could include radio frequency antennae or other signal emitters, such as loudspeakers, ultrasound transmitters, multiple LEDs (light emitting diodes), etc.

The receiver preferably comprises at least one receiver element, which can be for example a detector for radio frequency, acoustic or ultrasound signals or a photo detector.

Preferably, each channel has a defined impulse response which can include a fading condition of the related channel as gain. The fading condition is optionally determined by a statistical method, such as Rayleigh fading or Nakagami-m fading. In an alternative embodiment, in which little or no fading is present, an additive white Gaussian noise distribution can be used.

The impulse response of each channel may also include a delay of the related channel which can be independent and uniformly distributed at least in a predetermined interval. The delay can be known at the receiver. A time-synchronization may be performed at the receiver.

The impulse response of each channel optionally also includes a phase of the related channel. The respective channels are optionally correlated or uncorrelated.

The power allocation sequences allocated to the transmitter element optionally comprises a random sequence. Preferably, the power allocation sequences allocated to different transmitter elements are provided such that they are easily distinguishable from each other by using a corresponding detection method. The power allocation sequence allocated to a transmitter element is optionally stored in a storage, such as a look-up table, at the receiver to be accessed when the location of a transmitter element is to be detected.

Preferably, the active transmitter element can transmit modulated data, thereby conveying data by both an index of the transmitter element and by the modulated signal.

Preferably, the method further comprises receiving transmitted training data at the receiver during a training phase, predetermining a power allocation sequence according to received training data, in the step of allocating power to the transmitter elements, allocating the power allocation sequence to the transmitter elements, terminating the training phase, receiving transmitted data at the receiver after the training phase, and in the step of detecting location of the active transmitter element, using knowledge of the power allocation sequence of the active transmitter element.

Preferably, the channel comprises a wireless link. More preferably, the channel comprises an optical wireless link, for example using a coherent or incoherent light source.

Preferably, the transmitter elements could include radio frequency antennae or other signal emitters, such as loudspeakers, ultrasound transmitters, multiple LEDs (light emitting diodes), etc.

The receiver preferably comprises at least one receiver element, which can be for example a detector for radio frequency, acoustic or ultrasound signals or a photo detector.

Preferably, each channel has a defined impulse response which can include a fading condition of the related channel as gain. The fading condition is optionally determined by a statistical method, such as Raleigh fading or Nakagami-m fading.

The impulse response of each channel optionally also includes a delay of the related channel which can be independent and uniformly distributed at least in a predetermined interval. The delay may be known at the receiver. A time-synchronization may be performed at the receiver.

The impulse response of each channel optionally also include a phase of the related channel. Preferably, in one embodiment, the receiver provides full information of the channel state, which is also referred to as channel state information (CSI). The full channel state information optionally comprises the knowledge of the gain, phase and delay of each channel. Preferably, phase information is not necessarily required, for example when incoherent light sources are used as transmitter elements. In alternative embodiments, other receivers, for example with partial channel state information, which have been developed in relation with spatial modulation performance analyses, can be used. Preferably, the full channel state information (full CSI) is obtained during the training phase prior to transmitting data.

The respective channels are optionally correlated or uncorrelated. The channel state information may comprise correlation coefficients between the channels. The received data prior to allocating the power allocation sequence to the transmitter element optionally comprises and may consider channel state information, such as correlation coefficients between the channels or the impulse response of the channels to determine the power allocation sequence of the related transmitter elements. The power allocation sequence allocated to a transmitter element is optionally stored in a storage, such as a look-up table, at the receiver to be accessed when the location of a transmitter element is to be detected.

Preferably, the active transmitter element can transmit modulated data, thereby conveying data by both an index of the transmitter element and by the modulated signal.

The invention as stated above may improve the performance of Spatial Modulation by, for example, allocating in an opportunistic fashion the transmission power, while keeping the simplicity of Spatial Modulation at the transmitter and receiver side. The invention allows to artificially create unbalanced fading conditions to make the transmit-receive wireless links more distinguishable to each other. Furthermore, it may help to reduce the effect of spatial channel correlation.

Thus, the determination of the location of an active transmitter element within an array of at least two transmitter elements is facilitated.

The present invention may be applied to an arbitrary number of transmitter elements at the transmitter and receiver elements at the receiver. Moreover, the invention can be applied to distributed and virtual MIMO systems using Spatial Modulation.

At least one embodiment comprises a transmission apparatus for identifying a transmitter-element within a transmission array of at least two transmitter-elements, each transmitter-element being located at a transmitter, wherein a signal is transmitted by one active transmitter-element at a time over a channel to a receiver, the transmission apparatus comprising a power allocator to allocate power to the transmitter-elements wherein the power is allocated differently between at least two transmitter-elements.

Preferably, the transmission apparatus further comprises a calculator to determine a power allocation model for the transmitter-elements by optimizing an average bit error probability of the signal, wherein the power allocator allocates power to the transmitter-elements according to the determined power allocation model.

Preferably, each channel has a unique impulse response, and the transmission apparatus further comprises a sequence predetermination module to predetermine a power allocation sequence of a transmitter element, wherein the power allocator allocates the power allocation sequence to the transmitter elements.

At least one embodiment of the present invention comprises a receiver apparatus for identifying a transmitter-element within a transmission array of at least two transmitter-elements, each transmitter-element being located at a transmitter, wherein a signal is transmitted by one active transmitter-element at a time over a channel to the receiver apparatus, the receiver apparatus being configured to receive transmitted data and comprising a location detector to detect location of the active transmitter-element using knowledge of the power allocated to the transmitter-elements.

Preferably, the receiver apparatus further comprises a channel estimator to determine an error probability of the signal and a model generator to determine a power allocation model for the transmitter-elements by optimizing the average bit error probability of the signal. Preferably, each channel has a unique impulse response, and the location detector, in detecting location of the active transmitter element, is operable to use knowledge of a power allocation sequence of the active transmitter element.

Preferably, the receiver apparatus is operable to receive transmitted training data at the receiver apparatus during a training phase, to feed back training data to a transmitter apparatus for predetermining a power allocation sequence according to the training data and for allocating a power allocation sequence to the transmitter elements, and the location detector, in detecting the location of the active transmitter element, is operable to use knowledge of the power allocation sequence of the active transmitter element.

At least one embodiment optionally comprises a spatial modulation system for identifying a transmitter-element within a transmission array of at least two transmitter-elements, each transmitter-element being located at a transmitter, wherein a signal is transmitted by one active transmitter-element at a time over a channel to a receiver, the system comprising the transmitter apparatus and the receiver apparatus.

The spatial modulation system optionally incorporates any of the features described herein.

One or more embodiments optionally comprise a computer program product containing one or more sequences of machine-readable instructions for spatial modulation to identify a transmitter-element within a transmission array of at least two transmitter-elements, each transmitter-element being located at a transmitter, wherein a signal is transmitted by one active transmitter-element at a time over a channel to a receiver, the instructions being adapted to cause one or more processors to: allocate power to the transmitter-elements wherein the power is allocated differently between at least two transmitter-elements, receive transmitted data at the receiver and detect location of the active transmitter-element using knowledge of the power allocated to the transmitter-elements.

The computer program product optionally incorporates any feature described herein One or more embodiments optionally comprise or implement a method of spatial modulation to identify a transmitter within a transmission array of at least two transmitter elements, wherein a signal is transmitted by one active transmitter element at a time over a channel to a receiver, the method comprising predetermining a waveform of the signal prior to transmitting it to the receiver, wherein channel signatures of two different channels form a pair of channel signatures respectively, and wherein the waveform is predetermined to exploit the pair of channel signatures to cause a difference between signals transmitted over the different channels, receiving transmitted data at the receiver, and detecting location of the active transmitter element using the difference between the transmitted signals.

Preferably, the channels signatures comprise propagation delays. Preferably, the pair of channel signatures is subject to an orthogonality condition. Preferably, the channel comprises a wireless link. More preferably, the channel comprises an optical wireless link, for example using a coherent or incoherent light source. Preferably, the transmitter elements could include radio frequency antennae or other signal emitters, such as loudspeakers, ultrasound transmitters, multiple LEDs (light emitting diodes), etc.

The receiver preferably comprises at least one receiver element, which can be for example a detector for radio frequency, acoustic or ultrasound signals or a photo detector.

The waveform of the signal is optionally subject to a delta function, such as a Dirac's delta function.

Preferably, the signals transmitted to the receiver are sent with a similar, more preferably with an equal, energy from each of the transmitter elements. Preferably, each channel has a defined impulse response which can include a fading condition of the related channel as gain. The fading condition may be determined by a statistical method, such as Rayleigh fading or Nakagami-m fading.

The propagation delay of the related channel may be independent and uniformly distributed at least in a predetermined time interval, in particular in the interval $[0, T_m)$, wherein $T_m$ is the signalling internal for all signals being sent from the transmitter elements. The impulse response of each channel optionally also includes a phase of the related channel.

Preferably, in one embodiment, the receiver provides full information of the channel state, which is also referred to as channel state information (CSI). The full channel state information optionally comprises the knowledge of the gain, phase and delay of each channel. Preferably, phase information is not necessarily required, for example when incoherent light sources are used as transmitter elements. In alternative embodiments, other receivers, for example with partial channel state information, which have been developed in relation with spatial modulation performance analyses, can be used. Preferably, the full channel state information (full CSI) is obtained during the training phase prior to transmitting data.

The respective channels can be correlated or uncorrelated. The channel state information optionally comprises correlation coefficients between the channels.

The Spatial Modulation concept is further improved by the introduction of an optimal signal design at the transmitter and an optimal detection algorithm at the receiver.

Furthermore, transmit-diversity gains for Spatial Modulation are allowed according to one aspect of the invention. The Spatial Modulation according to this invention is inherently more robust than other Spatial Modulation proposals to spatial correlation of fading.

When the receiver is equipped with multiple antennas, the invention offers transmit- and receive-diversity at the same time.

With regard to the Spatial Modulation assisted by time-orthogonal signal design, a feedback channel from the receiver to the transmitter may be required to have the relative times of arrival (i.e., timing information) of all transmitter element indexes after propagation through the wireless channel. The synchronization unit at the receiver optionally estimates these delays during a training phase before data transmission, and send back them to the transmitter via a control channel. Upon reception of this information, the transmitter optionally selects the best signal design to guarantee signal orthogonality at the receiver via a Maximum Likelihood (ML) optimal detector described in further detail below.

Optionally, at least one embodiment of the present invention comprises a transmission apparatus for identifying a transmitter within a transmission array of at least two transmitter elements, wherein a signal is transmitted by one active transmitter element at a time over a channel to a receiver, the transmission apparatus comprising a waveform calculator to predetermine a waveform of the signal prior to transmitting it to the receiver, wherein channel signatures of two different channels form a pair of channel signatures respectively, and wherein the waveform is predetermined to exploit the pair of channel signatures to cause a difference between signals transmitted over the different channels.

Optionally, at least one embodiment of the present invention comprises a spatial modulation system for identifying a transmitter-element within a transmission array of at least two transmitter-elements, each transmitter-element being located at a transmitter, wherein a signal is transmitted by one active transmitter-element at a time over a channel to a receiver, the system comprising the transmitter apparatus and a receiver apparatus operable to receive transmitted data and detect location of the active transmitter element using the difference between the transmitted signals.

The spatial modulation system may incorporate any of the features described herein.

Optionally, at least one embodiment of the present invention comprises a computer program product containing one or more sequences of machine-readable instructions for spatial modulation to identify a transmitter within a transmission array of at least two transmitter elements, wherein a signal is transmitted by one active transmitter element at a time over a channel to a receiver, the instructions being adapted to cause one or more processors to predetermine a waveform of the signal prior to transmitting it to the receiver, wherein channel signatures of two different channels form a pair of channel signatures respectively, and wherein the waveform is predetermined to exploit the pair of channel signatures to cause a difference between signals transmitted over the different channels, receive transmitted data at a receiver, and detect location of the active transmitter element using the difference between the transmitted signals.

The computer program product may incorporate any of the features described herein.

To understand the motivation of the proposed power allocation method and the substantial performance improvement that can be achieved with it over wireless channels, some numerical examples are now described. The examples are shown in FIGS. 26 to 29. These figures represent the ABEP of a N t×1 SM-MIMO system, with N t denoting the number of transmitter elements at a transmitter. Throughout this application, when the term "transmitters" or "transmit-antenna" is used, this refers to transmitter elements at the transmitter. Accordingly, the term "receivers" or "receive-antenna" refers to receiver elements.

FIGS. 26 to 29 are obtained by considering a Nakagami-m fading channel with parameters $\{m_i\}_{i=1}^{N_t}$ and $\{\Omega_i\}_{i=1}^{N_t}$ on a wireless link between an i-th transmit-antenna and a single receive-antenna. FIGS. 26 to 29 are obtained by assuming a uniform power allocation mechanism among the transmit-antennas ($E_m/N_0$ denotes the average Signal-to-Noise Ratio, SNR, for each wireless link), but for balanced (i.e., $\{\Omega_i\}_{i=1}^{N_t}$ are the same in all wireless links) and unbalanced (i.e., $\{\Omega_i\}_{i=1}^{N_t}$ can be different among the various wireless links) fading channels. It will be described in further detail below that the latter system setup is equivalent to have balanced fading channels with a non-uniform power allocation among the transmit-antennas. FIGS. 26 to 29 show both Monte Carlo simulations and an accurate analytical framework. The analytical model will be described in more detail below/with regard to FIG. 30.

Figure 26:
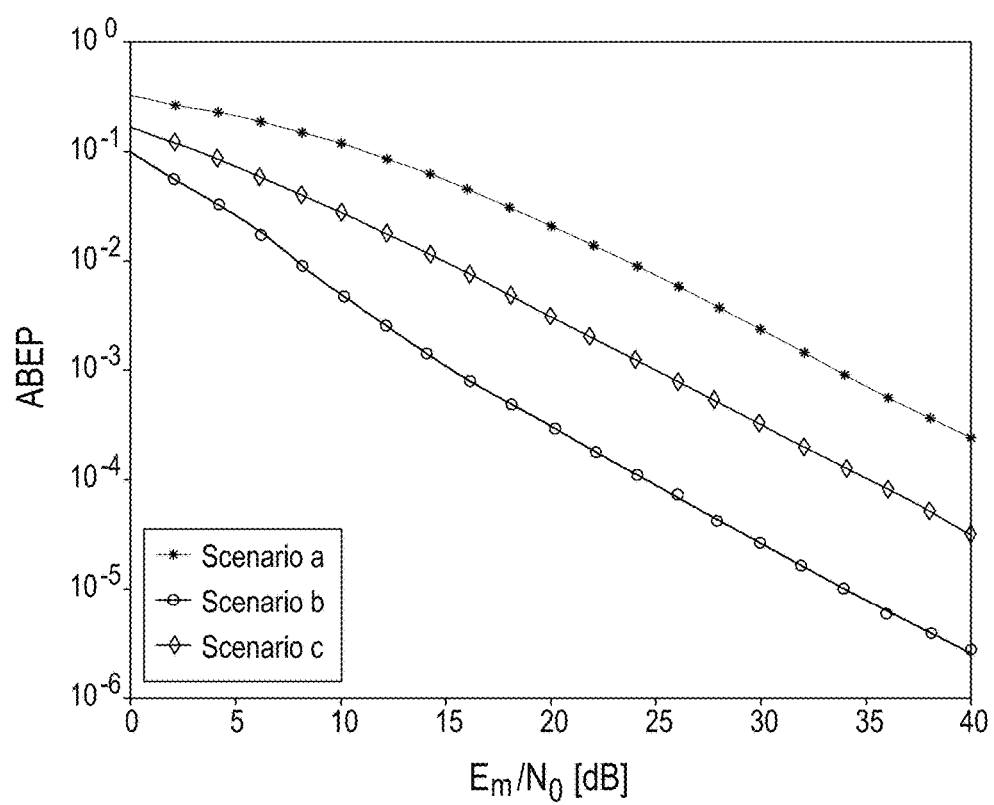
FIG. 26 is a graph showing the Average Bit Error Probability (ABEP) when a fading correlation model is considered assuming a uniform power allocation mechanism among the transmit antennas according to the prior art.

In FIG. 26, the ABEP is shown when a fading correlation model is considered. The following scenarios are applied:
Scenario a: $f_1=f_2=1$, $\Omega_1=\Omega_2=2/3$, $\rho_1=0.50$, $\rho_2=\rho_3=\rho_4=0.45$.
Scenario b: $f_1=1$, $f_2=2.5$, $\Omega_1=1$, $\Omega_2=10$, $\rho_1=\rho_2=\rho_3=\rho_4=0.45$.
Scenario c: $f_1=f_2=1$, $\Omega_1=2/3$, $\Omega_2=20/3$, $\rho_1=0.50$, $\rho_2=\rho_3=\rho_4=0.45$. $N_t=2$.

Both Monte Carlo simulation (markers) and analytical model (solid lines) are shown. The ABEP changes significantly with the correlation coefficient ($\rho_1, \rho_2, \rho_3, \rho_4$) and the fading severity ($f_1, f_2$). This latter phenomenon can be observed by comparing Scenario b and Scenario c in FIG. 26, where a non-negligible performance gap is observable (for the same power imbalance ratio $\Omega_2/\Omega_1$). This result emphasizes that the performance of SM is strongly affected by the characteristics of the wireless channel and the fading distribution as well, since Scenario c is representative of a Rayleigh fading channel.

Figure 27:
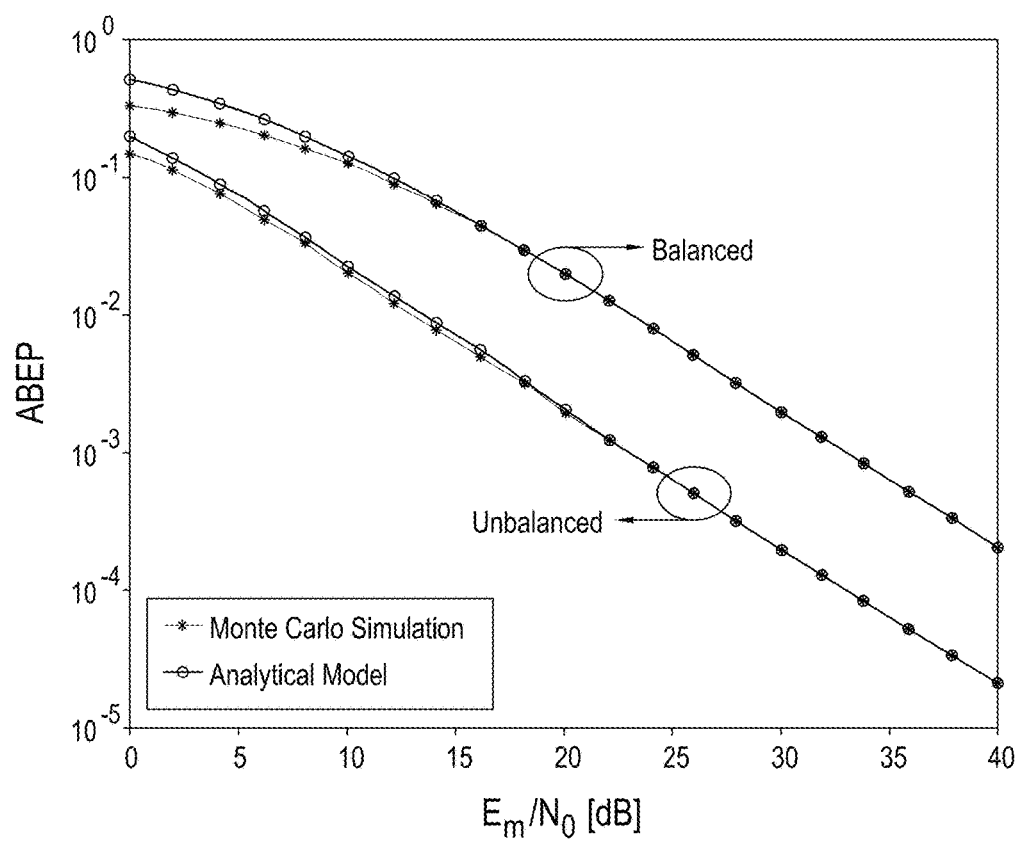
FIG. 27 is a graph showing an analysis of the ABEP for uncorrelated fading channels and for a different power imbalance among wireless links assuming a uniform power allocation mechanism among the transmit antennas according to the prior art.

In FIG. 27, the ABEP is shown for uncorrelated fading channels and for a different power imbalance among the wireless links. For the balanced fading channel, $\Omega_1=\Omega_1=\Omega_1=\Omega_1=1$ is applied. For the unbalanced fading channel, $\Omega_1=1$, $\Omega_1=4$, $\Omega_1=8$, $\Omega_1=12$ is applied. The fading channels are uncorrelated, $f_1=f_2=f_3=f_4=2.5$ and $N_r=4$. Both Monte Carlo simulation and analytical model are shown. A significant performance improvement can be observed when the power links are unbalanced. The reason for this behaviour lies in the fact that power imbalance makes the wireless links more distinguishable to each other, thus making the decision process at the receiver more reliable and, thus, improving the ABEP.

Figure 28:
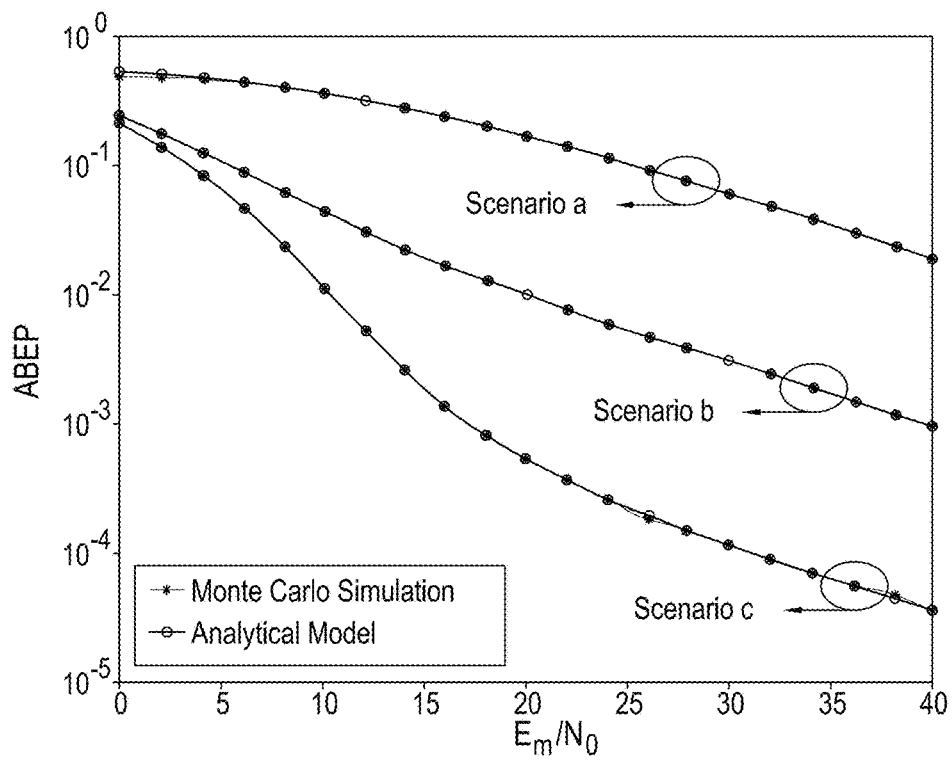
FIG. 28 is a graph showing an analysis of the ABEP for correlated fading channels and for a different power imbalance among the wireless links assuming a uniform power allocation mechanism among the transmit antennas according to the prior art.

In FIG. 28, the ABEP is shown for correlated fading channels and for a different power imbalance among the wireless links. The following scenarios are applied:
Scenario a: $f_1=1$, $f_2=5$, $\Omega_1=\Omega_1=1$.
Scenario b: $f_1=2$, $f_2=5$, $\Omega_1=10$, $\Omega_1=1$.
Scenario c: $f_1=5$, $f_2=2$, $\Omega_1=10$, $\Omega_1=1$.

Further, $\rho_1=\rho_2=\rho_3=0.45$, $\rho_4=-0.45$ is applied and $N_t=2$. Both Monte Carlo simulation and analytical model are shown. Similar to FIG. 27, a better performance can be achieved for unbalanced fading channels. Furthermore, an interesting comment can be made by carefully observing, in particular, the curves related to Scenario b and Scenario c. In both system setups the first wireless link has a greater power gain, but in Scenario b the fading severity ($f_1$) of the first link is smaller than the fading severity ($f_2$) of the second link. A significant performance difference, which highlights that besides the average power also the fading severity can remarkably alter the system performance.

Figure 29:
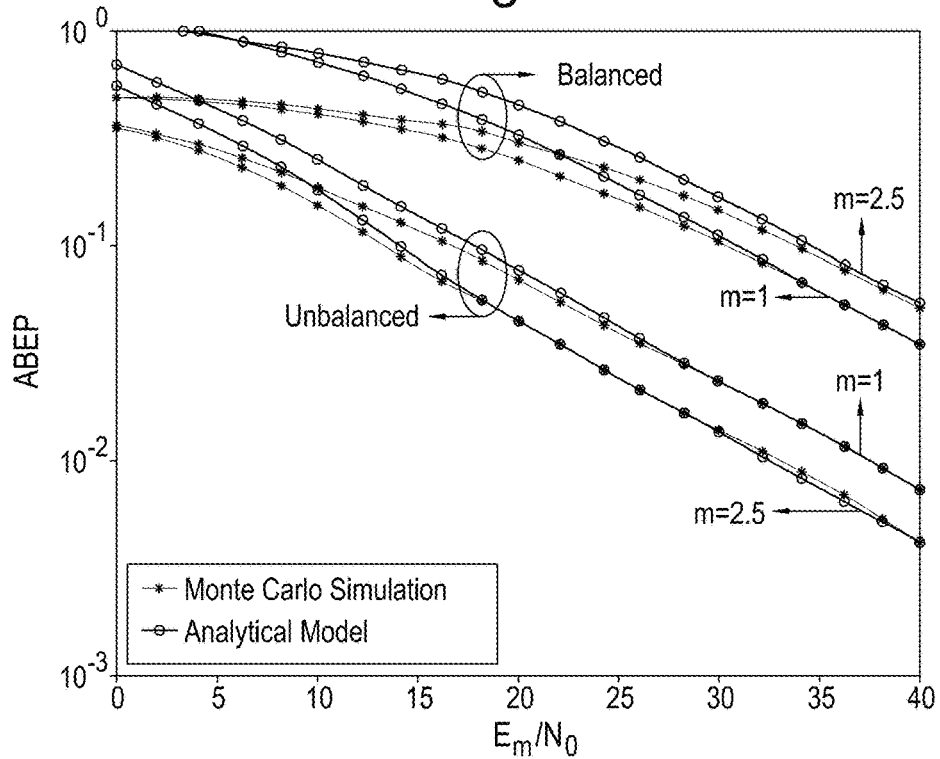
FIG. 29 is a graph showing the ABEP for correlated fading assuming a uniform power allocation mechanism among the transmit antennas according to the prior art.

In FIG. 29, the ABEP for correlated fading is shown. For the balanced fading channel, $\Omega_1=\Omega_2=\Omega_3=\Omega_4=1$ is applied. For the unbalanced fading channel, $\Omega_1=1$, $\Omega_2=4$, $\Omega_3=8$, $\Omega_4=12$ is applied. The fading channels are correlated with the correlation coefficient $\rho_{i,j}=\exp(-d_0|i-j|)$ with $d_0=0.22$ and (i, j) are antenna's indexes (i, j=1, 2, 3, 4). $N_r=4$. Both Monte Carlo simulation and analytical model are shown. The results in FIG. 29 confirm the conclusions already drawn in FIGS. 26 to 28, but also highlight that the fading severity (t) can have a different impact on the ABEP, as far as balanced and unbalanced system setups are considered: A different relation among the curves is noticed.

In summary, the numerical results shown in FIGS. 26 to 29 lead to the following conclusions:
1. The ABEP of SM gets better for unbalanced wireless fading channels.
2. The ABEP of SM depends on the fading severity and channel correlation of the wireless links.

Optionally, in at least one embodiment, ABEP-driven opportunistic power allocation mechanisms are described that aim at distributing the available power at the transmitter in an optimal fashion by taking into account the actual characteristics of all transmit-receive wireless links. In particular, the method according to this aspect of the present invention will help to make the wireless links more distinguishable among each other in order to emulate unbalanced fading conditions for those scenarios where the channel fading is actually identically distributed.

Figure 30:
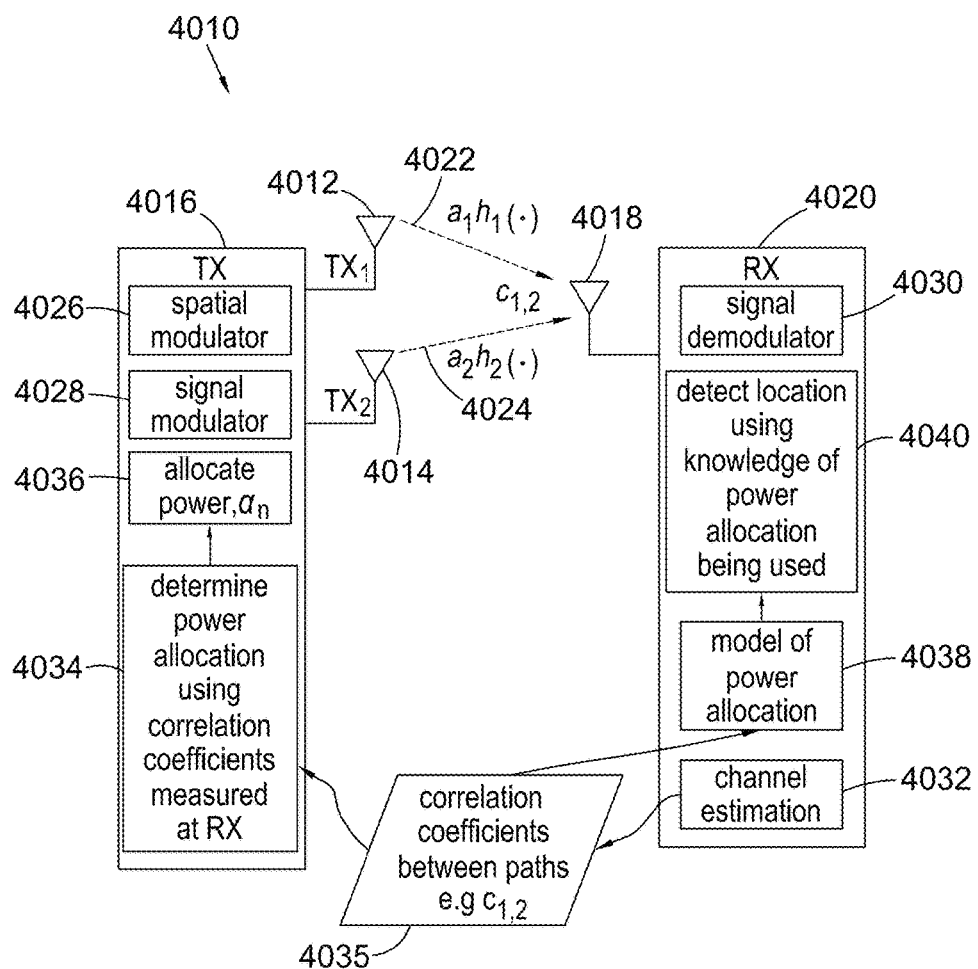
FIG. 30 shows a system setup for SM-MIMO.

In FIG. 30, a system 4010 for SM-MIMO is shown by way of example, which is composed by two transmit-antennas 4012, 4014 ($TX_1$, $TX_2$) at the transmitter 4016 (TX) and one receive-antenna 4018 at the receiver 4020 (RX). The system 4010 is used to describe the basic and fundamental idea behind the proposed power allocation method herein below. For analytical simplicity, a Rayleigh fading channel model with correlated channels 4022, 4024 is considered. However, it is emphasized that the invention outlined herein is applicable to generic MIMO and MISO systems that can be deployed in any wireless fading channel.

The main aim is to show that power imbalance and non-uniform power allocation are equivalent to each other.
The symbols and terms used herein are defined as follows:
A complex-envelope representation of signals is used throughout the description.
$j=\sqrt{-1}$ is the unitary unit.

$$\delta(t) = \begin{cases} 1 & \text{if } t = 0 \\ 0 & \text{if } t \neq 0 \end{cases}$$

is the Dirac's delta function.
$(x \otimes y)(t) = \int_{-\infty}^{+\infty} x(\xi) y(t-\xi) d\xi$ is the convolution operator of signals $x(\bullet)$ and $y(\bullet)$.
$(\bullet)^*$ denotes complex-conjugate.
$|\ |^2$ denotes the square absolute value.
$E\{\bullet\}$ denotes expectation operator.
$Re\{\bullet\}$ denotes real part operator.
$Pr\{\bullet\}$ means probability.
$G \sim N(\mu_G, \mu_G^2)$ is a Gaussian distributed Random Variable (RV) with mean $\mu_G$ and standard deviation $\sigma_G$.
$A \sim R(\bullet; \sigma_G^2)$ is a Raleigh distributed RV with $E\{A^2\}=2\sigma_A^2$
$P_{AB}$ denotes the correlation coefficient of RVs A and B.
$Q(x)=(1/\sqrt{2\pi})\int_0^{-\infty} \exp(-t^2/2)dt$ is the Q-function.
$\Gamma(x)=\int_0^{+\infty} t^{x-3} \exp(-t)dt$ is the Gamma function.
$m_1$ and $m_2$ denote the two information messages that the transmitter (TX) in FIG. 30 can emit.
$\hat{m}$ Denotes the message estimated at the receiver.
$E_{m_1}=\zeta_1 E_m$ and $E_{m_2}=\zeta_2 E_m$ are the energies transmitted for the information messages $m_1$ and $m_2$, respectively.
$\zeta_1$ and $\zeta_2$ are power scaling variables. $E_m$ is a constant factor.
$T_m=T_{m_1}=T_{m_2}$ denote the signalling internal for both information messages $m_1$ and $m_2$.
$h_1(t)=\beta_1 \exp(j\varphi_1)\delta(t-\tau_1)$ is the channel impulse response from antenna $TX_1$ to the receive-antenna, $\beta_1$, $\varphi_1$, and $\tau_1$ denote the gain, phase, and delay of the related wireless link. Moreover, $\alpha_1=\beta_1 \exp(j\varphi_1)$ denotes the channel's complex gain of the first wireless link.
Analogously, $h_2(t)=\beta_2 \exp(j\varphi_2)\delta(t-\tau_2)$ is the channel impulse response from antenna $TX_2$ to the receive antenna, and $\alpha_2$, $\varphi_2$, and $\tau_2$ denote the gain, phase, and delay of the related wireless link.
Moreover, $\alpha_2=\beta_2 \exp(j\varphi_2)$ denotes the channel's complex-gain of the second wireless link.
For the sake of simplicity, but without loss of generality, a Rayleigh fading is assumed for both wireless links $TX_1$-RX and $TX_2$-RX. In particular, $\alpha_1=\alpha_1^R+j\alpha_1^I$ and $\alpha_2=\alpha_2^R+j\alpha_2^I$ with $\alpha_j^R \sim N(0,\sigma_1^2)$, $\alpha_1^I \sim N(0,\sigma_1^2)$, $\alpha_2^R \sim N(0,\sigma_2^2)$, $\alpha_2^I \sim N(0,\sigma_2^2)$ and $\rho_{\alpha_1^R \alpha_1^I}=\rho_{\alpha_2^R \alpha_2^I}=\rho_{\alpha_1^R \alpha_2^I}=\rho_{\alpha_2^R \alpha_2^I}=0$, $\rho_{\alpha_1^R \alpha_2^R}=\rho_{\alpha_2^I \alpha_1^I}=\rho$.
$\tau_1$ and $\tau_2$ are assumed to be independent and uniformly distributed in $[0, T_m]$, but known at the receiver, i.e. perfect time-synchronization is considered.
The receiver is assumed to have full channel state information (CSI), i.e. two triples $(\beta_1, \varphi_1, \tau_1)$ and $(\beta_2, \varphi_2, \tau_2)$ are perfectly known at the receiver. CSI can be obtained during a training phase before data transmission.
The signals transmitted by antennas $TX_1$ and $TX_2$ are denoted by $s_1(\bullet)$ and $s_2(\bullet)$, respectively, which after passing through the wireless channel become $\hat{s}_1(t)=(s_1 \otimes h_1)(t)=\beta_1 \exp(j\varphi_1)s_1(t-\tau_1)$
and $\hat{s}_2(t)=(s_2 \otimes h_2)(t)=\beta_2 \exp(j\varphi_2)s_2(t-\tau_2)$, respectively.
The noise at the receiver input is denoted by $n(\bullet)$, and is assumed to be Additive White Gaussian (AWG) distributed, with both real and imaginary parts having a double-sided power spectral density equal to $N_0$.

The receiver signal is denoted by $r(\bullet)$ and is equal to $r(t)=\tilde{s}_1(t)+\tilde{s}_2(t)+n(t)$.

For ease of notation, $\bar{\gamma}=E_\infty/(4\,N_R)$ is set.

The Spatial Modulation (SM) concept is based on the rule as follows: i) when message $m_1$ has to be transmitted, a properly designed signal $s_1(t)\neq 0$ is sent by only the transmit-antenna $TX_1$ (i.e., $s_2(t)=0$), and ii) when message $m_2$ has to be transmitted, a properly designed signal $s_2(t)\neq 0$ is sent by only the transmit-antenna $TX_2$ (i.e., $s_1(t)=0$). In other words, only one transmit-antenna is activated when either $m_1$ or $m_2$ have to be sent: there is only one active transmit-antenna for each signalling time-interval $T_m$. Furthermore, the active transmit-antenna is also allowed to transmit modulated data and, as a consequence, information is conveyed by both a transmit-antenna index and the modulated signal transmitted by that transmit-antenna. This is incorporated in the power allocation method described herein.

It is assumed that the transmitted signals, when different from zero, are pure sinusoidal tones, i.e., $s_1(t)=\sqrt{E_{m_1}}\exp(j\omega_c t)$ and $s_2(t)=\sqrt{E_{m_2}}\exp(j\omega_c t)$. In such a case, we have:

$$\begin{cases} \tilde{s}_1(t) = \beta_1 \sqrt{E_{m_1}}\exp(j\varphi_1)\exp(j\omega_c t) \\ \tilde{s}_2(t) = \beta_2 \sqrt{E_{m_2}}\exp(j\varphi_2)\exp(j\omega_c t) \end{cases} \quad (1)$$

where, with a slight abuse of notation, both delays $\tau_1$ and $\tau_2$ have been embedded into the channel phases $\varphi_1$ and $\varphi_2$, respectively.

As a consequence, the received signal is:

$$\begin{cases} r(t)|_{m_1} = \underbrace{\beta_1 \sqrt{E_{m_1}}\exp(j\varphi_1)\exp(j\omega_c t)}_{\tilde{s}_1(\cdot)} + n(t) \\ r(t)|_{m_2} = \underbrace{\beta_2 \sqrt{E_{m_2}}\exp(j\varphi_2)\exp(j\omega_c t)}_{\tilde{s}_2(\cdot)} + n(t) \end{cases} \quad (2)$$

The Maximum Likelihood (ML) optimal detector with perfect channel knowledge and time-synchronization at the receiver is as follows:

$$\hat{m} = \begin{cases} m_1 & \text{if } D_1 \geq D_2 \\ m_2 & \text{if } D_2 < D_1 \end{cases} \quad (3)$$

where:

$$\begin{cases} D_1 = \operatorname{Re}\left\{\int_{T_m} r(t)\tilde{s}_1^*(t)dt\right\} - \frac{1}{2}\int_{T_m}\tilde{s}_1(t)\tilde{s}_1^*(t)dt \\ D_2 = \operatorname{Re}\left\{\int_{T_m} r(t)\tilde{s}_2^*(t)dt\right\} - \frac{1}{2}\int_{T_m}\tilde{s}_2(t)\tilde{s}_2^*(t)d \end{cases} \quad (4)$$

So, the probability of error $P_E(\bullet,\bullet)$ conditioned upon the channel impulse responses $h_1(\bullet)$ and $h_2(\bullet)$ is as follows:

$$P_E(h_1, h_2) = \frac{1}{2}P_E(h_1, h_2)|_{m_1} + \frac{1}{2}P_E(h_1, h_2)|_{m_2} \quad (5)$$

-continued $$= \frac{1}{2}Pr\{D_1|_{m_1} < D_2|_{m_1}\} + \frac{1}{2}Pr\{D_2|_{m_2} < D_1|_{m_2}\}$$

After some analytical calculations, the following result can be obtained:

$$Pr\{D_1|_{m_1} < D_2|_{m_1}\} = Pr\{D_2|_{m_2} < D_1|_{m_2}\} \quad (6)$$

$$= Q\left(\sqrt{\frac{E_m}{4N_0}|\sqrt{\zeta_2}\,\alpha_2 - \sqrt{\zeta_1}\,\alpha_1|^2}\right)$$

which yields the following overall probability of error:

$$P_E(h_1, h_2) = Q\left(\sqrt{\frac{E_m}{4N_0}|\sqrt{\zeta_2}\,\alpha_2 - \sqrt{\zeta_1}\,\alpha_1|^2}\right) \quad (7)$$

Then, the ABEP over correlated Rayleigh fading channels can be obtained as follows (ABEP=$E_{h_1,h_2}\{P_E(h_1, h_2)\}$):

$$\boxed{ABEP = \frac{1}{2} - \frac{1}{2}\sqrt{\frac{\bar{\sigma}^2\bar{\gamma}}{1+\bar{\sigma}^2\bar{\gamma}}}} \quad (8)$$

where we have defined $\bar{\sigma}^2=\tilde{\sigma}_1^2+\tilde{\sigma}_2^2-2\rho\tilde{\sigma}_1\tilde{\sigma}_2$ with $\tilde{\sigma}_1^2=\zeta_1\sigma_1^2$ and $\tilde{\sigma}_2^2=\zeta_2\sigma_2^2$, The result shown in (8) takes into account an arbitrary power allocation between the two transmit-antennas, i.e., in general, $\zeta_1 \neq \zeta_2$. A uniform power allocation strategy is obtained by setting $\zeta_1=\zeta_2=1$.

The power imbalance between the transmit-receive wireless links is equivalent to non-uniform power allocation. This can be readily proven by considering the following facts:

1. If $\alpha_1$ and $\alpha_2$ are Rayleigh distributed RVs with Probability Density Function (PDF) $f_{\alpha_2}(\xi_2)\sim R(\xi_2;\sigma_2)$ and $f_{\alpha_1}(\xi_1)\sim R(\xi_1;\sigma_1)$ as follows, respectively:

$$f_{\alpha_1}(\xi_1) = \frac{\xi_1}{\sigma_1^2}\exp\left(-\frac{\xi_1^2}{2\sigma_1^2}\right) \quad (9)$$

$$f_{\alpha_2}(\xi_2) = \frac{\xi_2}{\sigma_2^2}\exp\left(-\frac{\xi_2^2}{2\sigma_2^2}\right) \quad (10)$$

2. Then, $\tilde{\alpha}_1=\sqrt{\zeta_1}\alpha_1$ and $\tilde{\alpha}_2=\sqrt{\zeta_2}\alpha_2$ are still Rayleigh distributed RVs with PDFs equal to $f_{\tilde{\alpha}_1}(\xi_1)\sim R(\xi_1;\sqrt{\zeta_1}\sigma_1)$ and $f_{\tilde{\alpha}_1}(\xi_2;\sqrt{\zeta_2}\sigma_2)$, respectively.

In the light of 1. and 2., it follows that even though $\sigma_1=\sigma_2$, which corresponds to a balanced fading scenario, the net effect of a non-uniform power allocation, $\zeta_1 \neq \zeta_2$, in (8) is equivalent to have an unbalanced fading scenario with power imbalance ratio equal to $E\{\tilde{\alpha}_1^2\}/E\{\tilde{\alpha}_2^2\}=\zeta_1/\zeta_2$. As a consequence, the ABEP depicted in FIGS. 26 to 29 for the balanced fading scenario can be moved towards the ABEP of the unbalanced fading scenario via an adequate and opportunistic (i.e., which depends also on the fading parameters—see, e.g., FIG. 28) power allocation scheme.

To formalize the power allocation mechanism, a general system setup with $N_t$ transmit-antennas and one receive-antenna is considered, as shown for example in FIG. 30. Further generalizations to an arbitrary number of receive-antennas are possible provided that closed-form and accurate expressions of the ABEP are computed. A general fading scenario with Nakagami-m fading (the same channel model considered in FIGS. 26 to 29) is also considered. For illustrative purposes, the power allocation optimization is formulated by considering the ABEP for uncorrelated fading channels and for a receiver having full channel state information (CSI). However, the same method can be used for correlated fading channels and for other sub-optimal receiver architectures.

Figure 31:
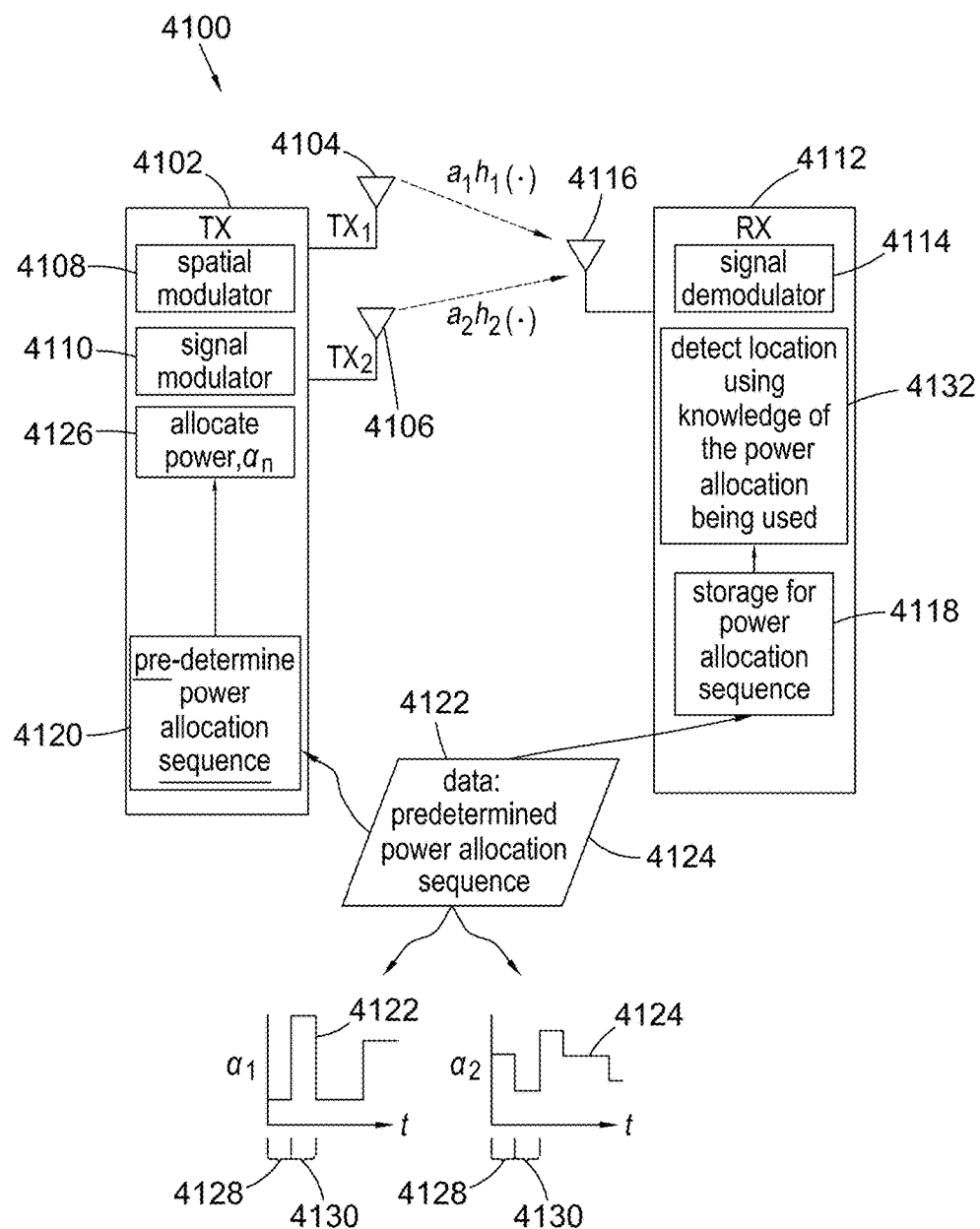
FIG. 31 shows a system setup for SM-MIMO.
Figure 32:
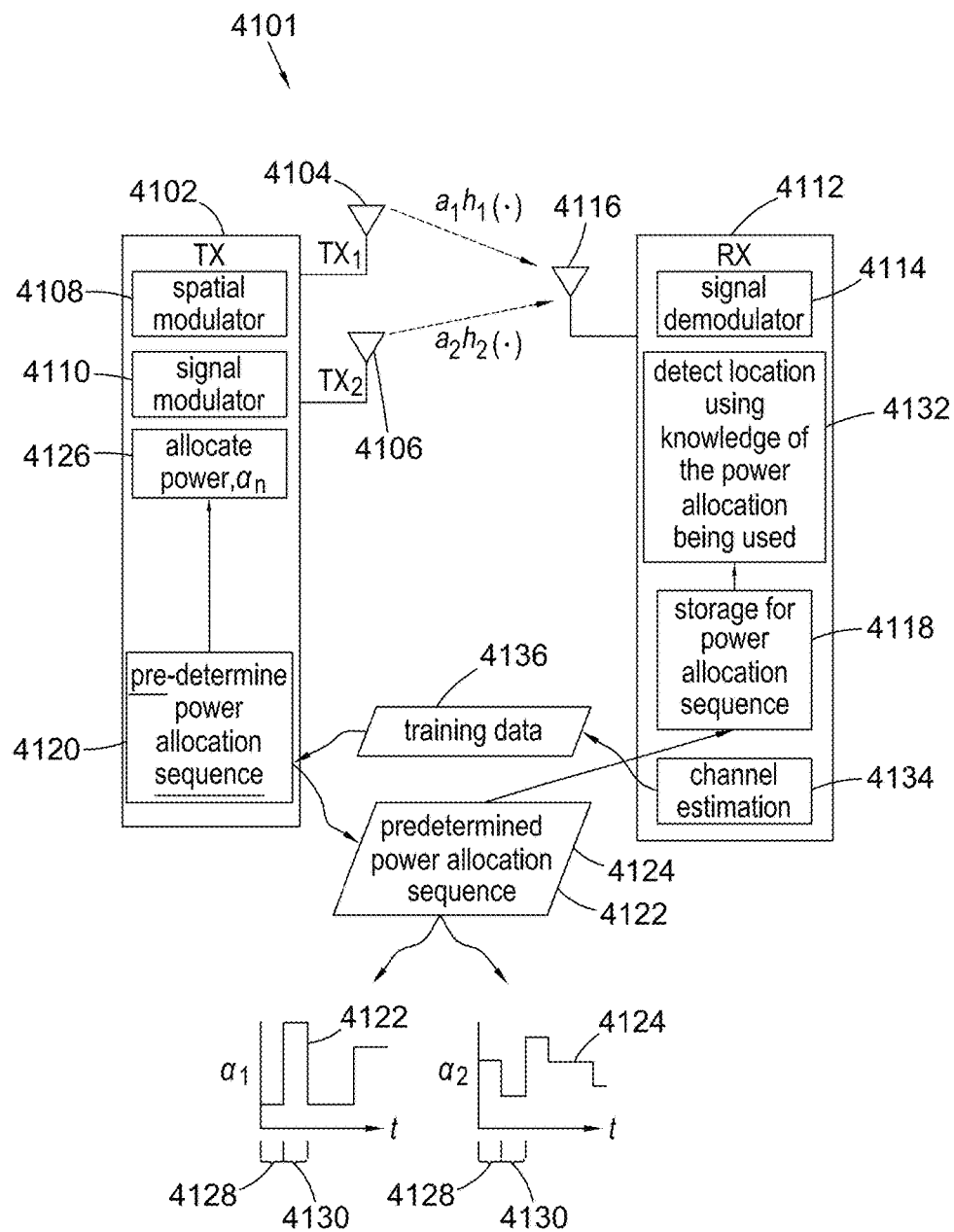
FIG. 32 shows a system setup for SM-MIMO.

In FIGS. 30, 31 and 32, $a_n$, and $a_1$ and $a_2$ respectively, denote the power scaling variables. Furthermore, $c_{1,2}$ denotes the correlation coefficient between the channels.

The transmitter 4016 comprises a spatial modulator 4026 and a signal modulator 4028. At the receiver 4020, a signal demodulator 4030 is located. The receiver also comprises a channel estimator 4032 which determines correlation coefficients between the channels 4022, 4024. These correlation coefficients are transmitted to the transmitter 4016. The transmitter 4016 comprises a calculator 4034 to determine a power allocation to be allocated to the transmit-antennas 4012, 4014 on the basis of data 4035 comprising correlation coefficients measured at the receiver 4020. The transmitter 4016 further comprises a power allocator 4036 to allocate the determined power to the transmit-antennas 4012, 4014. A modulated signal is then transmitted from one transmit-antenna 4012, 4014 at a time with the corresponding allocated power. At the receiver 4020, a model of power allocation is generated in a model generator 4038, in which the data 4035 of the channel estimator 4032 is applied. The location of the transmit-antennas 4012, 4014 is then determined in a detector 4040 located at the receiver 4020 by using the power allocation model.

In the depicted scenario, the ABEP can be written in closed-form as follows:

$$ABEP(\zeta_1, \zeta_2, \ldots, \zeta_{N_t}) \cong \qquad (11)$$

$$\frac{1}{2(N_t-1)} \sum_{i=1}^{N_t} \sum_{i \neq j=1}^{N_t} PEP(i \to j; \zeta_1, \zeta_2, \ldots, \zeta_{N_t})$$

where it is denoted $E_{m_1} = \partial_1 E_m$, $E_{m_2} = \zeta_2 E_m$, ..., and $E_{m_1} = \zeta_N$, $E_m$ emphasized that the above ABEP is conditioned upon a fixed power allocation among the transmit-antennas, i.e., the set $(\zeta_1, \zeta_2, \ldots, \zeta_{N_1})$.

Moreover, we have defined:

$$PEP(i \to j; \zeta_1, \zeta_2, \ldots, \zeta_{N_t}) = \frac{1}{\pi} \int_0^{\pi/2} M_{i \to j}\left(\frac{\overline{y}}{2\sin^2(\theta)}\right) d\theta \qquad (12)$$

and:

$$M_{i \to j}(s) = \frac{A_i A_j}{4}(s + B_i)^{-\left(\frac{1}{2} + \frac{C_i}{2}\right)}(s + B_j)^{-\left(\frac{1}{2} + \frac{C_j}{2}\right)} \qquad (13)$$

$$G_{2,2}^{1,2}\left(-\frac{s^2}{(s+B_i)(s+B_j)} \middle| \begin{array}{cc} 0.5 - 0.5C_j & 0.5 - 0.5C_i \\ 0 & 0 \end{array}\right)$$

$$\text{with } G_{p,q}^{m,n}\left(\cdot \middle| \begin{array}{c} (a_p) \\ (a_q) \end{array}\right)$$

being the Meijer-G function, and $A_i = 2m_i^{m_i}/(\tilde{\Omega}_i^{m_i}\Gamma(m_i))$, $B_i = m_i/\tilde{\Omega}_i$, $C_i = 2m_i - 1$, $\tilde{\Omega}_i = \zeta_i \Omega_i$, for $i = 1, 2, \ldots, N_t$. Moreover, $(m_i, \Omega_i)$ are the parameters of the Nakagami-m distribution for the i-th wireless link.

The optimal and opportunistic power allocation mechanism based on the optimization of the ABEP can be analytically formalized as follows:

$$(\zeta_1^{(opt)}, \zeta_2^{(opt)}, \ldots, \zeta_{N_t}^{(opt)}) = \underset{\substack{(\zeta_1, \zeta_2, \ldots, \zeta_{N_t}) \\ \zeta_1 + \zeta_2 + \ldots + \zeta_{N_t} = 1}}{\arg\min} \{ABEP(\zeta_1, \zeta_2, \ldots, \zeta_{N_t})\} \qquad (14)$$

where the constraint that the total power is fixed to a given value, i.e., $\Sigma_{i=1}^{N_t} E_{m_i} = E_m$ has been added.

The minimization in (14) turns out to be a constrained optimization problem, which can be solved via either analytical or numerical methods.

In FIG. 31, an embodiment of a system 4100 according to the present invention is shown. A transmitter 4102 is provided with two transmit-antennas 4104, 4106 and further comprises a spatial modulator 4108 and a signal modulator 4110. At a receiver 4112, a signal demodulator 114 is located. The receiver 112 has a receive-antenna 4116 and also comprises a storage 4118 for storing power allocation sequences, for example in a look-up table. The transmitter 4102 comprises a sequence predetermination module 4120 in which a power allocation sequence 4122, 4124 to be allocated to the transmit-antennas 4104, 4106 is predetermined. This power allocation sequence 4122, 4124 is randomly chosen prior to any data transmission from the transmit-antennas to the receiver 4112 and does not consider channel conditions. The transmitter 4102 further comprises a power allocator 4126 to allocate the predetermined power allocation sequences to the transmit-antennas 4104, 4106. A modulated signal is then transmitted from the transmit-antennas 4104, 4106, i.e. from the transmit-antenna 4104, 4106 which is active at a certain time interval, with the corresponding power allocation sequence. The power allocation sequences 4122, 4124 of two transmit-antennas, which are shown in more detail, are only an example of possible power allocation sequences. The power allocation sequences 4122, 4124 are shown as a function of time (t). They have a staircase-shaped characteristic which differs for each of the transmit-antennas. For example, in a first time interval 4128, the power ($a_1$) of the first transmit-antenna 4104 is lower than the power ($a_2$) of the second transmit-antenna 4106. Then, in a second time interval 4130, the power ($a_1$) of the first transmit-antenna 4104 is higher than the power ($a_2$) of the second transmit-antenna 4106. The power allocation sequences 4122, 4124 of each transmit-antenna 4104, 4106 are transmitted to the receiver 4110 and stored in the storage 4118. The receiver 4112 further comprises a detector 4132 to detect location of the active transmit-antenna by using the power allocation sequence data stored in the storage 4118.

FIG. 32 shows a further embodiment of a system 4101 according to the present invention by way of example. In this embodiment is similar to the embodiment shown in FIG. 31 and therefore, the same reference signs are used for similar items. However, channel conditions are considered prior to the allocation of a power allocation sequence 4122, 4124 to the transmit-antennas 4104, 4106. Therefore, the receiver 4112 further comprises a channel estimator 4134. Training data 4136 is transmitted from the receiver 4112 to the transmitter 4102, containing channel information that has been analyzed in the channel estimator 4134. The channel information mainly comprises gain, phase and/or delay of the signals received at the receiver 4112 from different transmit-antennas. The training data provides a feedback to the transmitter 4102 such that the power allocation sequence 4124, 4126 is randomly chosen based the channel information. The predetermined power allocation sequence 4124, 4126 is transmitted to the receiver 4112 again to be stored in the storage 4118 which is accessible for the detector 4132 to determine the location of the active transmit-antenna.

With regard to the embodiments shown in FIGS. 31 and 32, it is also possible that a constant power ($a_1$, $a_2$) is allocated to each of the transmit-antennas 4104, 4106, such that $a_1 \neq a_2$. The difference between these constant powers can depend on the channel correlation, for example, the difference can be direct proportional to the channel correlation.

Another aspect of the invention focuses on proposing a novel Spatial Modulation method, which is called Time-Orthogonal Signal Design assisted Spatial Modulation (TOSD-SM) and, differently from all other SM techniques, can exploit the antennas at the transmitter to get transmit-diversity. The basic idea behind TOSD-SM is not restricting the transmitted signal to be a pure sinusoidal tone, but to properly design it in order to exploit, in an efficient way, the different propagation delays ($\tau_1$ and $\tau_2$) of the wireless links $TX_1$-RX and $TX_2$-RX.

Similar to the first aspect of the invention, TOSD-SM retains the main assumption that only one transmit-antenna is activated for every signalling interval $T_m$. In particular, also in this aspect, the following rule is adopted: i) when message $m_1$ has to be transmitted, a properly designed signal $s_1(t) \neq 0$ is sent by only the antenna $TX_1$ (i.e., $s_2(t)=0$), and ii) when message $m_2$ has to be transmitted, a properly designed signal $s_2(t) \neq 0$ is sent by only the antenna $TX_2$ (i.e., $s_1(t)=0$). The assumption that only one transmit-antenna is activated for every signalling interval $T_m$ can also be used for more than two antennas.

TOSD-SM does not restrict the transmitted signals to be pure sinusoidal tones, but $s_1(\bullet)$ and $s_2(\bullet)$ are properly optimized for performance improvement. In particular, the novel TOSD-SM concept relies on the following signal design (when $s_1(\bullet)$ and $s_2(\bullet)$ are different from zero):

$$s_1(t) = s_2(t) = w(t) \quad (18)$$

where $w(\bullet)$ is a generic signal waveform, which is chosen to satisfy the following condition:

$$R_w(\tau) = \int_{-\infty}^{+\infty} w(\xi) w^*(\xi - \tau) d\xi = \delta(\tau) \quad (19)$$

The design condition in (19) simply states that $w(\bullet)$ is required to have a very peaky time auto-correlation function $R_w(\bullet)$, which under ideal signal design conditions can be assumed to be a Dirac's delta function.

According to (18), the signals after propagation through the wireless channels can be written as follows:

$$\begin{cases} \tilde{s}_1(t) = \beta_1 \sqrt{E_m} \exp(j\varphi_1) w(t-\tau_1) \\ \tilde{s}_2(t) = \beta_2 \sqrt{E_m} \exp(j\varphi_2) w(t-\tau_2) \end{cases} \quad (20)$$

As a consequence, the received signal is:

$$\begin{cases} r(t)|_{m_1} = \underbrace{\beta_1 \sqrt{E_m} \exp(j\varphi_1) w(t-\tau_1)}_{\tilde{s}_1(\cdot)} + n(t) \\ r(t)|_{m_2} = \underbrace{\beta_2 \sqrt{E_m} \exp(j\varphi_2) w(t-\tau_2)}_{\tilde{s}_2(\cdot)} + n(t) \end{cases} \quad (21)$$

The ML optimal detector with perfect channel knowledge and synchronization at the receiver is as follows:

$$\hat{m} = \begin{cases} m_1 & \text{if } D_1 \geq D_2 \\ m_2 & \text{if } D_2 < D_1 \end{cases} \quad (22)$$

where:

$$\begin{cases} D_1 = \text{Re}\left\{ \int_{T_m} r(t) \tilde{s}_1^*(t) dt \right\} - \frac{1}{2} \int_{T_m} \tilde{s}_1(t) \tilde{s}_1^*(t) dt \\ D_2 = \text{Re}\left\{ \int_{T_m} r(t) \tilde{s}_2^*(t) dt \right\} - \frac{1}{2} \int_{T_m} \tilde{s}_2(t) \tilde{s}_2^*(t) dt \end{cases} \quad (23)$$

Similar to (5), the probability of error $P_E(\bullet, \bullet)$ conditioned upon the channel impulse responses $h_1(\bullet)$ and $h_2(\bullet)$ is as follows:

$$\begin{aligned} P_E(h_1, h_2) &= \frac{1}{2} P_E(h_1, h_2)|_{m_1} + \frac{1}{2} P_E(h_1, h_2)|_{m_2} \\ &= \frac{1}{2} Pr\{D_1|_{m_1} < D_2|_{m_1}\} + \frac{1}{2} Pr\{D_2|_{m_2} < D_1|_{m_2}\} \end{aligned} \quad (24)$$

After some analytical calculations and the exploitation of the orthogonality condition in (19) for every pair of delays ($\tau_1$, $\tau_2$) with $\tau_1 \neq \tau_2$, (i.e., propagation through the wireless links $TX_1$-RX and $TX_2$-RX is subject to different delays), i.e.:

$$\begin{aligned} \int_{-\infty}^{+\infty} w(\xi - \tau_1) w^*(\xi - \tau_2) d\xi &= \int_{-\infty}^{+\infty} w(\xi) w^*[\xi - (\tau_2 - \tau_1)] d\xi \\ &= \delta(\tau_2 - \tau_1) \\ &= \begin{cases} 1 & \text{if } \tau_1 = \tau_2 \\ 0 & \text{if } \tau_1 \neq \tau_2 \end{cases} \end{aligned} \quad (25)$$

the result in what follows can be obtained:

$$Pr\{D_1|_{m_1} < D_2|_{m_1}\} = Pr\{D_2|_{m_2} < D_1|_{m_2}\} = Q\left( \sqrt{\frac{E_b}{4N_0}(\beta_1^2 + \beta_2^2)} \right) \quad (26)$$

which yields the following overall probability of error:

$$P_E(h_1, h_2) = Q\left( \sqrt{\frac{E_b}{4N_0}(\beta_1^2 + \beta_2^2)} \right) \quad (27)$$

Then, $\overline{P}_E$ over Rayleigh fading channels can be obtained as follows:

$$\overline{P}_E = \frac{1}{\pi}\int_0^{\pi/2} M\left(\frac{\overline{\gamma}}{2\sin^2(\theta)}\right)d\theta \quad (28)$$

where we have defined $M(s)=[1+2(\sigma_1^2+\sigma_2^2)s+4(1-\rho^2)\sigma_1^2\sigma_2^2 s^2]^{-1}$, which is the Moment Generating Function (MGF) of RV $\beta=\beta_1+\beta_2$, i.e., $M(s)=E\{\exp(-s\beta)\}$.

The main advantage of this aspect of the invention is to provide transmit-diversity. In particular, for a 2×1 MISO system a transmit-diversity order equal to 2 is obtained. In particular, the diversity order can be computed by analyzing the behaviour of M (•) for large values of |s|. It can be readily proven that:

$$\lim_{|s|\to+\infty}\{M(s)\}\cong\frac{1}{4(1-\rho^2)\sigma_1^2\sigma_2^2}|s|^{-2} \quad (29)$$

and it is known that the system's diversity order is equal to the negative exponent of |s|, i.e., 2 in (29).

As a result of the higher diversity order, the error probability is expected to have a steeper slope for increasing SNRs, which results in substantial improvements in system's performance. This aspect of the invention turns out to be also more robust to channel correlation. As a matter of fact, the error probability in (28) depends on only the square value of the correlation coefficient, i.e., $\rho^2$. So, since $0\le\rho\le1$ the performance drop for increasing p is expected to be smaller than in known solutions. As opposed to known solutions in which the performance of the SM scheme is independent of $\rho$, a transmit-diversity is achieved.

With respect to other SM schemes, it might be required that the propagation delays $(\tau_1, \tau_2)$ are known at the transmitter. When needed, this can be easily obtained via a feedback channel from the receiver to the transmitter, such that the orthogonality condition in (25) can always be verified. On the other hand, when the signal design condition in (19) can be guaranteed, a priori, for every $(\tau_1, \tau_2)$ pair, no feedback channel is required since the condition in (25) is implicitly verified for every pair $(\tau_1, \tau_2)$ at the receiver-side. In addition to $(\tau_1, \tau_2)$ i of propagation delays, other channel signatures (or spectral characteristics) such as phase rotation, amplitude or frequency may be used.

Below, numerical results which are obtained from the analytical frameworks described above, are described. The following system setup is used to obtain the simulation results:
i) $\sigma_1=\sigma_2=1$,
ii) $\rho=\{0.00, 0.25, 0.50, 0.75, 0.99\}$,
iii) $N_0=-204$ dBW/Hz, and
iv) the error probability from Monte Carlo simulations is obtained by requiring a number of wrong detections equal to $10^4$.

Figure 33:
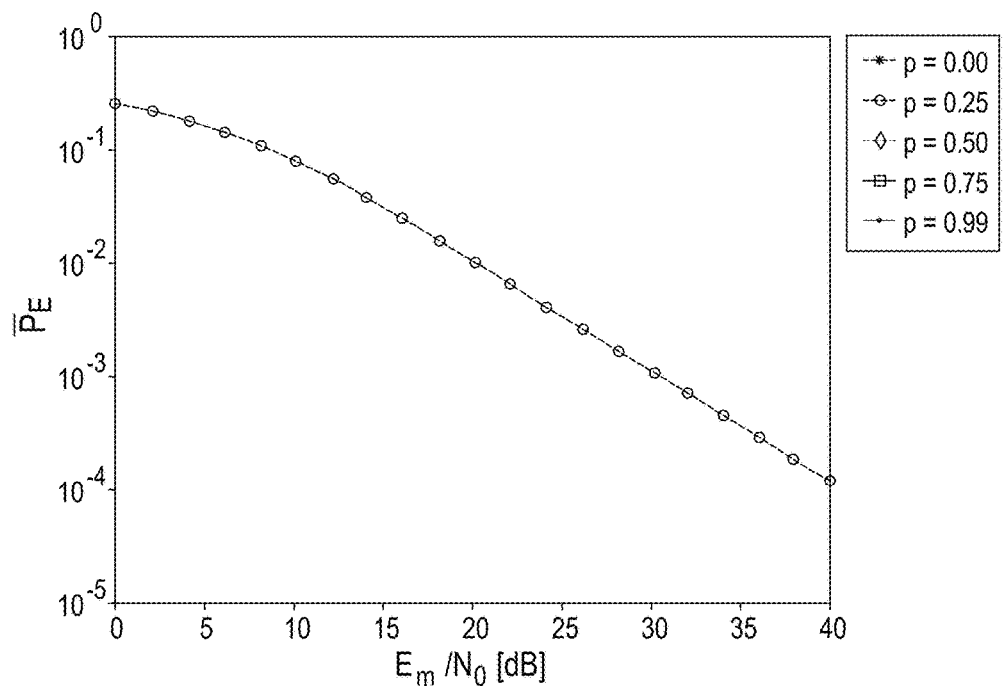
FIG. 33 shows numerical results obtained when employing a scheme according to the prior art.
Figure 34:
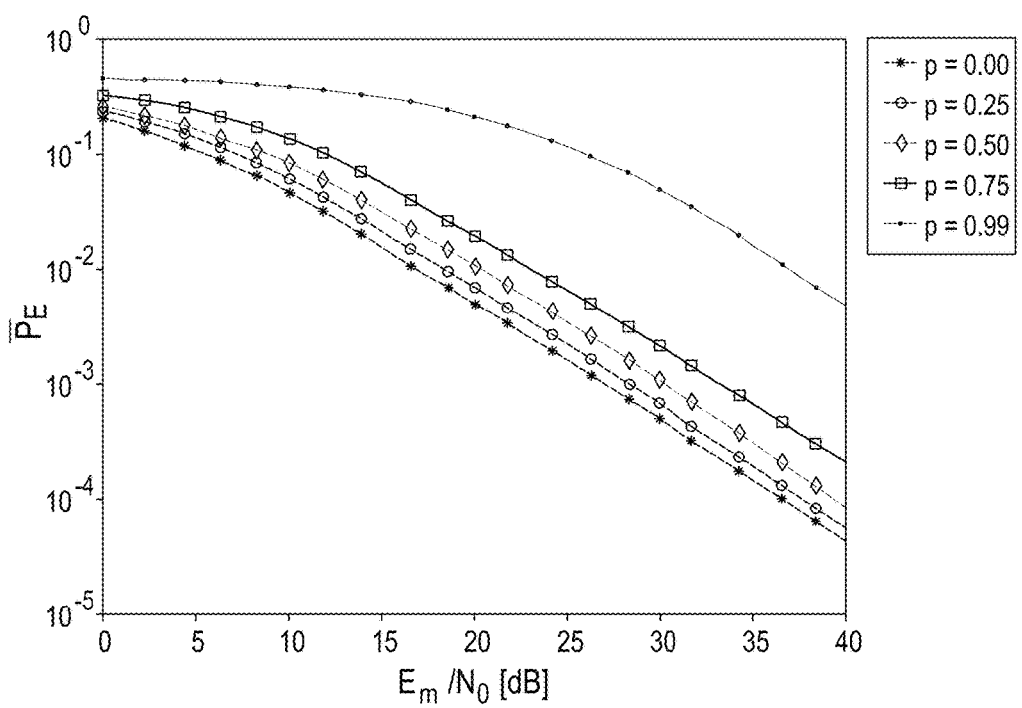
FIG. 34 shows numerical results obtained when employing another scheme according to the prior art.
Figure 35:
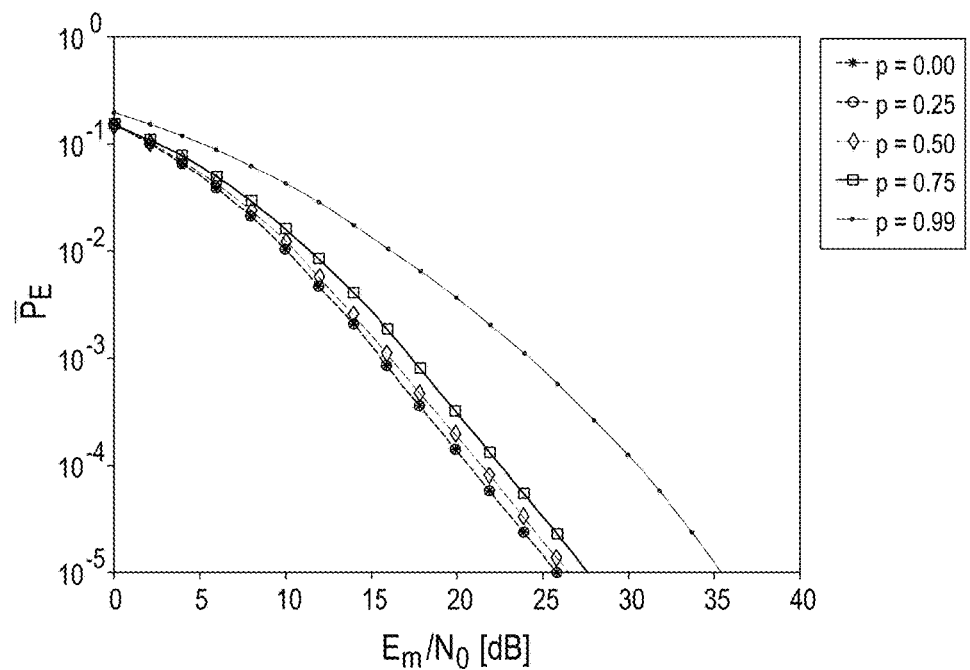
FIG. 35 shows numerical results obtained when employing the Time-Orthogonal Signal Design (TOSD)-SM scheme.

Numerical results are shown in FIG. 33, FIG. 34, and FIG. 35 for known SM schemes and the proposed TOSD-SM, respectively. Markers show a Monte Carlo simulation and solid lines show the analytical model.

In particular, FIG. 33 shows the error probability of a SM scheme which is called Space Shift Keying (SSK) and based on the rule that only one transmit-antenna is activated when $m_1$ has to be sent, while both transmit-antennas are activated when $m_2$ needs to be sent. In this scheme, the transmitted signals, when different from zero, are always pure sinusoidal tones. This allows to embed both delays ($\tau_1$ and $\tau_2$) into the channel phases $\varphi_1$ and $\varphi_2$, respectively. Numerical results confirm that no performance degradation can be observed for increasing values of the correlation coefficient.

In FIG. 34, the error probability of another SM scheme, based on the rule that only one transmit-antenna is activated when either $m_1$ or $m_2$ have to be sent: there is only one active transmit-antenna for every signalling interval $T_m$. Similar to the SSK scheme the transmitted signals, when different from zero, are always pure sinusoidal tones, i.e., $s_1(t)=s_2(t)=\sqrt{E_m}\exp(j\omega_c t)$. Thus, also in this case both propagation delays $\tau_1$ and $\tau_2$ can be embedded into the channel phases $\varphi_1$ and $\varphi_2$, respectively. It is observed that the spatial correlation between the wireless links can remarkably increase the error probability. When the wireless links are subject to high correlation, the error probability can be very high. More in detail, the SNR penalty with respect to spatial correlation is 1.24 dB, 3 dB, and 6 dB for $\rho=0.25$, $\rho=0.5$, and $\rho=0.75$, respectively.

In FIG. 35, the error probability for the novel TOSD-SM scheme is depicted. Numerical results confirm that the proposed invention shows a higher diversity order than other SM schemes: the error probability shows a steeper slope than the other two proposals. This yields a substantial performance gain with respect to other solutions. Moreover, we can observe that spatial correlation of wireless links has a significant less impact than the SM proposal as described in relation with FIG. 34.

Figure 36:
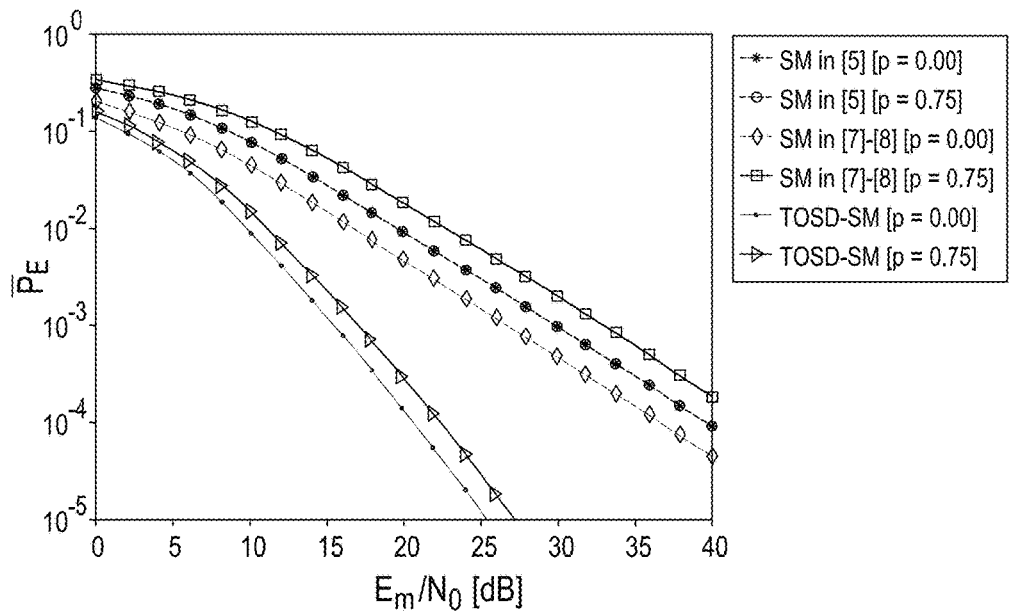
FIG. 36 shows a comparison among various Spatial Modulation proposals.

In FIG. 36 a comparison among the various SM proposals is shown in order to understand the different behaviour of them as a function of channel spatial correlation. The following facts can be observed:
i) The proposed TOSD-SM yields a significant performance gain with respect to all other SM proposals and, even in the presence of channel correlation, it offers better error probabilities than other SM schemes over independent wireless links: this is a clear indication of the robustness of the proposed invention to spatial correlation of fading.
ii) The SM proposal referring to Space Shift Keying offers worse performance than the SM scheme of which results are shown in FIG. 9 when the wireless links are uncorrelated. However, in the presence of channel correlation the situation is reversed: SM for SSK offers a better error probability than for the SM scheme which results are shown in relation to FIG. 34.

Figure 37:
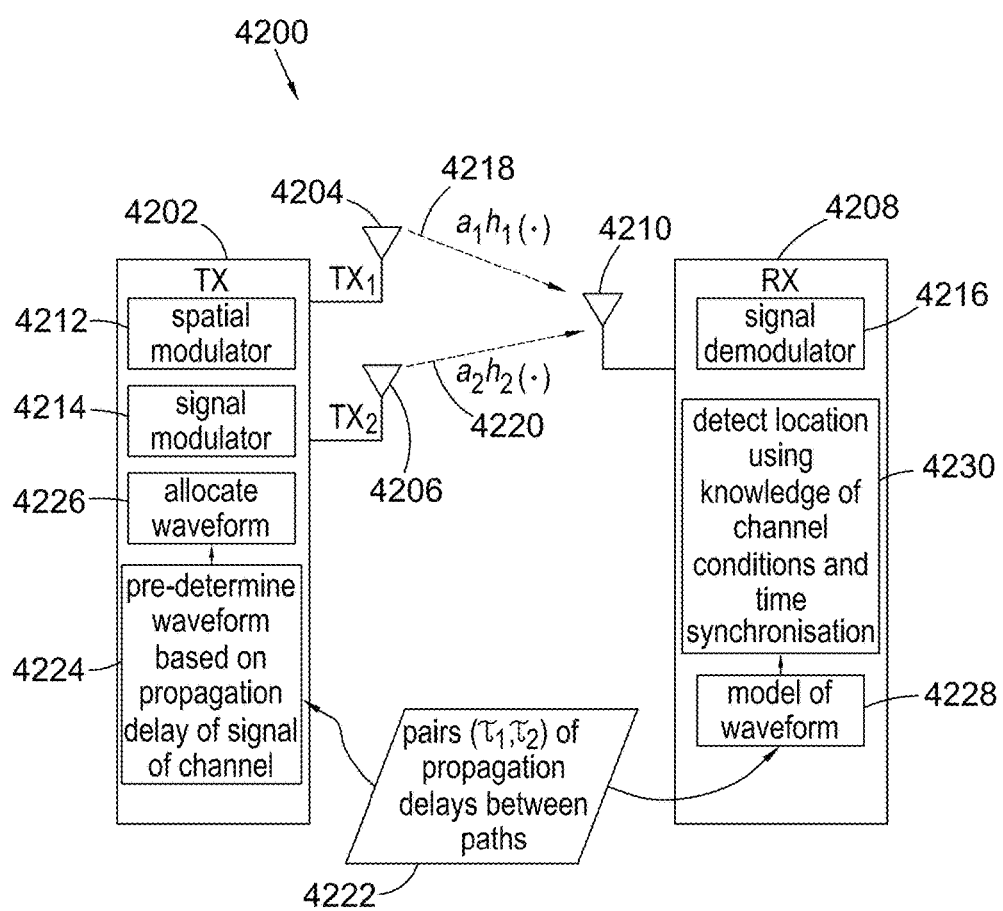
FIG. 37 shows a system setup for SM-MIMO.

FIG. 37 shows a system 4200 for SM-MIMO, in accordance with an embodiment of the TOSD-SM scheme. The system 4200 comprises a transmitter 4202 with two transmit-antennas 4204, 4206 and a receiver 4208 with one receive-antenna 4210. The transmitter 4202 comprises a spatial modulator 4212 and a signal modulator 4214. The receiver 4208 comprises a signal demodulator 4216 for demodulating a signal which is sent over a channel 4218, 4220 from one transmit-antenna 4204, 4206 to the receive-antenna 4210. Each signal transmitted over the channels 4218, 4220 has a specific waveform. According to the TOSD-SM scheme, the waveform of the signal is predetermined prior to any data transmission between the transmitter 4202 and the receiver 4208 such that a propagation delay of the signals is modified. Corresponding data 4222, which comprise orthogonal pairs $(\tau_1, \tau_2)$ of the propagation delay between the two channels 4218, 4220 are supplied to a waveform calculator 4224 located at the transmitter 4202. The predetermined waveform is then allocated to the corresponding signal sent by the transmit-antennas 4204, 4206 via a waveform allocator 4226 located at the transmitter 4202. The receiver 4208 comprises a database 4228 in which a model of waveforms is provided. The receiver 4208 further comprises a detector 4230 which uses knowledge of the conditions of the channels 4218, 4220 and the waveform model to detect location of the active transmit-antenna 4204, 4206. Furthermore, a time-synchronisation at the receiver 4208 is considered. The resulting time-orthogonal design of the signals reduces the error probability as described above.

It should be noted that other numbers of transmit-antennas, i.e. more than two transmit-antennas at the transmitter, and receivers, i.e. more than one receive-antenna at the receiver, could equally be used.

It will be appreciated that the transmitters, receivers and/or communications system and/or methods described above may be used in conjunction with other embodiments described above.

A skilled person will appreciate that variations of the disclosed arrangements are possible without departing from the invention.

For example, although the above embodiments have been described in relation to a system that uses a light source that comprises LEDs 25a, 25b, 25c, other light sources may be used, particularly light sources having a fast switching time that allows for modulation of the output.

In addition, although embodiments are described above that use intensity modulation and specifically on-off keying, it will be appreciated that other modulation schemes may be alternatively or additionally used, such as spatial modulation, colour modulation, multi-level intensity modulation and the like.

Although the above example uses a portable electronics device 40, it will be appreciated that the electronics device need not be portable but that any suitably programmable or configurable device that comprises a camera 35 and is capable of implementing a rolling shutter as described above may be used.

Alternative embodiments of the invention can be implemented as a computer program product for use with a computer system, the computer program product being, for example, a series of computer instructions stored on a tangible data recording medium, such as a diskette, CD-ROM, ROM, or fixed disk, or embodied in a computer data signal, the signal being transmitted over a tangible medium or a wireless medium, for example, microwave or infrared. The series of computer instructions can constitute all or part of the functionality described above, and can also be stored in any memory device, volatile or non-volatile, such as semiconductor, magnetic, optical or other memory device.

It will also be well understood by persons of ordinary skill in the art that whilst the preferred embodiment implements certain functionality by means of software, that functionality could equally be implemented solely in hardware (for example by means of one or more ASICs (application specific integrated circuit)) or indeed by a mix of hardware and software. As such, the scope of the present invention should not be interpreted as being limited only to being implemented in software.

Lastly, it should also be noted that whilst the accompanying claims set out particular combinations of features described herein, the scope of the present invention is not limited to the particular combinations hereafter claimed, but instead extends to encompass any combination of features or embodiments herein disclosed irrespective of whether or not that particular combination has been specifically enumerated in the accompanying claims at this time.

The invention claimed is:

1. A system comprising a transmitter for transmitting unipolar signals and an encoder for encoding at least one bipolar signal having both positive and negative signal components, each of signal components comprising of at least one sign and at least one magnitude or absolute value, the encoder comprising a processing apparatus configured to:
   encode the magnitude or absolute value of the at least one signal component of the at least one bipolar signal into at least one of the unipolar signals using an encoding scheme; and
   encode the at least one sign of the at least one of the signal components of the at least one bipolar signal into at least one of the unipolar signals using a different encoding scheme to that used for the magnitude or absolute value of the at least one of the signal component or such that the sign is separate to the magnitude or absolute value of the at least one of the signal component; and
   the system is further configured to transmit the sign and magnitude or absolute value of the at least one signal component by transmitting, with the transmitter, the at least one unipolar signal.

2. The system according to claim 1, wherein the signs are one of: encoded using the relative order of carriers that carry the unipolar signal(s); encoded as symbols that modulate the carriers; encoded in a separate modulation scheme on a separate part of a transmission stream.

3. The system according to claim 2, wherein the carriers comprise at least one of: frequency, time, and spatial carriers.

4. The system according to claim 1, wherein the signs are conveyed to a destination on one of: a separate transmission channel, and a separate part of a communication system.

5. The system according to claim 1, wherein at least one of: the transmitter and encoder are configured to encode each bipolar signal into two or more corresponding unipolar signals on respective first and second carrier channels.

6. The system according to claim 5, wherein the transmitter is configured to encode the sign of the bipolar signal based on the relative order of first and second operational states, wherein one of the first or second operational states is indicative of a magnitude or absolute value of the bipolar signal.

7. A receiver for receiving a signal from a transmission system, the receiver being configured to receive at least one unipolar signal from the transmission system, determine, with a processing apparatus, a magnitude of at least one bipolar signal from the at least one unipolar signal, wherein the bipolar signal has both positive and negative signal components, and determine, with the processing apparatus, at least one sign of the bipolar signal components, wherein the sign indicates that the signal component is either positive or negative, and the at least one sign is encoded into the at least one unipolar signal using an encoding scheme and transmitted, by the transmission system, separately or differently to the encoding scheme utilized for the corresponding magnitude of the at least one bipolar signal.

8. The receiver according to claim 7, wherein the receiver is configured to reconstruct the bipolar signal using the determined magnitude and sign of the bipolar signal.

9. The receiver according to claim 7, wherein the signs are one of: encoded within the relative order of carriers; encoded as symbols that modulate the carriers; or encoded in a separate modulation scheme on a separate part of a transmission stream.

10. The receiver according to claim 7, wherein the receiver is configured to determine the relative order of at least one carrier channel having a first operational state and at least one second carrier channel having a second operational state in order to determine the sign of the bipolar signal based on the relative order of the first and second operational states.

11. A method for decoding a signal received from a transmission system, the method comprising receiving, with a receiver, at least one unipolar signal from the transmission system, the at least one unipolar signal being representative of at least one bipolar signal having both positive and negative signal components, determining, with a processing apparatus, a magnitude of the at least one bipolar signal from the at least one unipolar signal and determining, with the processing apparatus, a sign of the at least one bipolar signal, wherein the sign indicates that the signal component is either positive or negative and the sign is encoded into the at least one unipolar signal using an encoding scheme and transmitted by the transmission system separately or differently to the encoding scheme utilized for the corresponding magnitude of the at least one bipolar signal.

12. A method of converting at least one bipolar signal into at least one unipolar signal, the at least one bipolar signal having both positive and negative signal components, each of the signal components comprising at least one sign and at least one magnitude or absolute value, the method comprising determining, with a processing apparatus, a sign of a signal component of the at least one bipolar signal, encoding, with the processing apparatus, the magnitude or absolute value of the signal component of the at least one bipolar signal into at least one of the unipolar signals using an encoding scheme, encoding, with the processing apparatus, the at least one sign of the signal component of the at least one bipolar signal into at least one of the unipolar signals using a different encoding scheme to that used for the magnitude or absolute value of the signal component or such that the sign is separate to the magnitude or absolute value of the signal component, and transmitting, with the processing apparatus, the sign and magnitude or absolute value of the signal component by transmitting, with a transmitter, the at least one unipolar signal.

13. The method of claim 12, wherein the method comprises converting at least one of the components of the bipolar signal into corresponding first and second unipolar signal components, the first and second unipolar signal components having different amplitudes or magnitudes and the order of the first and second unipolar signal components is dependent on the sign of the corresponding bipolar signal component.

14. The method of claim 13, wherein at least one of the first or second unipolar signal components is indicative of the intensity or magnitude of the corresponding bipolar signal component.

15. The method of claim 13, wherein the other of the first or second unipolar signal components at least one of: has an amplitude or magnitude of zero; comprises an inactive or empty carrier channel has an amplitude or magnitude different to that of the other unipolar signal component.

16. The method of claim 13, wherein the order of the first and second unipolar signal components over time is dependent on the sign of the corresponding bipolar signal component.

17. The method of claim 13, wherein the first and second unipolar signal components are at least one of: resolved and separated in at least one of: the time, frequency and spatial domains.

18. The receiver according to claim 7, wherein the carriers comprise at least one of: frequency, time, and spatial carriers.

19. The receiver according to claim 7, wherein the signs are conveyed to the destination on one of: a separate transmission channel, a separate part of a communication system.

20. The system of claim 1, wherein the system is a transmission system for transmitting data as part of a communications system, the data comprising a plurality of data symbols or elements, wherein at least a portion of the data is communicated by transmitting signals in selected carrier channels, wherein the transmission system is configured to encode the signs of the at least one bipolar signal by selecting a relative order of at least one first carrier channel having a first operational state and at least one second carrier channel having a second operational state.

21. The system of claim 20, wherein one of the first or second operational states comprises the at least one unipolar signal being carried by the associated carrier channel and the other of the first or second operational states comprises at least one of: an inactive; unused; and zero state carrier channel or transmitting a unipolar signal at a level that is lower or otherwise distinguishable from the unipolar signals of the first state.

22. The system according to claim 20, wherein the unipolar signals being carried by the carrier channels comprise a modulated or encoded signal.

23. The system according to claim 20, wherein the carrier channels are at least one of: sequential, spatial and spectral.

24. The system according to claim 20, wherein one of a data bit 0 or 1 representing one of the signs of the at least one bipolar signal is encoded by providing a unipolar signal on a preceding or first carrier channel of a pair of carrier channels and leaving a following or second carrier channel of the pair of carrier channels inactive and the other of data bits 1 or 0 representing one of the signs of the at least one bipolar signal is encoded by leaving the preceding or first carrier channel of the pair of data carrier channels inactive and providing a unipolar signal on the following or second carrier channel.

25. The system according to claim 20, wherein the first carrier channel comprises at least one of: a different frequency band or channel; a different time slot; a different spatial position to the second carrier channel.

26. The system according to claim 20, wherein at least one carrier channel comprises a different spatial position of a transmitter element.

27. The system according to claim 20, wherein the number of first carrier channels is equal to the number of second carrier channels.

28. The system according to claim 20, wherein the encoding is based on a predetermined look-up table or an algorithm that matches blocks of bits to a combination of carrier channels within a sub-block of the total number of carrier channels.

29. The system according to claim 20, wherein the carrier channels comprise at least one of: frequency, time, and spatial carrier channels.

30. The system according to claim 20, wherein the unipolar signals comprise at least one of: time resolved signals; signals modulated in the time domain; frequency resolved signals; signals modulated in the frequency domain; spatially resolved signals; signals modulated in the spatial domain.

31. The system according to claim 20, wherein at least one of the unipolar signals is at least one of: inactive; has zero intensity; has an intensity or magnitude that is distinguishable from any signal intensity or magnitude used in at least one other of the unipolar signals; and at least one other of the unipolar signals has a magnitude that is equal or equivalent to a magnitude of the bipolar signal.

32. A method for transmitting data in a communications system, the data comprising a plurality of data symbols or elements, the method comprising converting at least one bipolar signal into at least one unipolar signal using the method of claim 11, the method further comprising communicating at least a portion of the data by transmitting the unipolar signals in selected carrier channels, wherein the relative order of at least one first carrier channel having a first operational state and at least one second carrier having a second operational state is representative of one of the signs of the at least one bipolar signal.

33. A communications system comprising a system according to claim 20 and a receiver for receiving a data signal from the system, wherein the receiver is configured to determine the relative order of at least one carrier channel having a first operational state and at least one second carrier channel having a second operational state in order to determine at least a portion of the data.

34. A method of communicating data that comprises a plurality of data symbols or elements, the method comprising: converting at least one bipolar signal into at least one unipolar signal using the method of claim 11; communicating at least a portion of the data by transmitting the unipolar signals in selected carrier channels, wherein the relative order of at least one first carrier channel having a first operational state and at least one second carrier having a second operational state is representative of data elements or symbols of the first data portion; receiving the signal from the transmission system; and determining the relative order of the at least one carrier channel having a first operational state and the at least one second carrier channel in order to determine representing one of the signs of the at least one bipolar signal.

35. A computer program product provided on a tangible, non-transient carrier medium, the computer program product being adapted, when implemented on a suitable processing apparatus, to implement the system according to claim 1.

36. A computer program product provided on a tangible, non-transient carrier medium, the computer program product being adapted, when implemented on a suitable processing apparatus, to implement the receiver according to claim 7.

37. A computer program product provided on a tangible, non-transient carrier medium, the computer program product being adapted, when implemented on a suitable processing apparatus, to implement the method according to claim 11.

38. A computer program product provided on a tangible, non-transient carrier medium, the computer program product being adapted, when implemented on a suitable processing apparatus, to implement the method according to claim 12.

* * * * *